United States Patent
Watanabe

(10) Patent No.: US 8,253,974 B2
(45) Date of Patent: Aug. 28, 2012

(54) IMAGE FORMING APPARATUS, IMAGE PROCESSING APPARATUS, AND CONTROL METHOD THEREFOR

(75) Inventor: Yumi Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1242 days.

(21) Appl. No.: 12/025,409

(22) Filed: Feb. 4, 2008

(65) Prior Publication Data

US 2008/0192267 A1     Aug. 14, 2008

(30) Foreign Application Priority Data

Feb. 8, 2007     (JP) .................................. 2007-029712

(51) Int. Cl.
G06K 15/02     (2006.01)
H04N 1/405     (2006.01)
H04N 1/52      (2006.01)
H04N 1/54      (2006.01)
H04N 1/56      (2006.01)
B41C 1/04      (2006.01)

(52) U.S. Cl. ........ 358/1.8; 358/1.9; 358/2.99; 358/3.01; 358/3.06; 358/3.09; 358/3.23; 358/3.3; 358/501; 358/534

(58) Field of Classification Search ........................ None
See application file for complete search history.

(56) References Cited

U.S. PATENT DOCUMENTS

| | | | | |
|---|---|---|---|---|
| 6,003,970 A * | 12/1999 | Fujita et al. | ..................... | 347/41 |
| 6,164,745 A * | 12/2000 | Nagoshi et al. | ................. | 347/15 |
| 6,406,113 B1 * | 6/2002 | Kato | ................................ | 347/14 |
| 6,874,864 B1 * | 4/2005 | Maeda et al. | .................... | 347/41 |
| 6,963,423 B2 * | 11/2005 | Ogasahara et al. | ............. | 358/1.8 |
| 7,255,417 B2 * | 8/2007 | Yamazaki et al. | .............. | 347/19 |
| 7,564,591 B1 * | 7/2009 | Takahashi et al. | ........... | 358/3.21 |
| 7,986,440 B2 * | 7/2011 | Yanai et al. | ..................... | 358/2.1 |
| 2003/0184608 A1 * | 10/2003 | Masuyama et al. | ............. | 347/12 |
| 2005/0035995 A1 * | 2/2005 | Yazawa et al. | ................... | 347/43 |
| 2006/0038846 A1 * | 2/2006 | Chikuma et al. | ................ | 347/16 |
| 2006/0038847 A1 * | 2/2006 | Yanagi et al. | .................... | 347/16 |
| 2006/0082848 A1 * | 4/2006 | Takakura et al. | ............. | 358/534 |
| 2006/0087527 A1 * | 4/2006 | de Pena et al. | .................. | 347/12 |
| 2006/0187507 A1 * | 8/2006 | Konno et al. | .................. | 358/521 |
| 2006/0209112 A1 * | 9/2006 | Nunokawa | ....................... | 347/15 |
| 2007/0008561 A1 * | 1/2007 | Kanda et al. | ................... | 358/1.9 |
| 2008/0186348 A1 * | 8/2008 | Yanai et al. | ..................... | 347/15 |
| 2008/0316554 A1 | 12/2008 | Yanai et al. | | |

FOREIGN PATENT DOCUMENTS

| | | | |
|---|---|---|---|
| JP | 7-052465 | | 2/1995 |
| JP | 07-052465 | * | 2/1995 |

(Continued)

OTHER PUBLICATIONS

Official Action dated Aug. 12, 2011, in counterpart Japanese Patent Appln. No. 2007-029712.

*Primary Examiner* — King Poon
*Assistant Examiner* — Beniyam Menberu
(74) *Attorney, Agent, or Firm* — Fitzpatrick, Cella, Harper & Scinto

(57) ABSTRACT

In performing multi-pass printing by using a printhead having a plurality of nozzles, a print data setting unit sets a printing amount for each nozzle for each main scan of the printhead based on a print data setting LUT. This print data setting LUT reflects the information of the number of passes and the number of nozzles to be used which are arbitrarily set. A halftoning unit generates a dot pattern as a formation target by performing binarization processing for the print amounts set in this manner.

10 Claims, 58 Drawing Sheets

FOREIGN PATENT DOCUMENTS

| | | |
|---|---|---|
| JP | 11-245388 | 9/1999 |
| JP | 2002-096455 | 4/2002 |
| JP | 2004-230863 A | 8/2004 |
| JP | 2005-7613 A | 1/2005 |
| JP | 2005-231060 * | 9/2005 |
| JP | 2005-231060 A | 9/2005 |

* cited by examiner

FIG. 7

| | Ycut(k) | n1 | n2 | n3 | n4 | n5 | n6 | n7 | n8 | SHEET FEEDING AMOUNT LF(k) |
|---|---|---|---|---|---|---|---|---|---|---|
| SCAN NUMBER k=1 | -4 | 0 | 0 | 0 | 0 | 0.1 | 0.125 | 0.15 | 0.1275 | 2 |
| SCAN NUMBER k=2 | -2 | 0 | 0 | 0.3 | 0.175 | 0.15625 | 0.185 | 0.21365 | 0.2425 | 1 |
| SCAN NUMBER k=3 | -1 | 0 | 0.3 | 0.375 | 0.34375 | 0.4525 | 0.56125 | 0.461667 | 0.362083 | -4 |
| SCAN NUMBER k=4 | -5 | 0 | 0 | 0 | 0 | 0 | 0.3 | 0.325 | 0.35 | 7 |

(NOZZLE NUMBER spans n1–n8)

FIG. 33

| | Ycut(k) | NOZZLE NUMBER | | | | | | | | SHEET FEEDING AMOUNT LF(k) | ADJACENT AREA NUMBER L |
|---|---|---|---|---|---|---|---|---|---|---|---|
| | | n1 | n2 | n3 | n4 | n5 | n6 | n7 | n8 | | |
| SCAN NUMBER k=1 | −6 | 0 | 0 | 0 | 0 | 0 | 0 | 0.1 | 0.125 | 1 | 6 |
| SCAN NUMBER k=2 | −5 | 0 | 0 | 0 | 0 | 0 | 0.3 | 0.175 | 0.15625 | 1 | 7 |
| SCAN NUMBER k=3 | −4 | 0 | 0 | 0 | 0 | 0.3 | 0.375 | 0.34375 | 0.3125 | 1 | 8 |
| SCAN NUMBER k=4 | −3 | 0 | 0 | 0 | 0.3 | 0.325 | 0.35 | 0.375 | 0.3 | 1 | 9 |
| SCAN NUMBER k=5 | −2 | 0 | 0 | 0 | 0 | 0 | 0 | 0.1 | 0.2 | 0 | 10 |

...

● : PIXEL OF INTEREST

PROCESSING DIRECTION

SPATIAL FREQUENCY CHARACTERISTIC [cycle/mm]

IMAGE FORMING APPARATUS, IMAGE PROCESSING APPARATUS, AND CONTROL METHOD THEREFOR

BACKGROUND OF THE INVENTION

1. Field of the Invention

The present invention relates to an image forming apparatus, an image processing apparatus, and a control method for them and, more particularly, to an image forming apparatus, an image processing apparatus, and a control method for them, which perform image formation at a lower tone level than that of an input image.

2. Description of the Related Art

A general example of an image output apparatus for a word processor, personal computer, facsimile apparatus, and the like is a printing apparatus which prints information such as desired characters and images on a sheet-like print medium such as a paper sheet or film. Such printing apparatuses use various printing methods. Among them, methods of forming an image on a print medium by making ink adhere to the print medium have been widely implemented into practice. As a typical example of such methods, the inkjet printing method has been known.

In order to increase the printing speed and improve the image quality, a printing apparatus using the inkjet printing method includes a nozzle group which is an integral array of a plurality of ink orifices (nozzles) capable of discharging ink having the same color and density. To further improve the image quality, some apparatuses include a nozzle group capable of discharging inks having the same color but different densities or a nozzle group of capable of discharging ink having the same color and density while changing the discharge amount of ink in some steps.

In such a printing apparatus, the quality of the image to be printed greatly depends on the performance of a printhead as a discrete component. For example, a slight error in the process of manufacturing a printhead such as variations in the shape of the orifices of a printhead, discharge heaters, or piezoelectric elements greatly affects the discharge amount and direction of ink to be discharged. That is, such a slight error is a factor that causes density unevenness in the image to be formed and degrades the image quality.

As a measure for suppressing such density unevenness, the multi-pass printing method is known (see, for example, Japanese Patent Laid-Open No. 2002-096455). According to this technique, combining image processing and printing control makes it possible to form an image at high speed while suppressing deterioration in image quality due to white stripes or density unevenness.

The multi-pass printing method will be described in detail below with reference to FIG. 51.

Referring to FIG. 51, reference numeral 5101 denotes a multi-head. For simplicity, assume that the multi-head 5101 comprises eight nozzles 5102. Reference numeral 5103 denotes an ink droplet discharged by the nozzle 5102. In general, when the same main scanning print area on a predetermined print medium is to be completed in one scan, it is ideal to discharge inks at a uniform discharge amount in a uniform direction, as shown in FIG. 51.

In practice, however, each nozzle varies. If, therefore, printing is done in one scan, ink drops discharged from the respective nozzles vary in size and direction. As a result, blank portions periodically exist in the head main scanning direction, or dots are excessively superimposed in some portions. A set of dots landed in this state is perceived as density unevenness in the nozzle array direction.

For this reason, the multi-pass printing method performs main scanning a plurality of number of times (three times in this case) using a multi-head 5202, as shown in FIG. 52. Referring to FIG. 52, a printing scan area comprising, as a unit, four pixels which are half in number of eight pixels in the vertical direction is completed by two printing scans (passes). In this case, the eight nozzles in the multi-head 5201 are divided into a group of four upper nozzles (upper nozzle group) and a group of four lower nozzles (lower nozzle group). The dot printed by one nozzle in one scan corresponds to the data obtained by thinning out image data to about ½ in accordance with a predetermined image data arrangement. Embedding about half the remaining number of dots in the image formed in advance at the time of the second scan will complete a four-pixel unit area.

In the multi-pass printing method, the first and second scans performed in accordance with a predetermined arrangement compensate for each other. As an image data arrangement (thinning-out mask pattern) used for this purpose, an arrangement in which pixels are vertically and horizontally staggered one by one as shown in FIG. 53 is generally used. In a unit print area (a four-pixel unit area in this case), therefore, printing is completed by the first scan of printing a staggered pattern and the second scan of printing an inverse staggered pattern. The upper, middle, and lower parts of FIG. 53 show how printing in the same area is completed using the staggered and inverse staggered patterns described above. First of all, in a predetermined area on a print medium, as shown in the upper part of FIG. 53, the first scan prints a staggered pattern (black circles) using four lower nozzles. As shown in the middle part of FIG. 53, the second scan prints an inverse staggered pattern (white circles) in the area using all the eight nozzles while feeding the sheet by four pixels. In addition, as shown in the lower part of FIG. 53, the third scan prints a staggered pattern in the area again using the four upper nozzles while feeding the sheet by four pixels.

Executing this multi-pass printing method, even in the use of a multi-head with variations like those shown in FIG. 52, will halve the influence of the variations on a print area, thereby reducing the density unevenness in the image to be formed.

Even if, however, such multi-pass printing is performed, the problem of density unevenness may not be easily solved depending on the printing ratio of each printing scan. For this reason, there has been proposed a technique of changing the pitch of the respective areas by randomly changing the sub-scanning direction feeding amount (sheet feeding amount) between the respective printing scans in the execution of multi-pass printing, thereby reducing density unevenness (see, for example, Japanese Patent Laid-Open No. 7-52465).

There has also been proposed a method of reducing image quality deterioration in the leading edge and trailing edge areas of a print medium in the feeding direction by changing the number of nozzles of a printhead which are to be used in one printing scan in the multi-pass printing method (see, for example, Japanese Patent Laid-Open No. 11-245388). According to this technique, since the positional accuracy of print medium feeding deteriorates in the leading edge and trailing edge areas of a print medium in the feeding direction, deterioration in printed image quality due to positional accuracy deterioration is made less noticeable by decreasing the feeding amount and the number of nozzles to be used in such areas.

The multi-pass printing method of randomly changing the sheet feeding amount can reduce density unevenness which periodically occurs in the subscanning direction. However, according to this method, since an image is formed in each main scan, if a sheet feeding error occurs, the graininess of an image deteriorates, and hence the image quality of the output image deteriorates.

The manner of how graininess deteriorates due to this sheet feeding error will be described below with reference to FIGS. 54 and 55. FIGS. 54 and 55 each show an example of how two-pass printing is performed using a staggered mask pattern like that shown in FIG. 53. FIG. 54 shows a print example without any sheet feeding error in a print medium. FIG. 55 shows a print example with a sheet feeding error.

As shown in FIG. 54, if there is no sheet feeding error, dots are accurately printed at the positions designated by an input binary halftone image. Assume that in this case, no nozzle discharge variation has occurred. If, however, as shown in FIG. 55, the feeding of the print medium shifts in the arrow direction before the second pass printing, the image formed on the print medium deteriorates and becomes grainy. This is because in the multi-pass printing method using a mask pattern, even if the dispersibility of the image to be finally output is high, the dispersibility of dots to be printed in each pass is low, as shown in FIG. 55.

In addition, since the sheet feeding error amount varies for each sheet feeding operation, the following problem arises. For example, even in an area with the same input data value, if the state shown in FIG. 54 without any sheet feeding error appears adjacent to the state shown in FIG. 55 with the sheet feeding error, density unevenness with a longer period than that caused by nozzle variations occurs.

The following problem arises in the above method of reducing image quality deterioration in the leading and trailing edge areas of a recording member in the feeding direction by changing the number of nozzles of the printhead which are to be used in one printing scan. This method allows setting only a sheet feeding amount corresponding to an integer multiple of the minimum unit of sheet feeding amount (e.g., an amount corresponding to a predetermined number of nozzles). This may make it impossible to efficiently use a limited number of nozzles.

SUMMARY OF THE INVENTION

The present invention has been made to solve the above problems, and has as its object to provide an image forming apparatus, an image processing apparatus, and a control method therefor which have the following functions. That is, the present invention achieves an improvement in image quality by reducing density unevenness due to variations in printing elements, graininess due to a feeding amount error, and long-period density unevenness in multi-pass printing.

According to one aspect of the present invention, an image forming apparatus which forms an image by scanning a printhead having a plurality of printing elements on a print medium is provided. The apparatus includes an input unit configured to input image data, a storage unit configured to store a table in which a printing amount division ratio for each of the printing elements is set for each main scan of the printhead, a setting unit configured to set a printing amount for each of the printing elements for each main scan of the printhead in accordance with the image data based on the table, and an N-ary (where N is an integer not less than two) processing unit configured to generate a dot pattern as a formation target by performing N-ary processing for the printing amount set by the setting unit, wherein the table is generated based on the number of times of main scanning for formation of the same area on the print medium and the number of printing elements to be used for each main scan.

According to the present invention, arbitrarily setting the number of main scans in the same print area and the number of printing elements to be used for each main scan in multi-pass printing makes it possible to provide an image forming apparatus, an image processing apparatus, and a control method therefor which have the following functions. That is, the present invention achieves an improvement in image quality by reducing density unevenness due to variations in printing elements, graininess due to the feeding amount shift of a print medium, and long-period density unevenness.

Further features of the present invention will become apparent from the following description of exemplary embodiments with reference to the attached drawings.

BRIEF DESCRIPTION OF THE DRAWINGS

FIG. 7 is a view showing an example of data stored in a print data setting LUT in the embodiment;

FIG. 33 is a view showing how data are stored in a print data setting LUT in the second embodiment;

DESCRIPTION OF THE EMBODIMENTS

Figure 1:
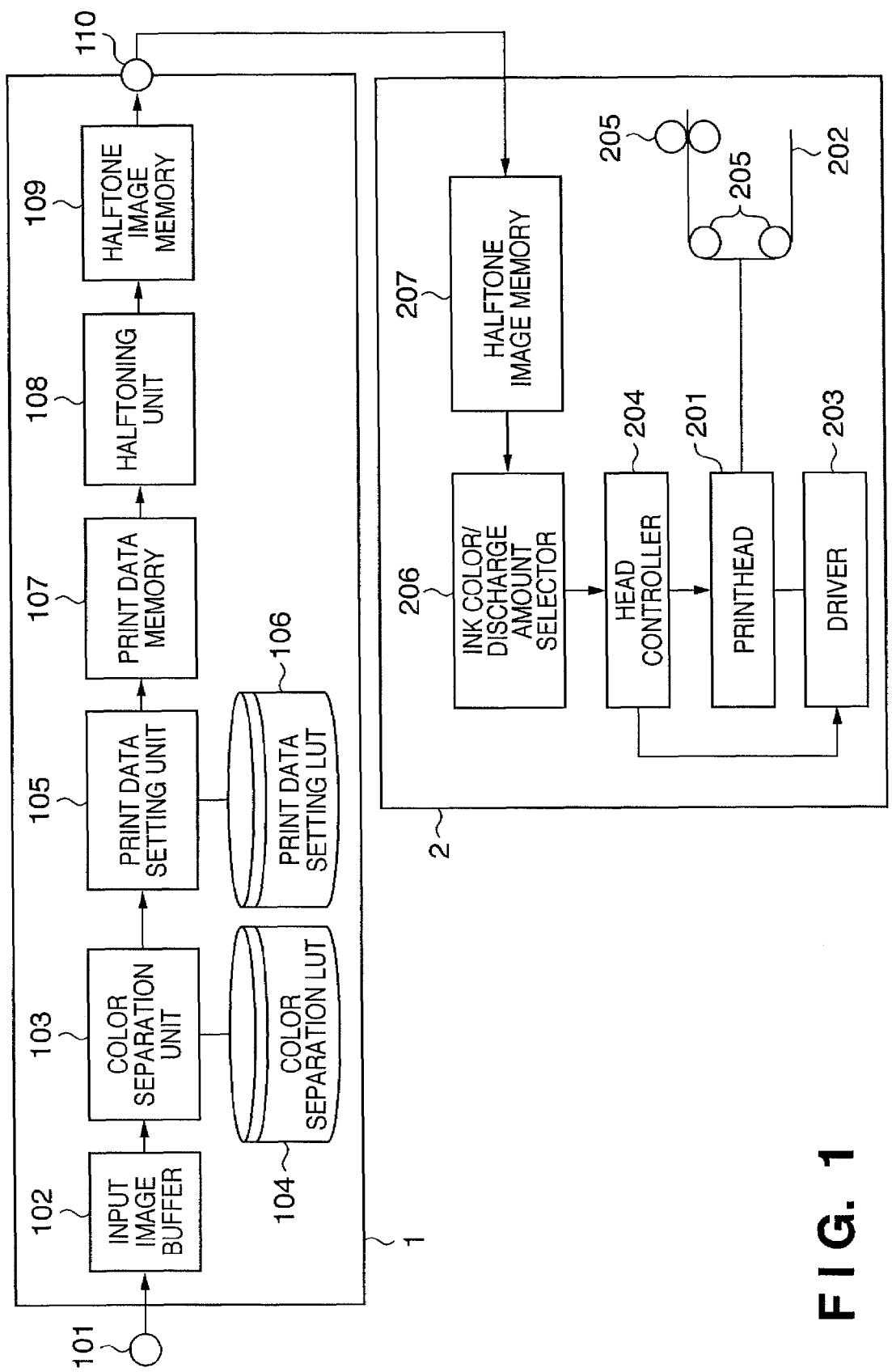
FIG. 1 is a block diagram showing the arrangement of an image forming system in an embodiment of the present invention.

Various exemplary embodiments, features, and aspects of the present invention will be described in detail below with reference to the drawings. The arrangement in each embodiment described below is merely an example, and the present invention is not limited to the arrangements illustrated in the drawings.

<First Embodiment>

FIG. 1 is a block diagram showing the arrangement of an image forming system according to this embodiment. Referring to FIG. 1, reference numeral 1 denotes an image processing apparatus; and 2, a printer. Note that the image processing apparatus 1 can be implemented by a printer driver installed in a general personal computer. In this case, each unit of the image processing apparatus 1 to be described below is implemented by making a computer execute a predetermined program. Another arrangement is, for example, an arrangement in which the printer 2 includes the image processing apparatus 1.

The image processing apparatus 1 and the printer 2 are connected to each other via a printer interface or a network interface. The image processing apparatus 1 receives image data to be printed via an image data input terminal 101, and stores the data in an input image buffer 102. A color separation unit 103 color-separates the input image data into data corresponding to the ink colors of the printer 2. In this color separation processing, a color separation lookup table ( ) 104 is referred to. A print data setting unit 105 sets print data for each scan from each ink color separated by the color separation unit 103, and stores the data in a print data memory 107. Note that print data in this embodiment is the printing ink amount of each ink color in each scan.

A halftoning unit 108 converts image data with multiple tone levels (three or more tone levels) stored in the print data memory 107 into binary data, and stores it in a halftone image memory 109. The binary image data formed by the above series of processing is output to the printer 2 via an output terminal 110.

The printer 2 forms the binary image data formed by the image processing apparatus 1 on a print medium by moving a printhead 201 vertically and horizontally relative to a print medium 202. For the printhead 201, a printhead based on the electrophotographic method, thermal transfer method, inkjet method, or the like can be used. Any type of printhead has one or more printing elements (nozzles in the inkjet method). A driver 203 moves the printhead 201 under the control of a head controller 204. A feeding unit 205 feeds a print medium under the control of the head controller 204. An ink color/discharge amount selector 206 selects an ink color from the colors of inks supplied to the printhead 201 and the amount of ink which can be discharged based on the binary image data of each color formed by the image processing apparatus 1.

Figure 2:
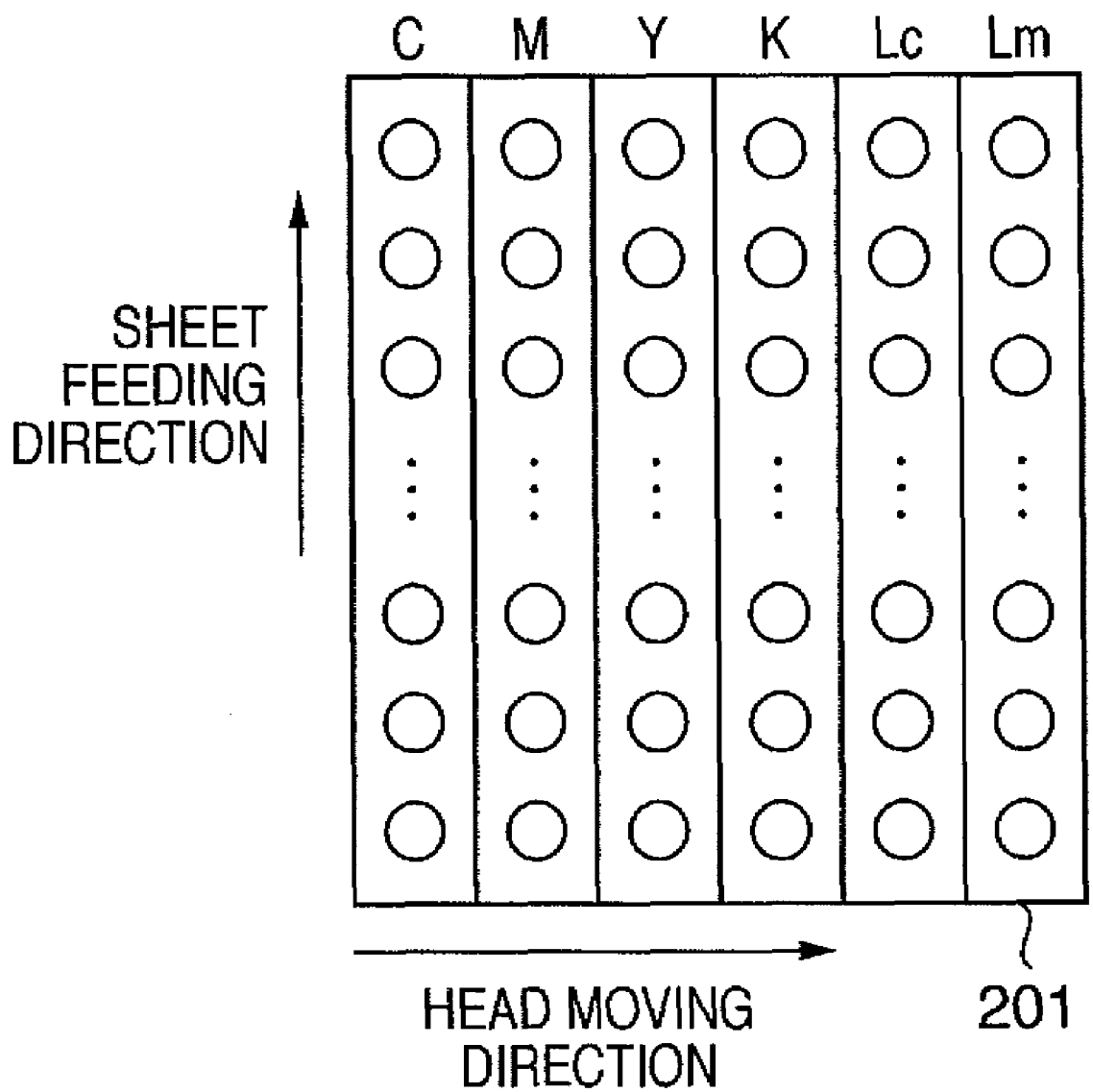
FIG. 2 is a view showing an example of the arrangement of a printhead in a printer according to this embodiment.

FIG. 2 is a view showing an example of the arrangement of the printhead 201. In this embodiment, the printhead 201 is supplied with inks of six colors including inks of light cyan (Lc) and light magenta (Lm) having relatively low ink densities, in addition to inks of four colors of cyan (C), magenta (M), yellow (Y), and black (K).

For simplicity, FIG. 2 shows an arrangement in which nozzles are arranged in a line in the sheet feeding direction. However, the number of nozzles and the arrangement of nozzles are not limited to this example. For example, it suffices to have a nozzle array with the same color and different discharge amounts or a plurality of arrays of nozzles with the same discharge amount. In addition, nozzles may be arranged in a zigzag pattern. Referring to FIG. 2, ink colors are sequentially arranged in a line in the head moving direction. However, they can be arranged in a line in the sheet feeding direction.

Processing in the image processing apparatus 1 of this embodiment having the above functional arrangement will be described next with reference to the flowchart of FIG. 3.

First of all, input multi-tone color image data is input via the input terminal 101 and stored in the input image buffer 102 (S101). In this case, the input image data is color image data comprising three color components of red (R), green (G), and blue (B).

The color separation unit 103 then performs color separation processing for the input multi-tone color image data stored in the input image buffer 102 to convert the RGB data into ink color planes of CMYK and LcLm by using the color separation LUT 104 (S102). In this embodiment, each pixel data after color separation processing is handled as 8-bit data. However, it suffices to convert each pixel data into data with more tone levels.

As described above, the printhead 201 in this embodiment holds six types of ink colors. For this reason, input color image data of RGB is converted into image data of a total of six planes of C, M, Y, K, Lc, and Lm. That is, image data of six types of planes corresponding to six types of ink colors are generated.

Color separation processing in this embodiment will be described in detail below with reference to FIG. 4.

Figure 4:
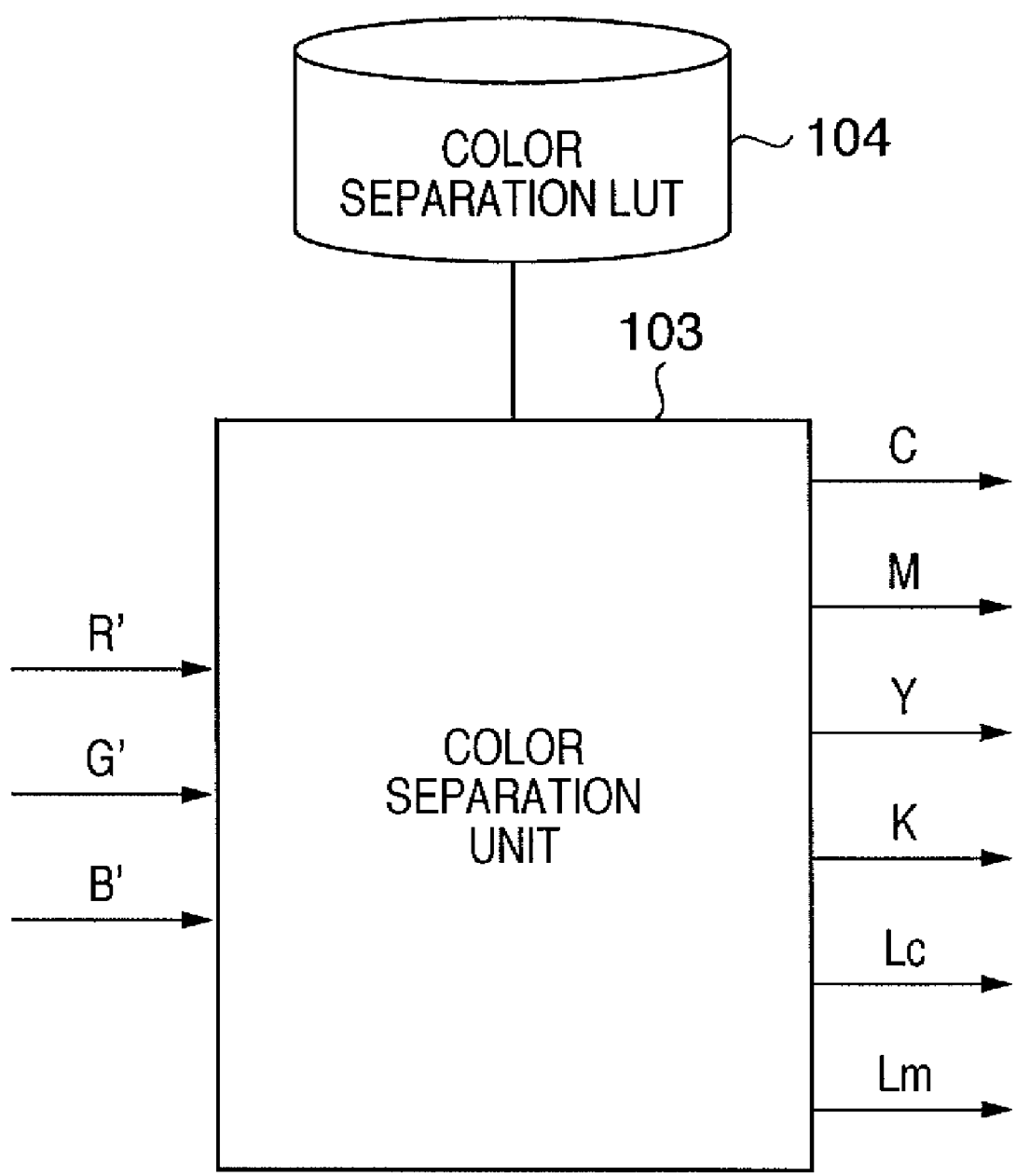
FIG. 4 is a view showing the details of input and output data in a color separation unit in the embodiment.

FIG. 4 shows the details of input and output data in the color separation unit 103. As shown in FIG. 4, input image data R', G', and B' are converted into C, M, Y, K, Lc, and Lm data by referring to the color separation LUT 104 as follows:

$$C = C\_LUT\_3D(R', G', B') \quad (1)$$

$$M = M\_LUT\_3D(R', G', B') \quad (2)$$

$$Y = Y\_LUT\_3D(R', G', B') \quad (3)$$

$$K = K\_LUT\_3D(R', G', B') \quad (4)$$

$$Lc = Lc\_LUT\_3D(R', G', B') \quad (5)$$

$$Lm = Lm\_LUT\_3D(R', G', B') \quad (6)$$

In this case, the respective functions defined by the right-hand sides of equations (1) to (6) correspond to the contents of the color separation LUT 104. The color separation LUT 104 determines output values for the respective ink colors from three input values of red, green, and blue. Since this embodiment is configured to have six colors of C, M, Y, K, Lc, and Lm, a LUT arrangement for obtaining six output values from three input values is used.

With the above processing, the color separation processing in this embodiment is complete.

Referring back to FIG. 3, the print data setting unit 105 sets Ycut(k) representing the scan number k and a Y-coordinate as a color separation data extraction position (S103). That is, Ycut(k) is the color separation data extraction position at the scan number k and corresponds to a nozzle upper end coordinate. Note that the scan number k has an initial value of 1, and is incremented one by one for each processing loop.

Assume that this apparatus includes an array of eight nozzles, and performs four-pass printing operation of forming an image by scanning the same main scanning print area on the image four times. A method of setting a color separation data extraction position (Y-coordinate) Ycut in this case will be described with reference to FIGS. 5 and 6.

Figure 5:
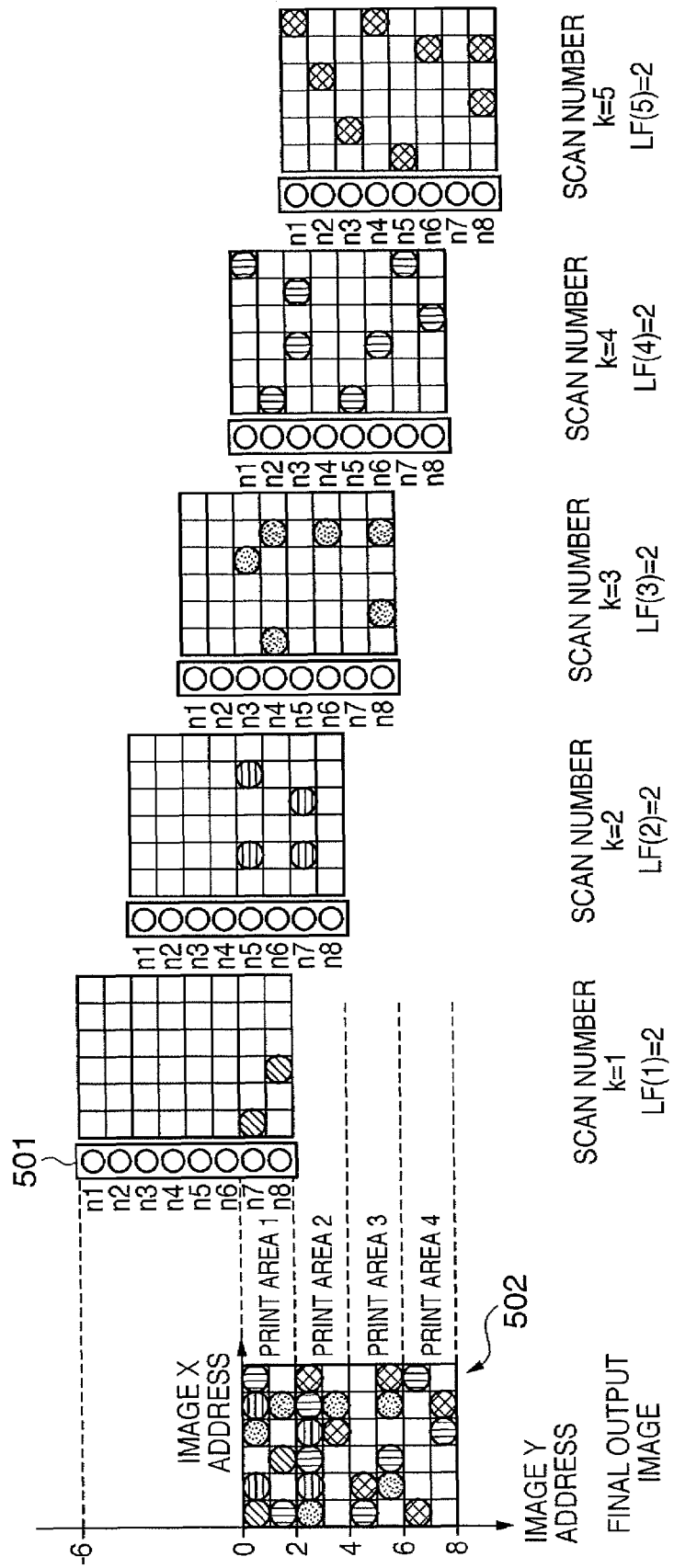
FIG. 5 is a view showing an example of how color separation data extraction coordinates are set when the sheet feeding amount is constant in the embodiment.

FIG. 5 shows a case in which a sheet feeding amount LF(k) (an actual feeding amount is the value determined by an inter-nozzle pitch and LF(k)) after a scan at the scan number k is constant. As shown in FIG. 5, in general four-pass printing, at scan number k=1, image formation is performed by using only the lower ¼ part (nozzle numbers n7 and n8) of nozzles 501. At scan number k=2, the sheet is fed from the position corresponding to scan number k=1 by ¼ the length of the nozzles (sheet feeding amount LF(1)=2 (the number of nozzles)), and image formation is performed by using the lower ½ part (nozzle numbers n5, n6, n7, and n8) of the nozzles 501. At scan number k=3, the sheet is fed from the position corresponding to scan number k=2 by ¼ the length of the nozzles (LF(2)=2), and image formation is performed by using the lower ¾ part (nozzle numbers n3, n4, n5, n6, n7, and n8) of the nozzles 501.

Repeating the above processing will form a final output image 502. It is obvious from the example in FIG. 5 that a color separation data extraction position Ycut(1) at scan number k=1 is −6.

The color separation data extraction position Ycut(k) is generalized as follows when the sheet feeding amount LF(k) is constant. Letting Nzzl be the number of nozzles of a nozzle array, Pass be the number of passes, and k be a scan number, the color separation data extraction position is given as $$Ycut(k) = -Nzzl + (Nzzl/Pass)k \quad (7)$$

Figure 6:
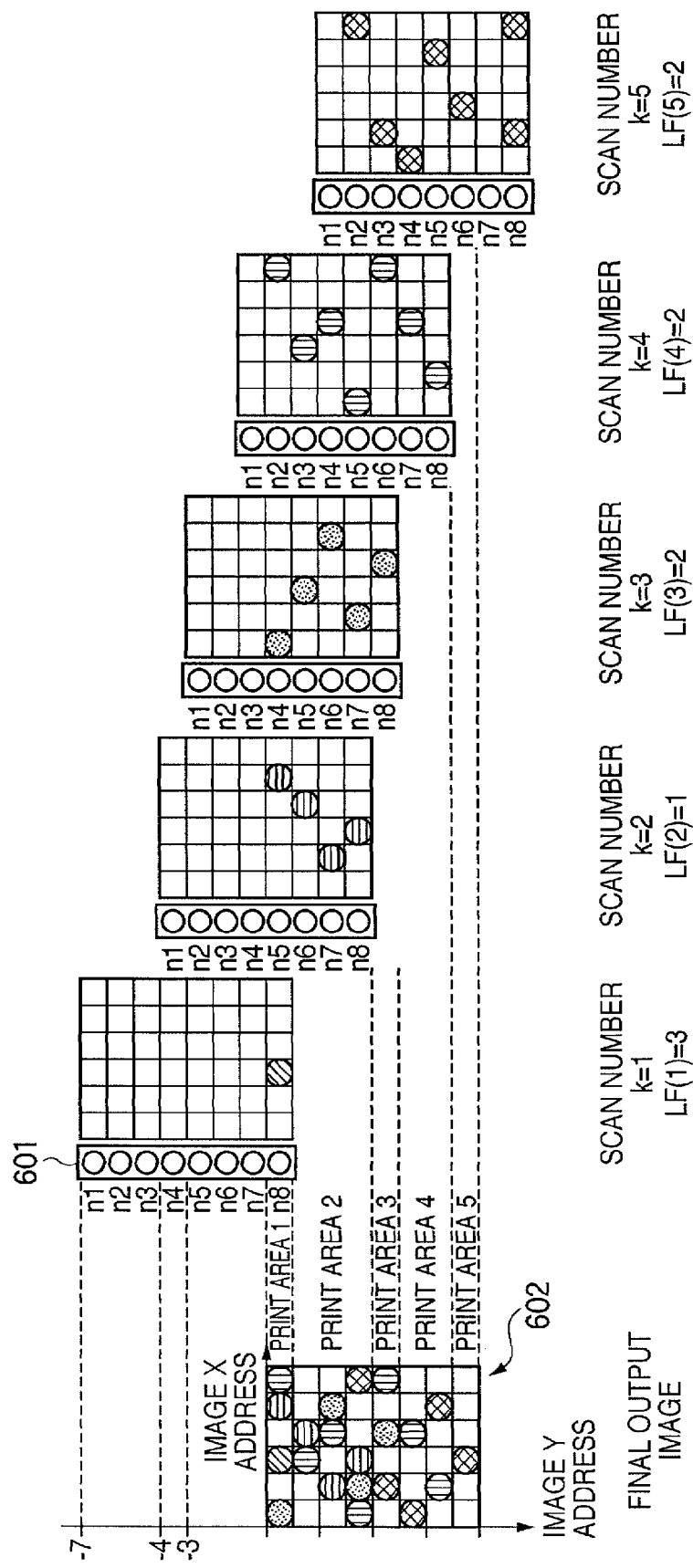
FIG. 6 is a view showing an example of how color separation data extraction coordinates are set when the sheet feeding amount changes in the embodiment.

A case in which the sheet feeding amount LF(k) is changed after a scan at the scan number k will be described next with reference to FIG. 6. As shown in FIG. 6, first of all, at scan number k=1, image formation is performed by using only a lowest nozzle n8 of nozzles 601. At this time, the color separation data extraction position at scan number k=1 is given as Ycut(1)=−7. At scan number k=2, the sheet is fed from the position corresponding to scan number k=1 by ⅜ the length of the nozzles (LF(1)=3), and image formation is performed by using nozzles n5, n6, n7, and n8. Therefore, the color separation data extraction position at scan number k=2 is given by Ycut(2)=−4. At scan number k=3, the sheet is fed from the position corresponding to scan number k=2 by ⅛ the length of the nozzles (LF(2)=1), and image formation is performed by using nozzles n4, n5, n6, n7, and n8.

Repeating the above processing will form a final output image 602.

As described above, according to a characteristic feature of this embodiment, when the sheet feeding amount LF(k) after a scan is not constant, the color separation data extraction position Ycut is given as follows:

if k=1:

$$Ycut(k) = -Nzzl + (\text{number of nozzles to be used when } k=1) \quad (8)$$

if k≧1:

$$Ycut(k) = Ycut(k-1) + LF(k-1) \quad (9)$$

Note that the color separation data extraction position Ycut (k) at the scan number k is recorded on a print data setting LUT 106. The details of this component will be described later.

When Ycut(k) is set in the above manner, the print data setting unit 105 sets a print data value for each scan based on the print data setting LUT 106 and image data after the color separation (S104).

FIG. 7 shows an example of data stored in the print data setting LUT 106 at the time of execution of four-pass printing operation of forming an image by scanning the same main scanning print area on the image four times by using a printhead having eight nozzles arranged in a line.

As shown in FIG. 7, the print data setting LUT 106 is provided with the color separation data extraction position Ycut(k), the division ratio of input data corresponding to each nozzle, and the sheet feeding amount LF(k) after a scan, for each scan number k.

Figure 8:
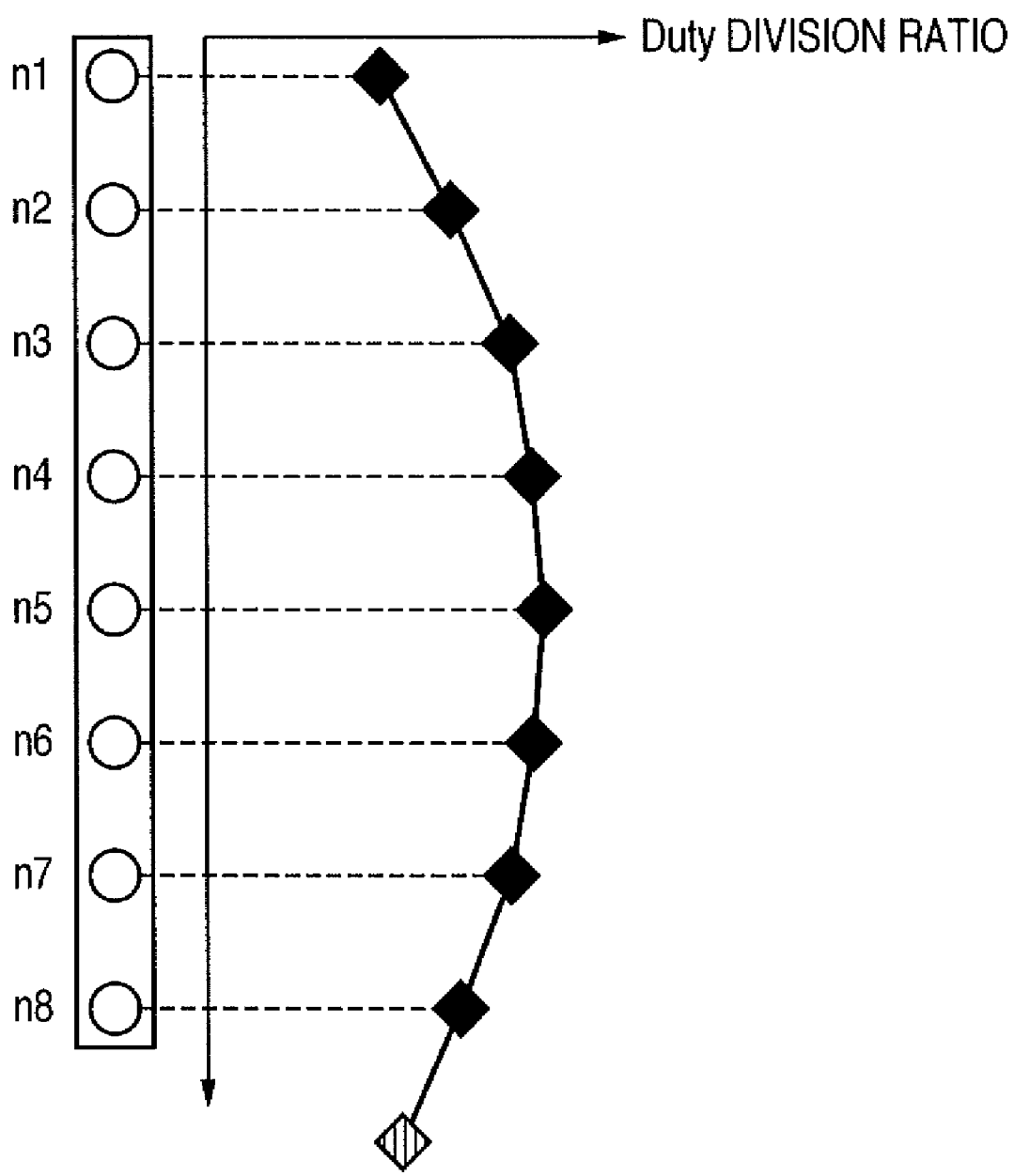
FIG. 8 is a view showing an example of duty division ratios in the embodiment.

For example, the division ratio of input data corresponding to each nozzle is set in the manner shown in FIG. 8. Referring to FIG. 8, the ordinate represents the nozzle position; and the abscissa, the division ratio. When an input duty is 1, each division ratio is set as a real number from 0 to 1. In this embodiment, a division ratio corresponding to each nozzle is determined by the number of printing passes, a sheet feeding amount, and the number of nozzles to be used. In this embodiment, division ratios are set based on an input duty division table generated in advance. A method of generating this table will be described in detail below. An input duty represents each ink value after color separation processing.

Figure 9:
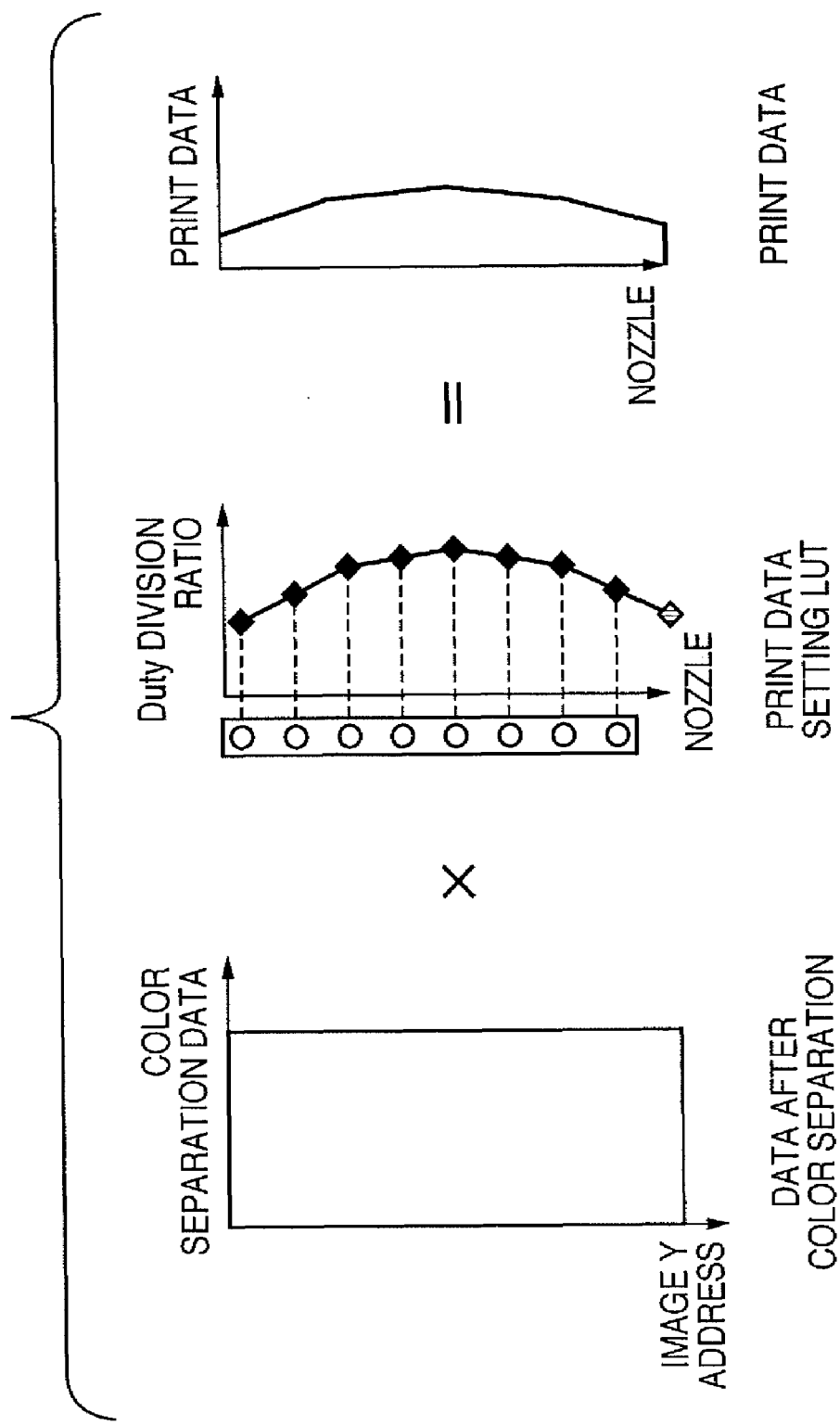
FIG. 9 is a view showing an outline of a print data setting method in the embodiment.

As shown in FIG. 9, in step S104, print data is set as the product of the print data setting LUT 106 and color separation data. That is, multiplying data after color separation by a duty division ratio (the division ratio of print data) set for each nozzle as indicated by the left member in FIG. 9 will set print data for each nozzle as indicated by the right member in FIG. 9. With this operation, at the time of an actual scan, each nozzle discharges ink corresponding to only print data for color separation data as a target to form an image.

Figure 10:
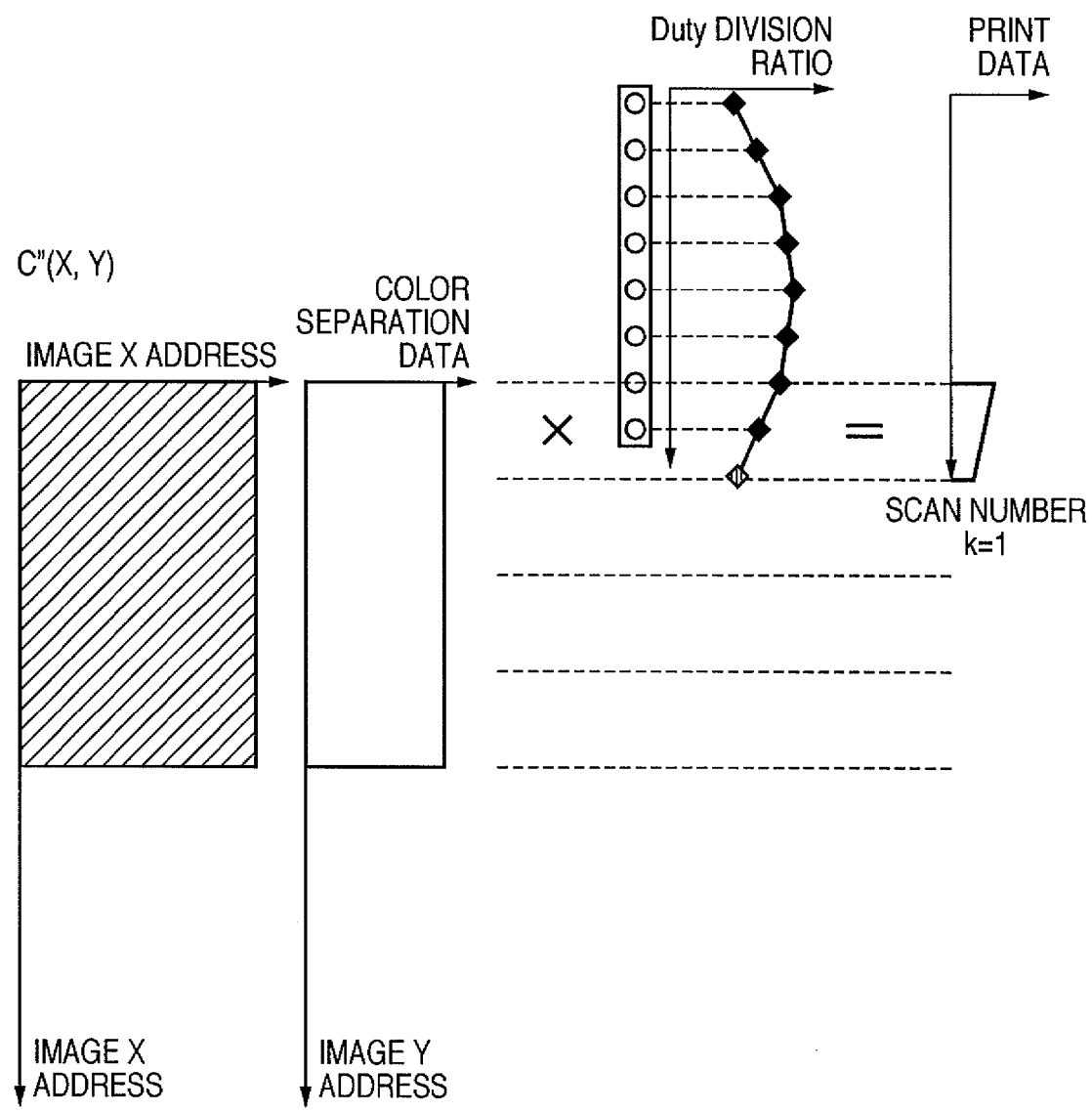
FIG. 10 is a view showing the outline of the print data setting method in the embodiment.

In this embodiment, when a corresponding nozzle corresponds to coordinates outside the image Y address region, print data is 0. For example, as shown in FIG. 10, when scan number k=1, image Y addresses become negative at the upper ¾ part of the nozzle array. Therefore, print data value=0 is assigned to the upper ¾ part of the nozzle array, whereas a significant value is assigned to the lower ¼ part of the nozzle array.

Figure 11:
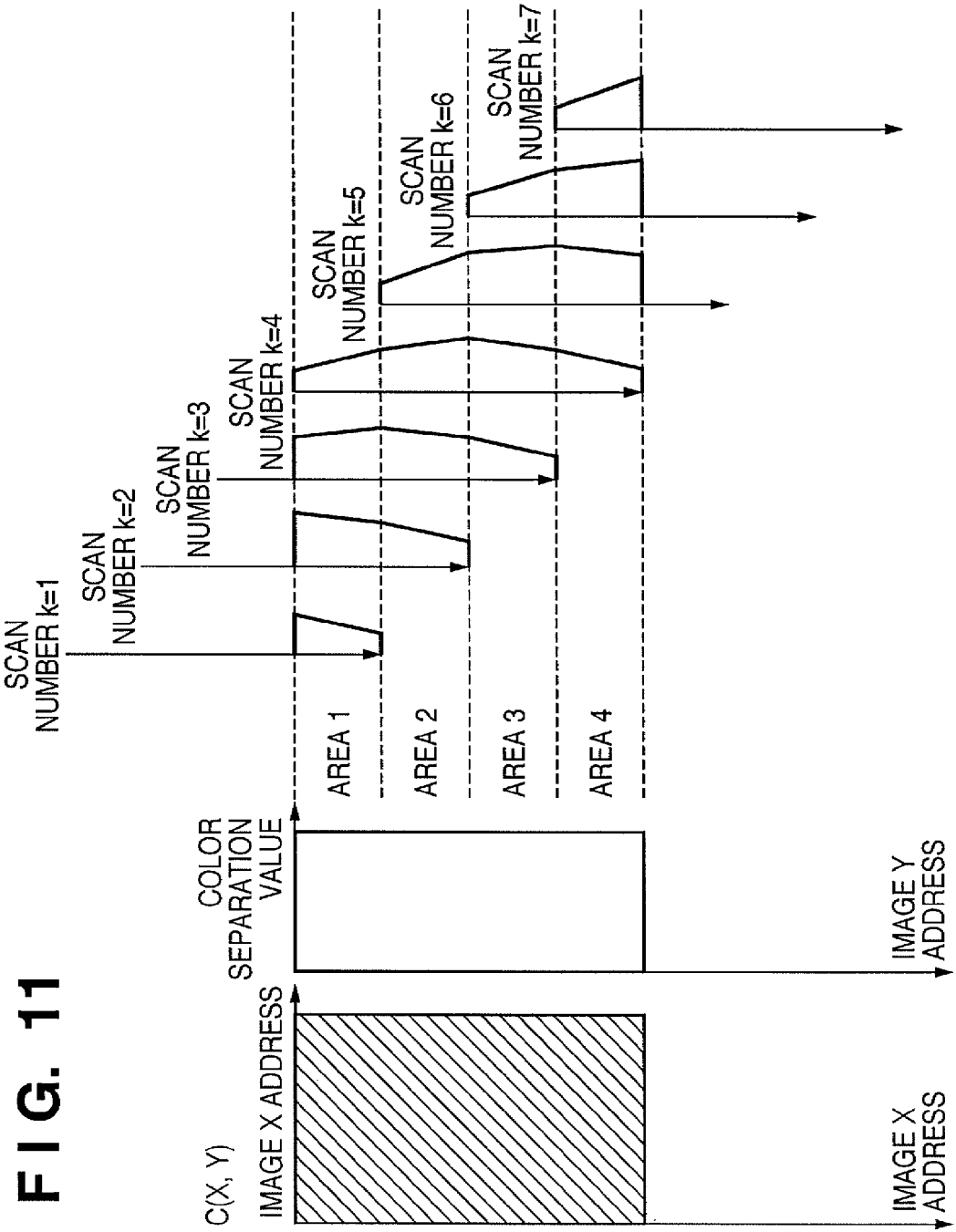
FIG. 11 is a view showing the outline of the print data setting method in the embodiment.

Since the color separation data extraction position Ycut(k) is determined by the scan number k, print data is determined as shown in FIG. 11 when scan number k=1 to 7. FIG. 11 shows print data corresponding to the nozzle position at each scan number. As is obvious, different print data are set for the respective scan numbers. Each print data in FIG. 11 is determined by the product of color separation data and the print data setting LUT 106. When, therefore, the products between color separation data and the LUT are calculated while the sheet is fed, the total value corresponding to one raster formed by four scans at scan numbers k=1 to 4 is equal to color separation data in area 1. Likewise, in each of areas 2, 3, and 4, the total value corresponding to one raster is equal to color separation data.

The print data setting unit 105 described above sets print data as follows. Note that C'_(X, Y), Lc'_(X, Y), M'_(X, Y), Lm'_(X, Y), Y'_(X, Y), and K'_(X, Y) represent color separation data of the respective colors at addresses (X, Y). C_d (X, Y), Lc_d(X, Y), M_d(X, Y), Lm_d(X, Y), Y_d(X, Y), and K_d(X, Y) represent print data at addresses (X, Y). S_LUT (Y) represents a value of the print data setting LUT 106 at an address Y. In addition, $0 \leq nx <$ image X size, and $0 \leq ny < Nzzl$ (the number of nozzles of the nozzle array: 8).

$$C\_d(nx, ny) = C'\_(nx, Ycut(k)+ny) \times S\_LUT(ny) \quad (10)$$

$$Lc\_d(nx, ny) = Lc'\_(nx, Ycut(k)+ny) \times S\_LUT(ny) \quad (11)$$

$$M\_d(nx, ny) = M'\_(nx, Ycut(k)+ny) \times S\_LUT(ny) \quad (12)$$

$$Lm\_d(nx, ny) = Lm'\_(nx, Ycut(k)+ny) \times S\_LUT(ny) \quad (13)$$

$$Y\_d(nx, ny) = Y'\_(nx, Ycut(k)+ny) \times S\_LUT(ny) \quad (14)$$

$$K\_d(nx, ny) = K'\_(nx, Ycut(k)+ny) \times S\_LUT(ny) \quad (15)$$

Figure 12:
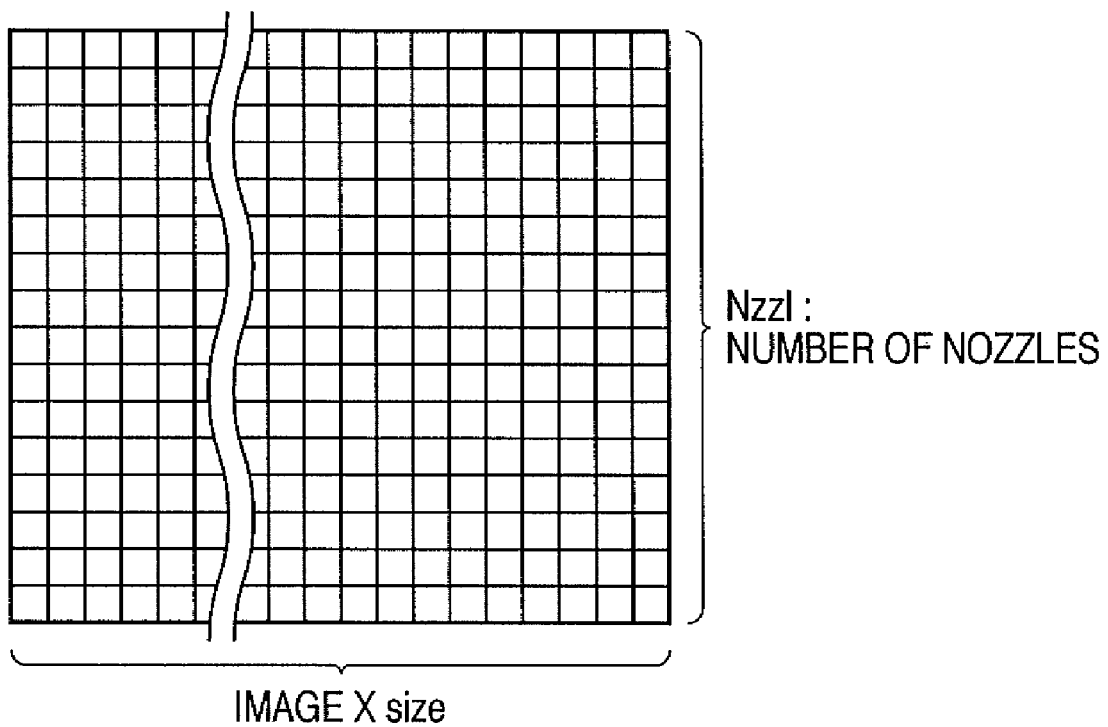
FIG. 12 is a view showing an arrangement of the band arrangement of a print data memory in the embodiment.

The print data set by the print data setting unit 105 in the above manner are stored in the print data memory 107 (S105). That is, as shown in FIG. 12, the print data memory 107 stores a band-like print data for each color, with the vertical direction corresponding to the number of nozzles and the horizontal direction corresponding to the image X size.

The method of generating the above input duty division table will be described in detail below.

Figure 13:
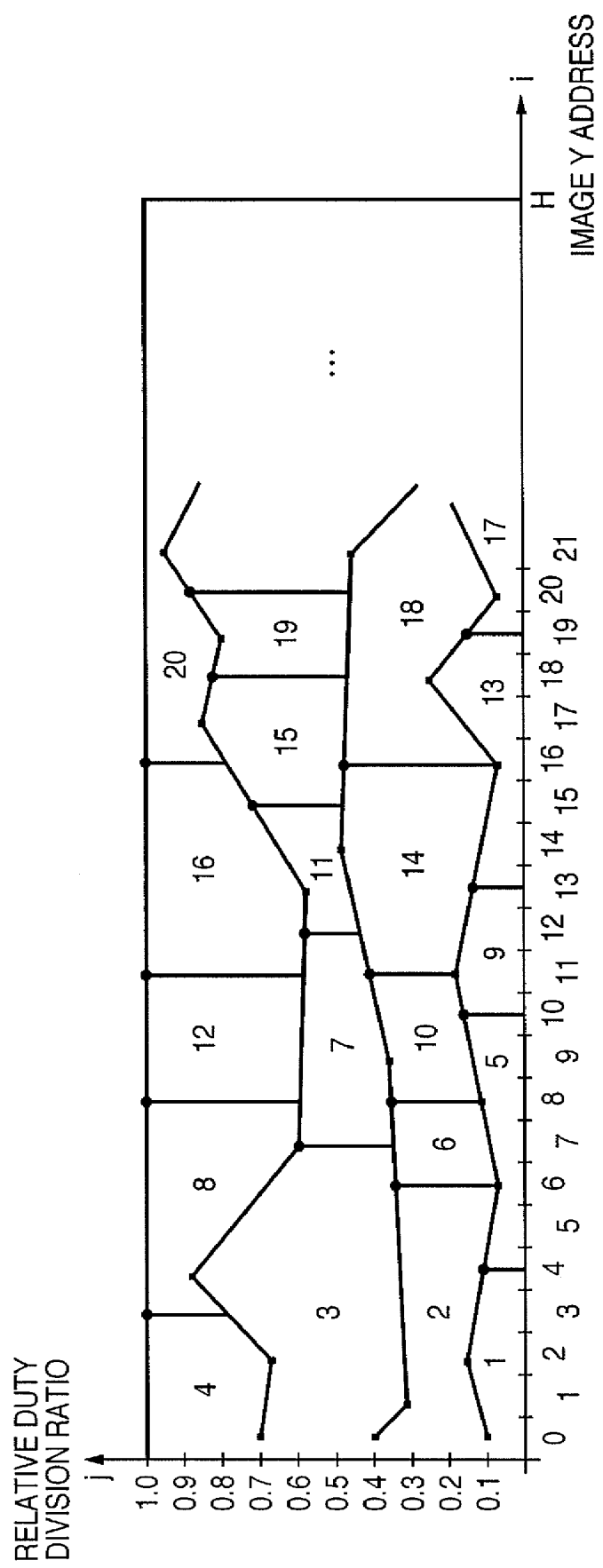
FIG. 13 is a view showing an example of an input duty division table in four-pass printing in the embodiment.
Figure 14:
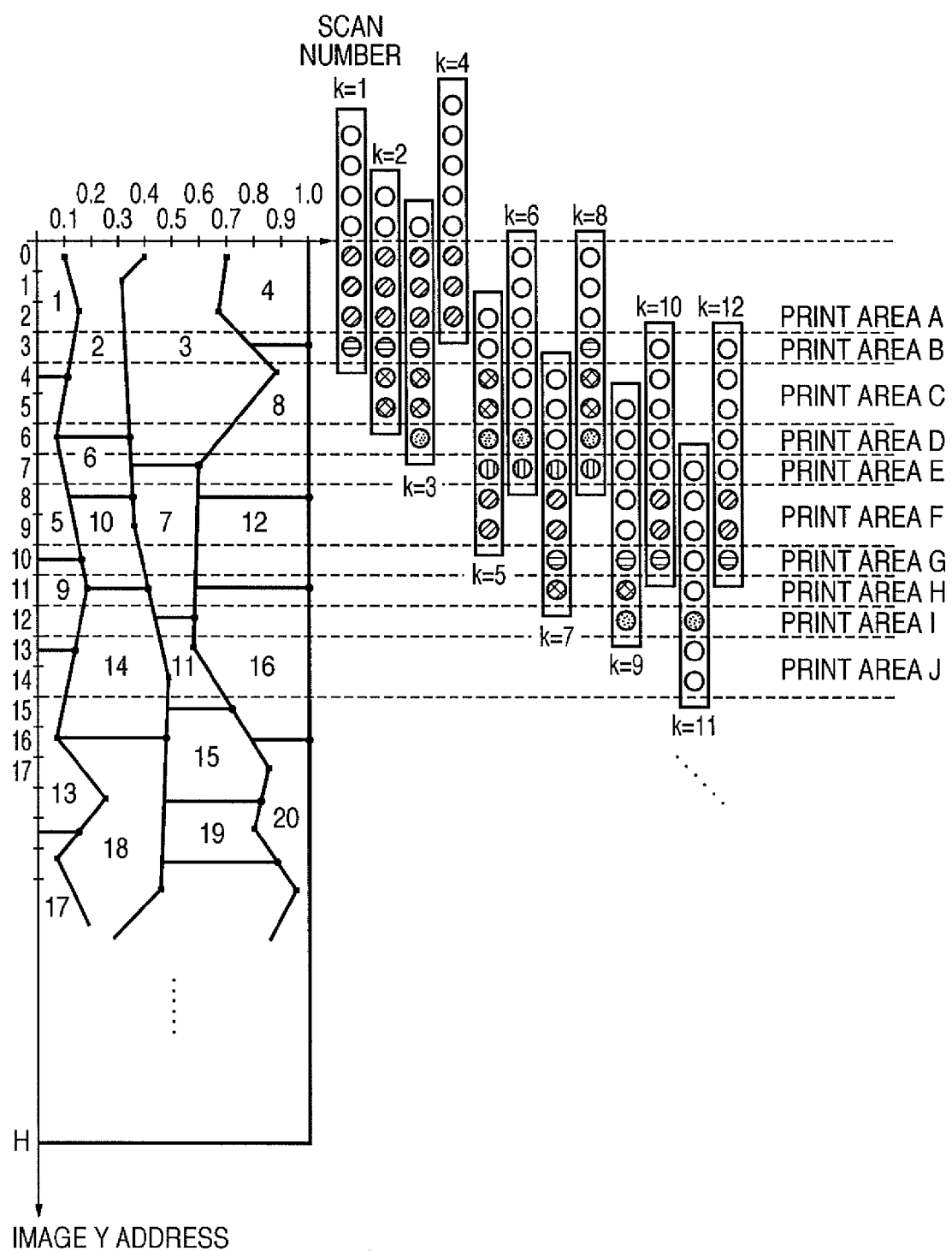
FIG. 14 is a view showing an example of how a print area in each scan is associated with the number of nozzles to be used based on an input duty division table in the embodiment.

FIG. 13 is graph showing an example of an input duty division table in a case in which the same print area of a print medium is formed by four-pass printing. Referring to FIG. 13, the abscissa represents a vertical pixel position i (Y address) of an input image; and the ordinate, a relative division ratio j in each pass with respect to a pixel value (input duty) of a pixel of interest. In addition, the numeral in each area defined by line segments in the table indicates the scan number k. Using this table will determine the scan number k at which a pixel I(X, Y) of interest is printed and a printing ratio at which printing is performed in the scan. FIG. 14 shows an example of how an area printed in each scan is associated with the nozzles to be used when the input duty division table shown in FIG. 13 is used.

Referring to FIG. 14, at scan number k=1, the four lower nozzles of the printhead 201 are used. At scan number k=2, two nozzles are additionally used. At scan number k=3, one nozzle is additionally used. At scan number k=4, only the three lower nozzles are used. Performing these four scans will form a print area A corresponding to the three nozzles used for printing in all the passes. Image formation in the remaining areas is completed by four scans. Obviously, different sheet feeding amounts are set for the respective scans.

Figure 15:
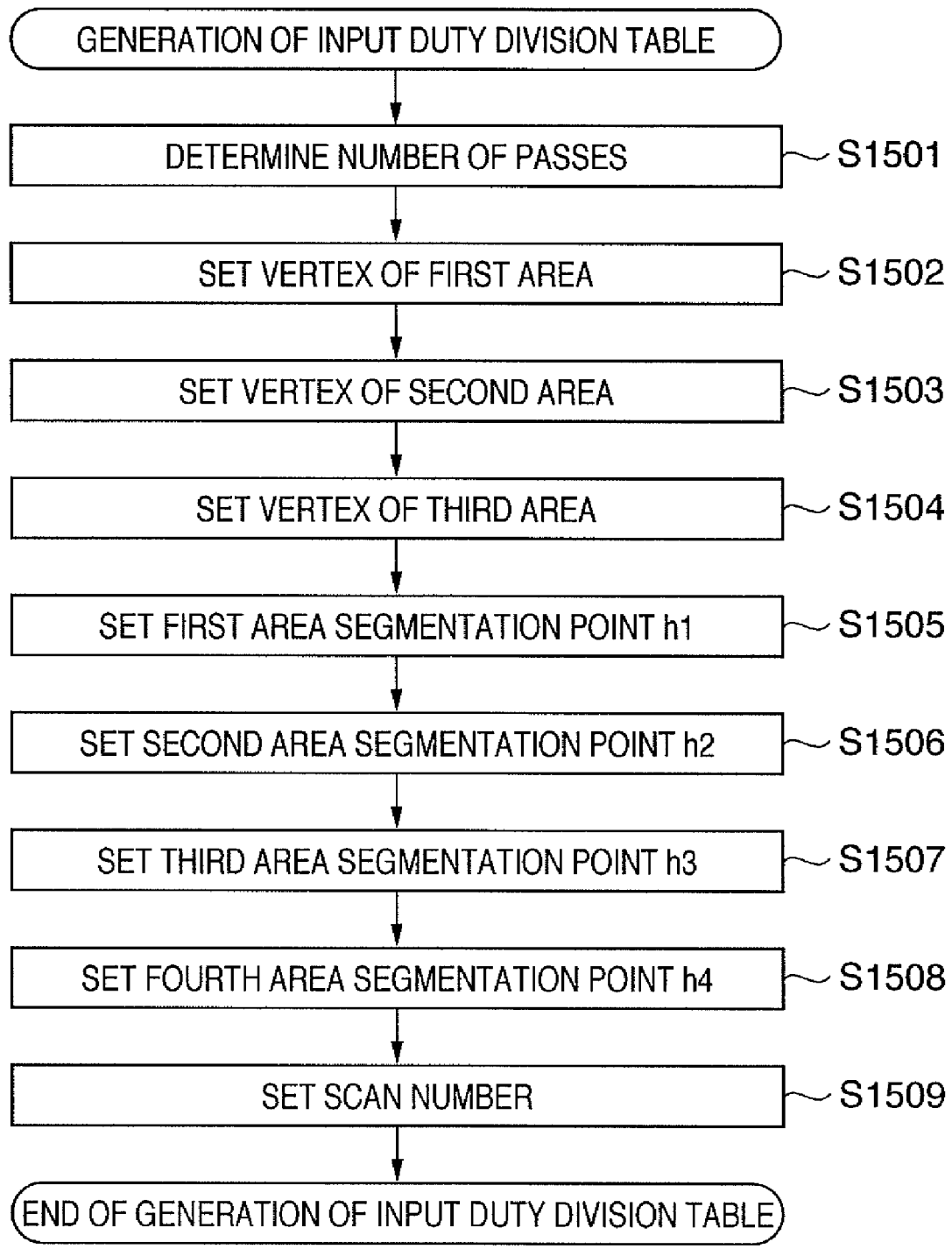
FIG. 15 is a flowchart showing a method of generating an input duty division table in the embodiment.

The method of generating the input duty division table shown in FIG. 13 will be described with reference to the flowchart of FIG. 15. Before the generation of an input duty division table, an area is secured, with the horizontal size corresponding to the vertical size of an input image (one lattice point corresponding to the resolution of an image in the vertical direction) and the vertical size being 1.0 (a lattice with increments of 0.1 from 0 to 1). This area will be referred to as a table area, and coordinates on the abscissa and ordinate are respectively represented by i and j.

First of all, the number of passes for the formation of the same print area is determined (S1501). The number of passes is often determined in accordance with a print mode or a print medium. This embodiment exemplifies a case in which the same print area is formed by four-pass printing.

Figure 16:
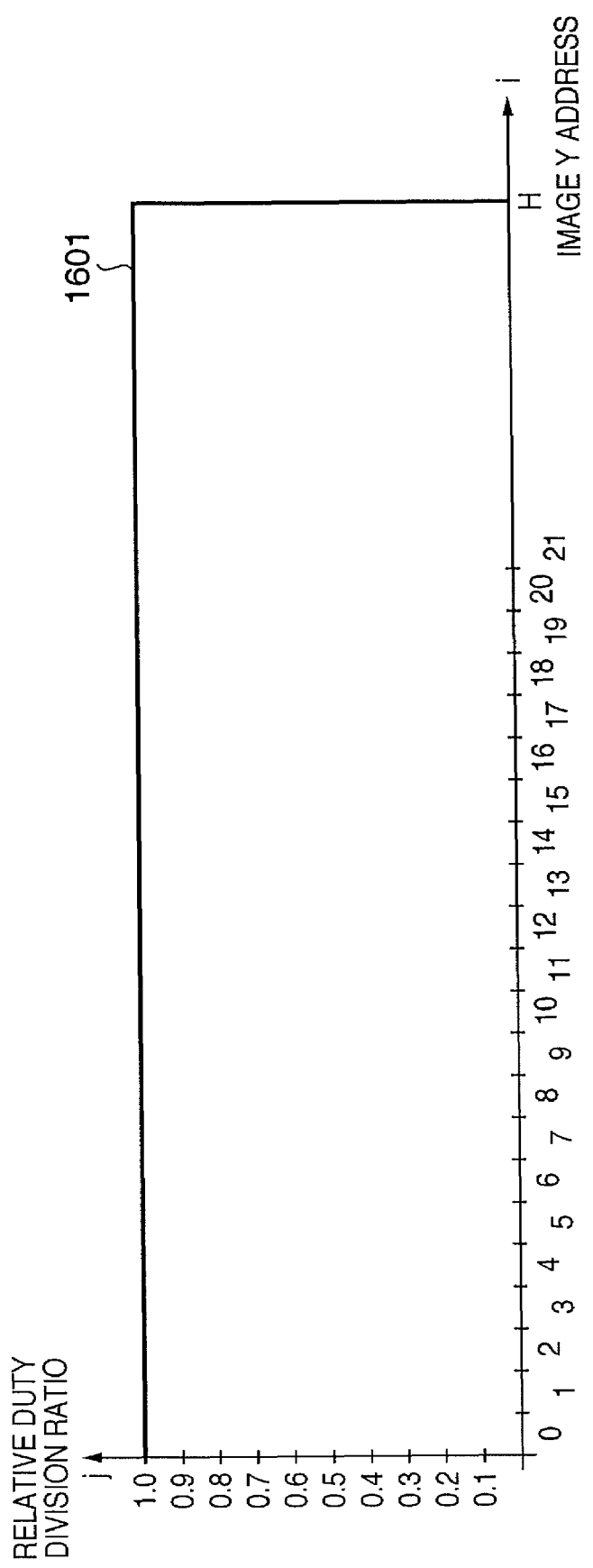
FIG. 16 is a view showing a table area secured to generate an input duty division table in the embodiment.

In order to perform four-pass printing, first of all, the table area shown in FIG. 16 is segmented into four areas in the horizontal direction. This segmentation is performed in steps S1502 to S1504.

First of all, n vertexes for setting the first area are set (S1502). The number of vertexes to be set is not specifically limited. For example, in order to smoothly change the division ratio, it suffices to increase the number of points. In addition, for example, in the case of four-pass printing, the range of the values of vertexes an(i_an, j_an) for setting the first area may be set such that the average of j-coordinate widths is set to a predetermined value (e.g., 0.25) so as not to increase the difference in print data between the respective passes.

Figure 17:
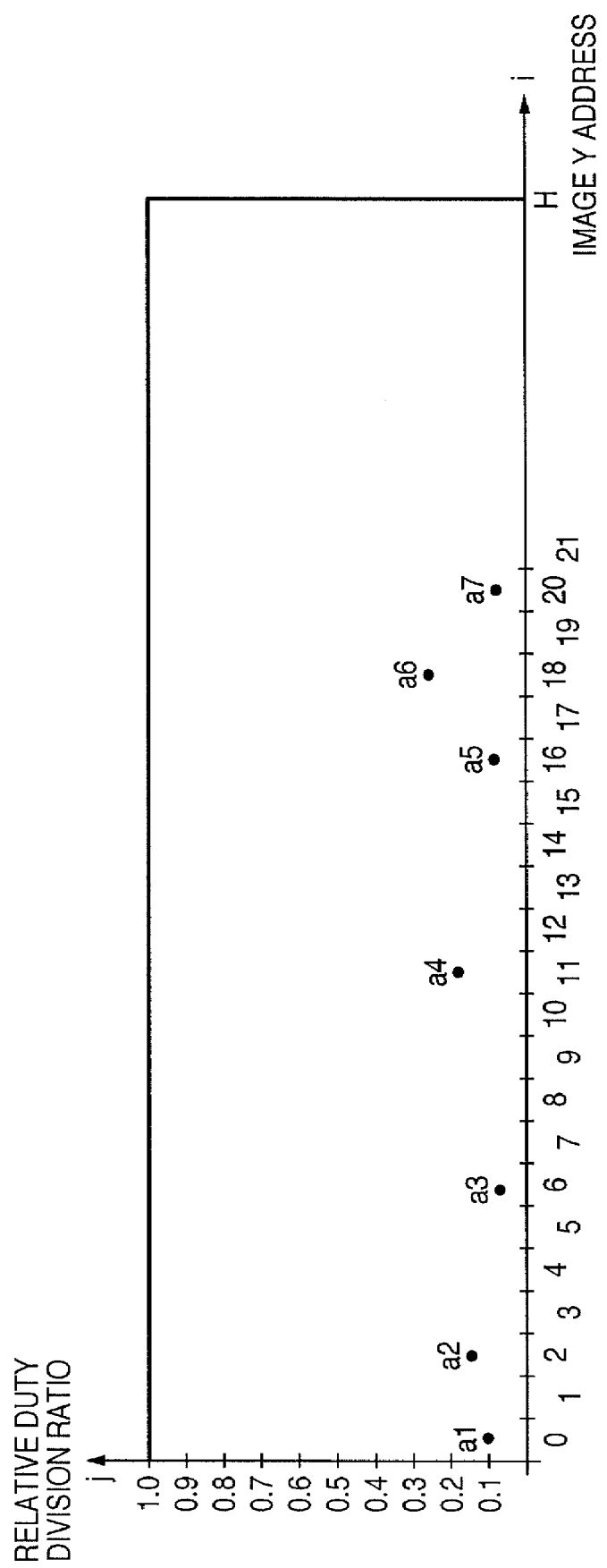
FIG. 17 is a view showing the process of generating an input duty division table in the embodiment.

FIG. 17 shows an example of how vertexes a1 to a7 are set to set the first area. In this case, the i-coordinate of the vertex an satisfies the following inequality. Note that n represents the number of vertexes for setting the first area, and the i-coordinate of the vertex a1 is 0.

$$i\_a1 < i\_a2 < \ldots < i\_an \quad (16)$$

That is, a j-coordinate value is properly set while the i-coordinate satisfies inequality (16). A division ratio is set by this j-coordinate value. The details of this operation will be described in detail later.

Subsequently, n' vertexes for setting the second area are set (S1503). The number of vertexes to be set is not specifically limited. For example, in order to smoothly change the division ratio, it suffices to increase the number of points.

In setting the vertexes of the second area, first of all, a value rn'(i_rn', j_rn') to be referred to for the operation is set. The value rn'(i_rn', j_rn') is set as follows, with the i-coordinate representing the i-coordinate of a vertex of the second area, and the j-coordinate representing the distance from the vertex of the second area to the first area. First of all, the i-coordinate satisfies the following inequality:

$$i\_r1 < i\_r2 < \ldots < i\_rn' \quad (17)$$

For example, in the case of four-pass printing, the range of j-coordinates of rn' may be set such that the average of j-coordinate widths is set to a predetermined value (e.g., 0.25) so as not to increase the difference in print data between the respective passes.

A vertex bn'(i_bn', j_bn') for setting the second area is calculated by using rn' described above according to equations (18) and (19):

$$i\_bn' = i\_rn' \quad (18)$$

$$j\_bn' = j\_rn' + j\_a((n'-1) \cdot n') \quad (19)$$

Figure 18:
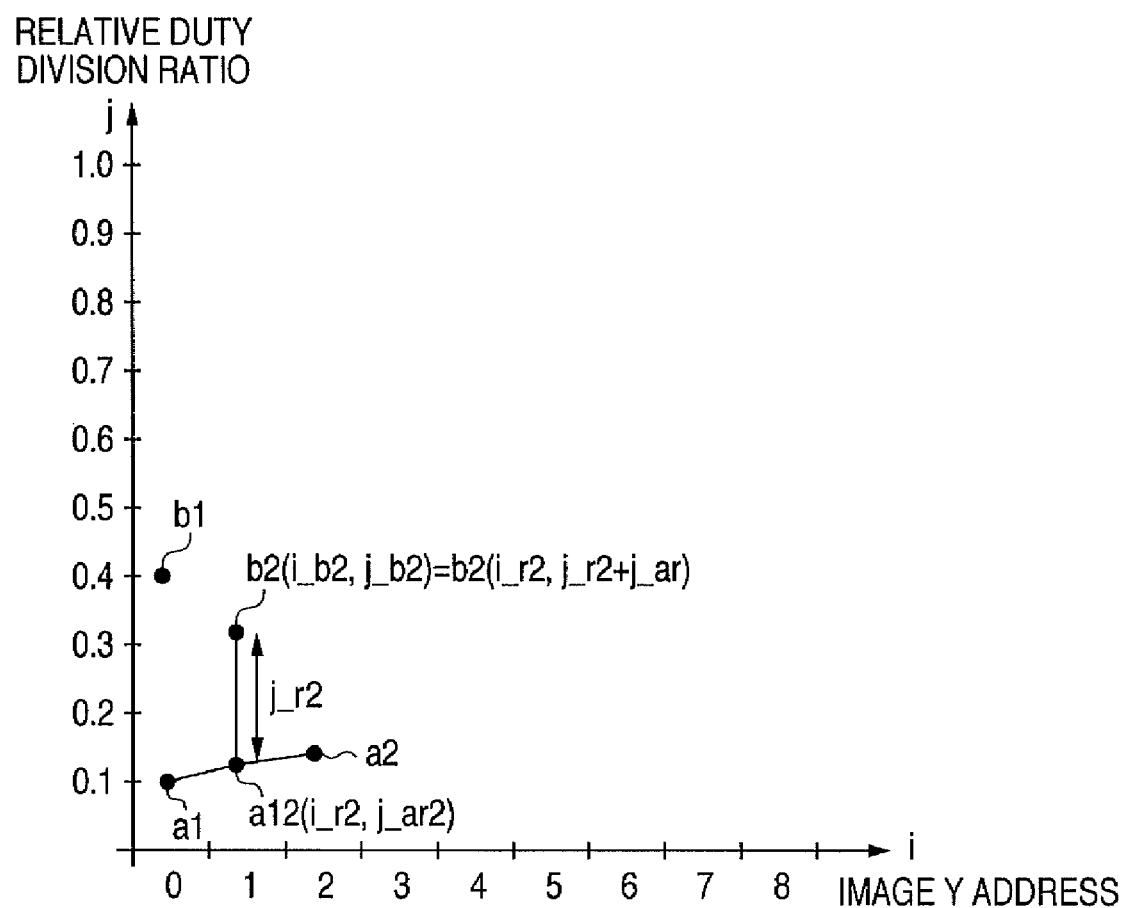
FIG. 18 is a view showing the process of generating the input duty division table in the embodiment.

The calculation of the vertex bn' according to equations (18) and (19) will be described in detail below with reference to FIG. 18. FIG. 18 shows an example of how a vertex b2 of the second area (corresponding to n'=2 in equations (18) and (19)) is set based on the vertexes a1 and a2 of the first area which have already been set. Referring to FIG. 18, the i-coordinate value of b2(i_b2, j_b2) is given by i_b2=i_r2 based on a preset value r2(i_r2, j_r2). The j-coordinate value of b2(i_b2, j_b2) is given by j_b2=j_r2+j_a1·2 based on a point a12(i_r2, j_a1·2) at which the i-coordinate is i_r2. That is, j_a(n'·(n'-1)) of equation (19) is obtained by calculating a point (a12 in FIG. 18) at which the i-coordinate is i_rn' on a line segment an–a(n–1) forming the first area from the point bn' by linear interpolation of a point an and a point a(n–1).

Figure 19:
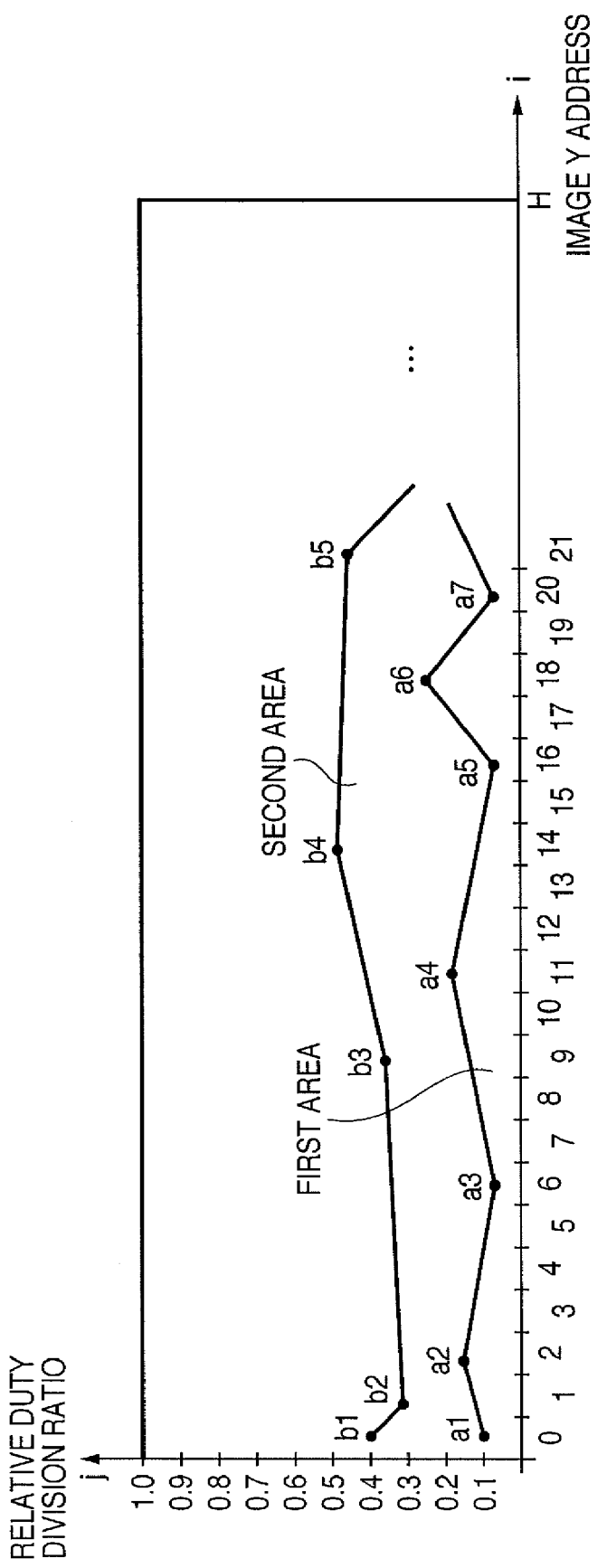
FIG. 19 is a view showing the process of generating the input duty division table in the embodiment.

FIG. 19 shows an example of how vertexes b1 to b5 for setting the second area are set.

Figure 20:
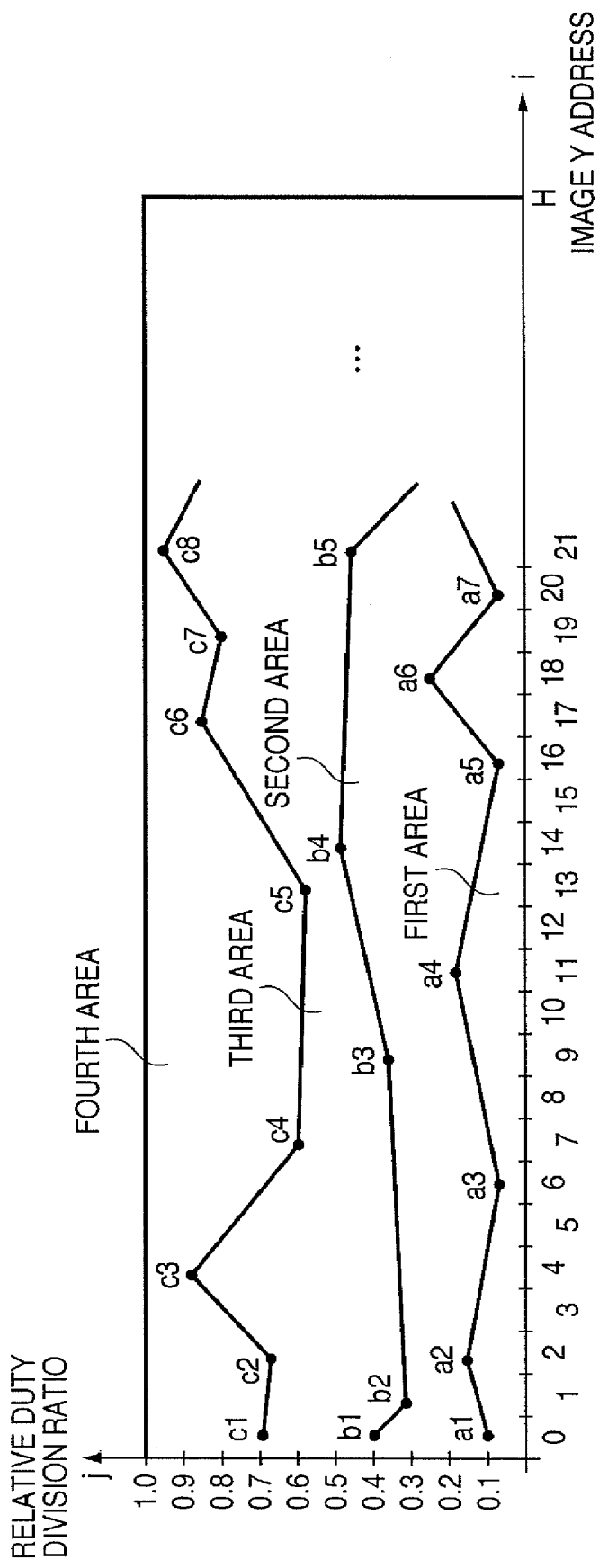
FIG. 20 is a view showing the process of generating the input duty division table in the embodiment.

Likewise, a vertex cn for the third area is set (step S1504). FIG. 20 shows an example of vertexes c1 to c8 for setting the third area. In this case, the remaining area is set as the fourth area.

The first to fourth areas set by segmenting the table area into four areas in the above manner correspond to the areas formed by the first to fourth passes in four-pass printing.

In order to determine how many nozzles are used at what scan in each of the first to fourth areas, segmentation points of the respective areas are set in steps S1505 to S1508. Note that the distances between the segmentation points of the respective areas represent the numbers of nozzles to be used, and the difference between the segmentation points of adjacent areas corresponds to a sheet feeding amount.

First of all, to segment the first area into a plurality of areas in the image vertical direction, a point h1n is set on a line defining the first area, and a perpendicular line is drawn from the point in the i-axis direction (S1505). In this case, the point h1n(i_h1n, j_h1n) represents the relation indicated by inequality (20). In addition, as indicated by equation (21), a difference Δh between the respective points needs to be equal to or less than the length of the nozzles.

$$i\_h11 < i\_h12 < \ldots < i\_h1n \text{ (n is the number of vertexes)} \quad (20)$$

$$\Delta h = |i\_h1n - h1(n-1)| < Nzzl \quad (21)$$

This is because, as is obvious from FIG. 14 described above, a width Δh of a plurality of areas segmented by the point h1n corresponds to the number of nozzles to be used to print the area.

Figure 22:
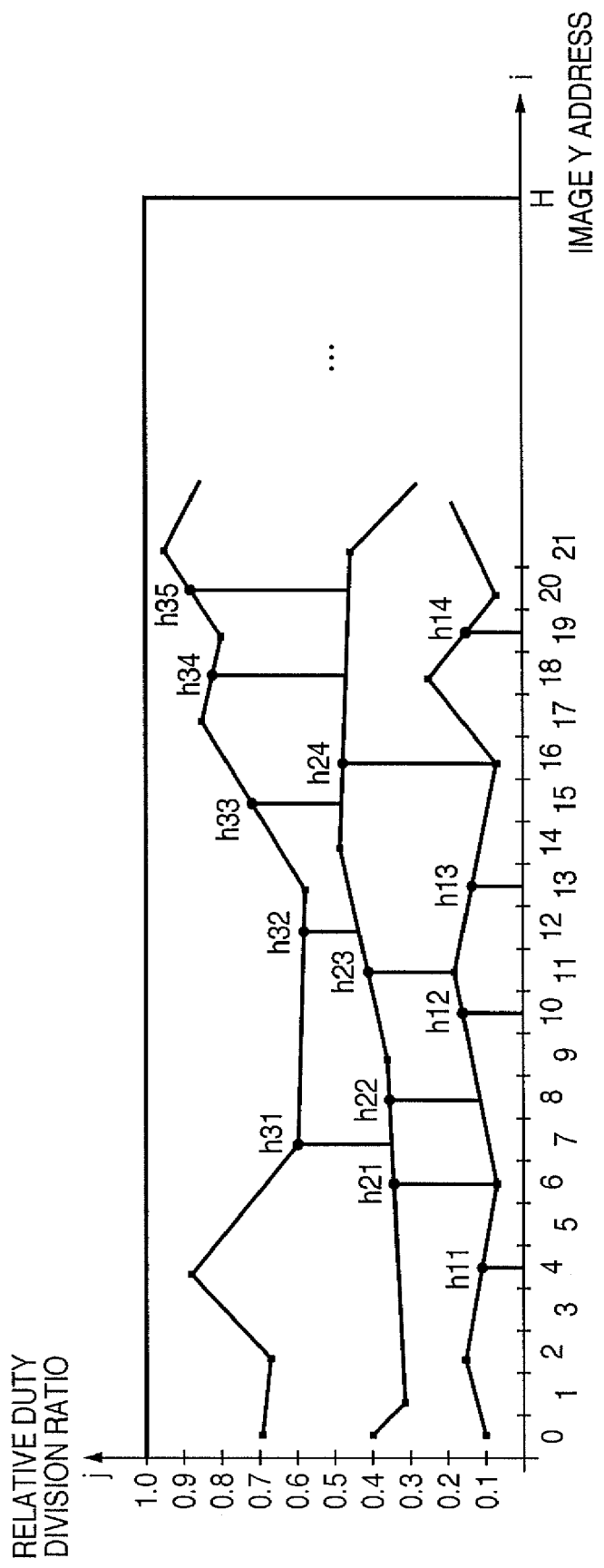
FIG. 22 is a view showing the process of generating the input duty division table in the embodiment.
Figure 23:
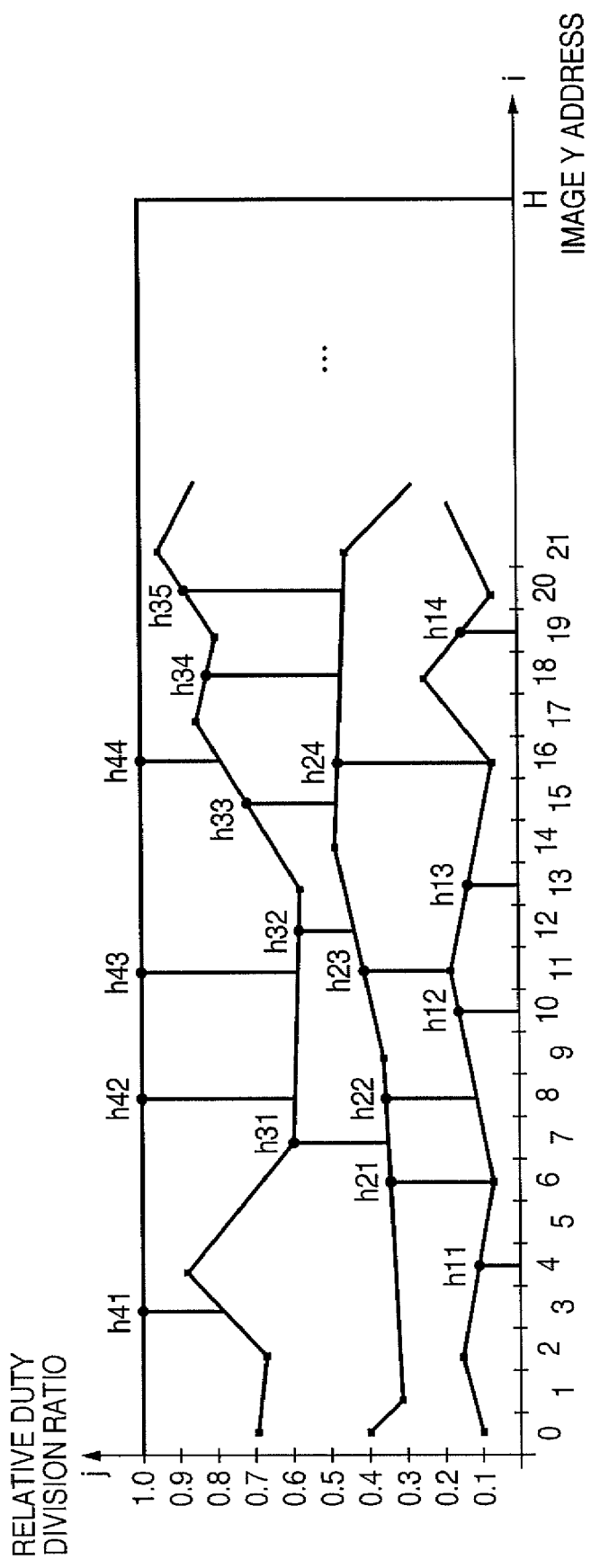
FIG. 23 is a view showing the process of generating the input duty division table in the embodiment.

For each of the second to fourth areas, in the same manner as described above, an area segmentation point h is set, and each area is segmented into a plurality of areas in the i-axis direction, as shown in FIGS. 22 and 23 (S1506 to S1508).

When each area is vertically segmented in the above manner, scan numbers are assigned to a plurality of polygonal areas defined by the perpendicular lines drawn from the area segmentation points h (S1509). The following is a rule for assigning scan numbers. First of all, the scan number "1" is assigned to the leftmost area of the first area, and the scan number "2" is assigned to the polygonal area (the leftmost area of the second area) located above the first area. Scan numbers are sequentially assigned according to the same rule, thereby assigning the following scan numbers to the respective areas:

first area: scan number (4n+1)
second area: scan number (4n+2)
third area: scan number (4n+3)
fourth area: scan number (4n+4)

In the above manner, an input duty division table like that shown in FIG. 13 is generated based on the number of times the same print area is scanned and the number of printing elements to be used in each scan. That is, this embodiment allows to generate an input duty division table by arbitrarily setting the number of times the same print area is scanned and the number of printing elements to be used in each scan.

The contents set in an input duty division table will be described in detail below.

FIG. 14 described above shows the relationship between the nozzles to be used in each scan and the print areas on the image in an input duty division table.

Referring to FIG. 14, for example, in a print area A in the main scanning direction of an input image, the nozzles corresponding to the lower ½ part of the nozzle array are used at scan number k=1. After the sheet is fed by ¼ the length of the nozzles, a scan at scan number k=2 is performed. After the sheet is fed by ⅛ the length of the nozzles, a scan at scan number=3 is performed. In this manner, scans are sequentially performed. At this time, the division ratio of a pixel of interest is determined by the j-axis value of the input duty division table.

Figure 25:
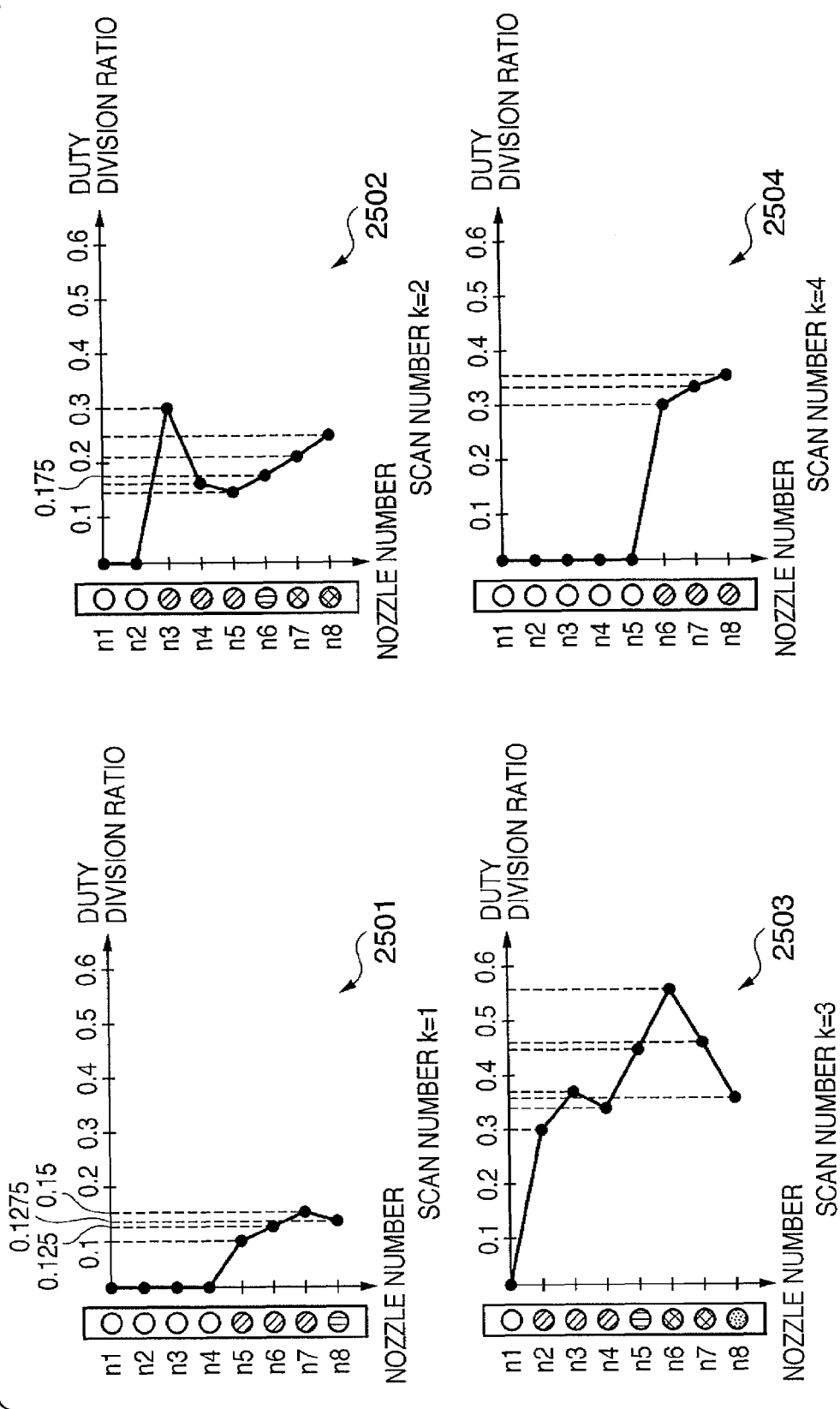
FIG. 25 is a view showing an example of how an input duty division ratio corresponding to scan number k=1 to 4 is set based on the input duty division table in the embodiment.

For example, at scan number k=1, input duty division ratios are set for the respective nozzles as indicated by reference numeral 2501 in FIG. 25. In this case, input duties based on the j values corresponding to i=0 to 3 are assigned to the four lower nozzles n5 to n8, and no duty is assigned to the four upper nozzles n1 to n4. In the example in FIG. 25, division ratios are calculated as real numbers from 0 to 1 by performing linear interpolation between the vertexes of the respective areas.

Reference numerals 2502 and 2503 in FIG. 25 respectively denote input duty division ratios for the respective nozzles at scan number k=2 and 3. For example, in the case of scan number k=2, as denoted by reference numeral 2502, no input duty is assigned to the nozzles n1 and n2, and input duties are assigned to the nozzles n3 to n8 based on the j values corresponding to i=0 to 5. Obviously, the assigned amounts at this time are obtained by subtracting the assigned amounts for the previous assigned amount (scan number k=1) from the j values. As in the case of scan number k=3, the duties obtained by subtracting the assigned amounts at scan number k=1 and 2 from the j values are assigned.

The input duty division ratios corresponding to the respective nozzles at scan number k=4, which are denoted by reference numeral 2504 in FIG. 25, are calculated by subtracting the sum of the division ratios at scan number k=1, 2, and 3 from 1 such that the sum of division ratios in each pass in the same area becomes 1. In the case in which the number of printing passes is four, each division ratio at scan number k=(4n+4) is calculated by subtracting the sum of the division ratios at scan numbers k=(4n+1), k=(4n+2), and k=(4n+3) from 1. This makes the sum of duties after segmentation become equal to the input duty.

Figure 26:
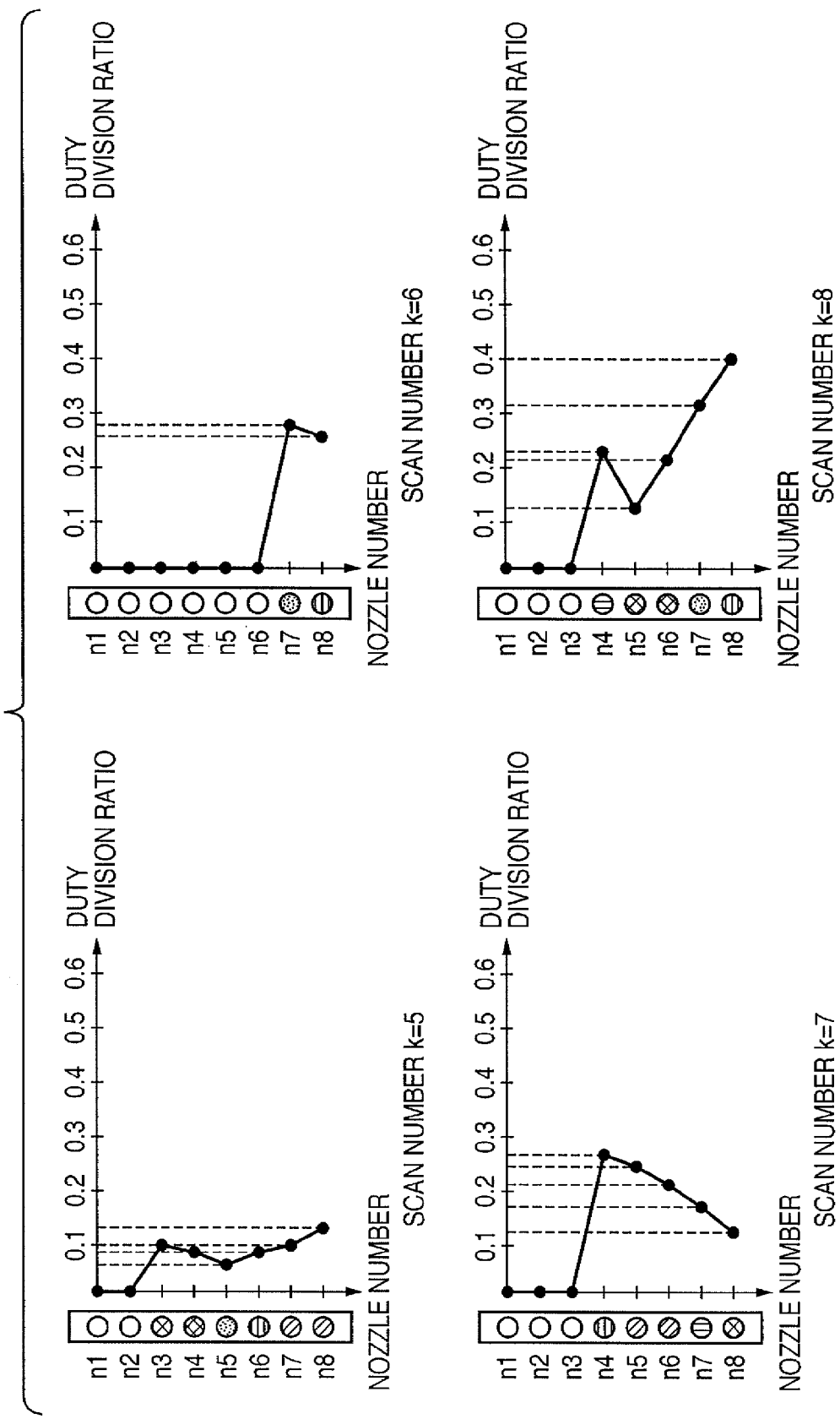
FIG. 26 is a view showing an example of how an input duty division ratio corresponding to scan number k=5 to 8 is set based on the input duty division table in the embodiment.

FIG. 26 shows an example of how input duty division ratios corresponding to scan number k=5 to 8 are set based on the input duty division table shown in FIG. 14. In the example in FIG. 26, division ratios are assigned to the respective passes in the same manner as in the example in FIG. 25.

In this embodiment, since multi-pass printing is performed by four passes, the sum of scan duties after segmentation becomes equal to an input duty for every four scan numbers like scan number k=1 to 4 and 5 to 8.

Figure 24:
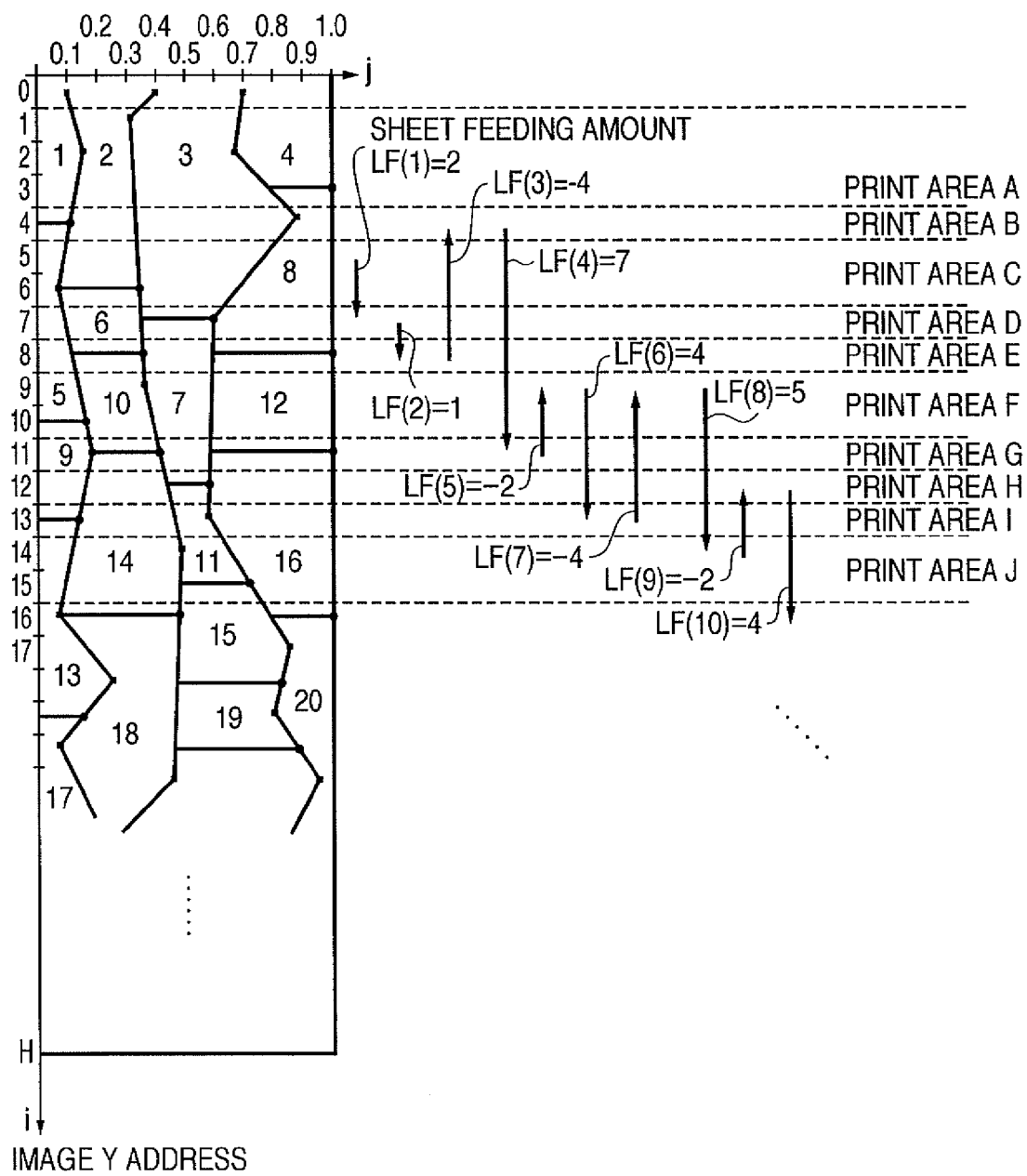
FIG. 24 is a view showing the sheet feeding amounts set by the input duty division table in the embodiment.

In addition, the sheet feeding amount LF(k) is calculated from the difference between the segmentation points h in the respective areas. FIG. 24 shows the sheet feeding amount LF(k) after each scan which is set by the input duty division table. Referring to FIG. 24, the sheet is fed in the arrow direction. For example, the sheet feeding amount after the scan at scan number k=1 is LF(1)=2 in accordance with the difference between h11 and h12 in FIG. 22. As is also obvious from FIG. 24, in this embodiment, the sheet feeding amount LF(k) after each scan changes. That is, the sheet feeding amount LF(k) has no constant periodicity.

The print data setting LUT 106 in this embodiment stores the following three types of values calculated for each scan number k based on the input duty division table generated by the above method: 1) the color separation data extraction position Ycut(k), 2) the division ratio of input data for each nozzle, and 3) the sheet feeding amount LF(k) after each scan.

As exemplified above, performing assignment like that shown in FIG. 25 based on the input duty division table shown in FIG. 14 will set division ratios in the print data setting LUT 106 as shown in FIG. 7 described above.

An input duty division table and the print data setting LUT 106 can be generated in real time for each printing operation. However, they may be generated in advance in optimal forms to obtain high-quality final images. When they are to be generated for each printing operation, it suffices to generate a input duty division table at the timing when the vertical size of an input image is acquired.

In generating an input duty division table, it suffices to generate a table by securing a memory area corresponding to the number of lattice points shown in FIG. 16. It is also possible to randomly generate the data of area segmentation points and indicate their relationship with a pointer. In this case, the print data setting LUT 106 is generated by storing the relationship between the i-coordinates of area segmentation points a to d and h and scan numbers before and after the points.

The above is the description of the input duty division table in this embodiment.

Referring back to FIG. 3, when print data is stored in the print data memory 107 in step S105, the halftoning unit 108 performs halftoning to convert the print data stored in the print data memory 107 into data with fewer tone levels (S106). In this case, the tone value of each pixel data of the input image is eight bits, and is converted into data with a tone value (binary data) corresponding to two levels after halftoning.

Figure 27:
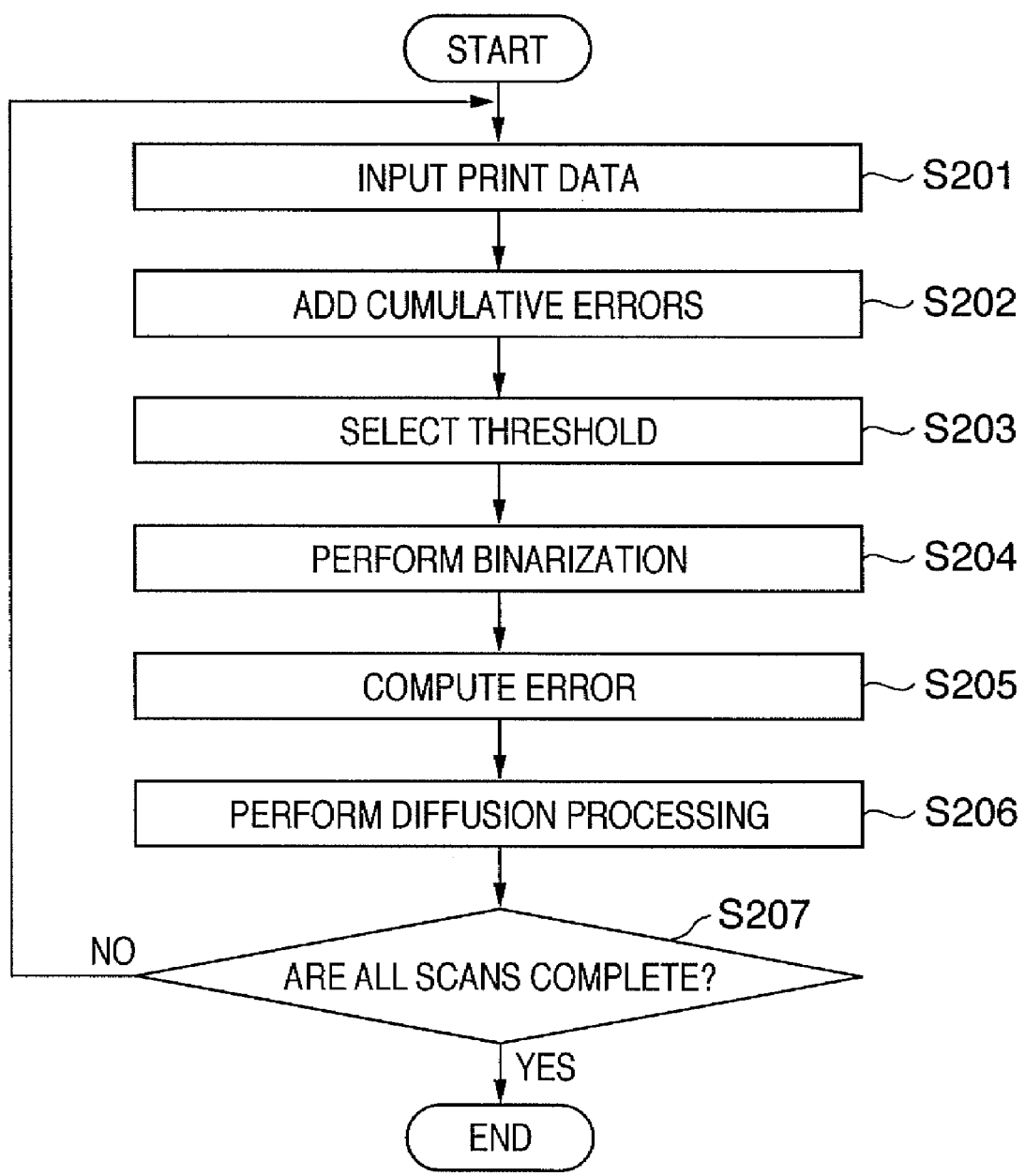
FIG. 27 is a flowchart showing halftoning in the embodiment.
Figure 29:
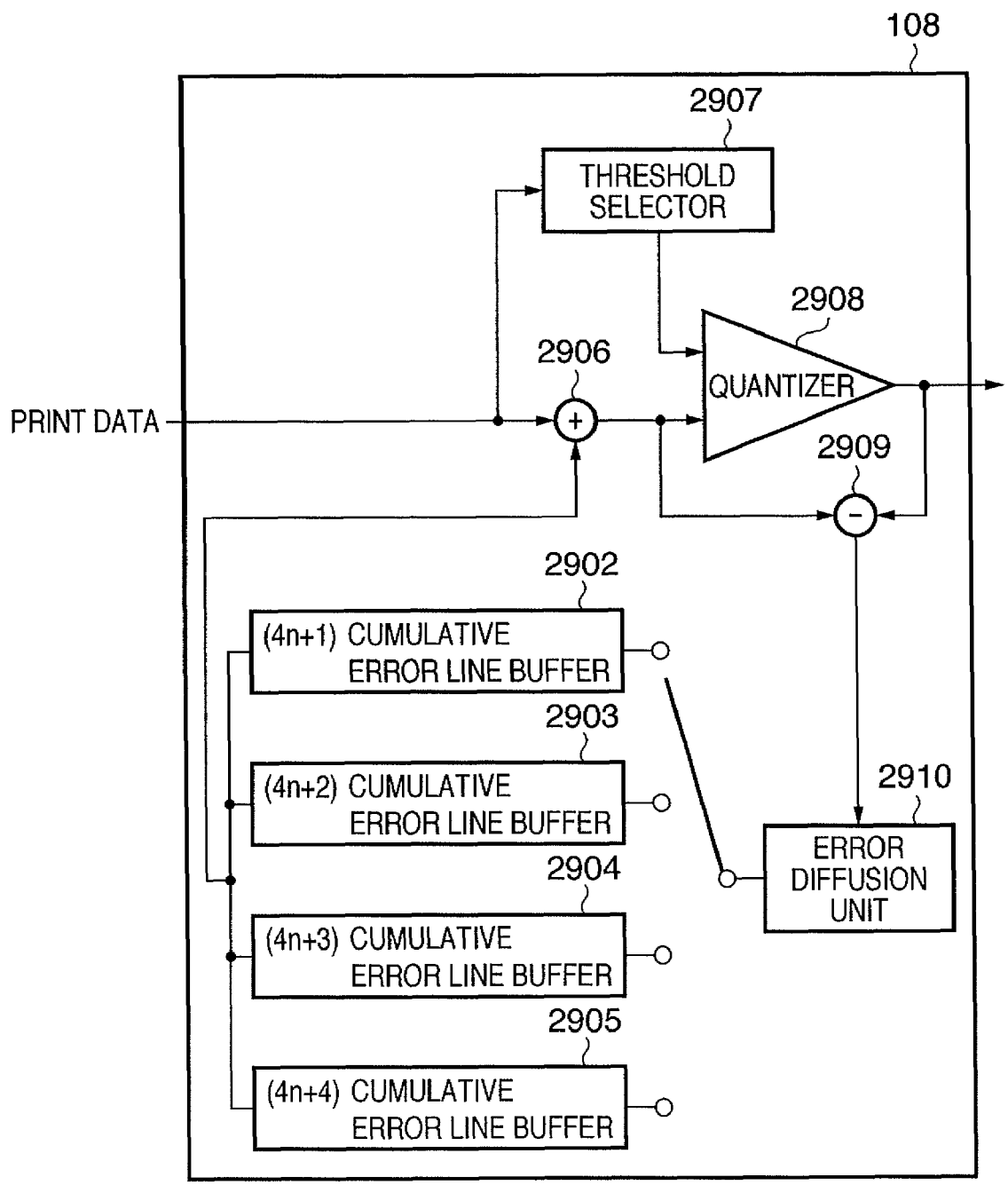
FIG. 29 is a block diagram showing the detailed arrangement of a halftoning unit in the embodiment.

In halftoning in this embodiment, for example, a known error diffusion method is used as the processing of converting multi-level input image data into a binary image. Halftoning in this embodiment will be described in detail below with reference to the flowchart of FIG. 27 and the block diagram of FIG. 29. For simplicity, assume that halftoning is performed for cyan data in four-pass printing at scan number k=1. FIG. 27 is a flowchart showing the details of halftoning in the halftoning unit 108. FIG. 29 is a block diagram showing the detailed arrangement of the halftoning unit 108.

In step S201 in FIG. 27, cyan print data C_d is input to the halftoning unit 108.

In step S202, cumulative errors are added for error diffusion processing. The addition processing of cumulative errors will be described in detail below.

Figure 28:
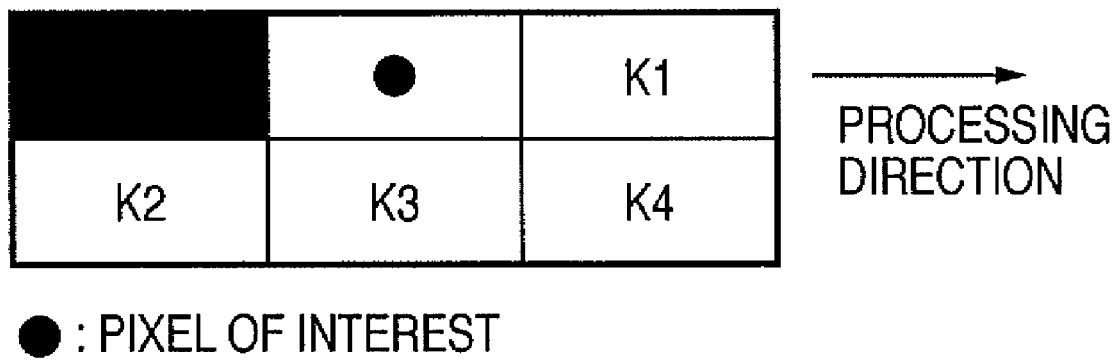
FIG. 28 is a view showing an example of error diffusion coefficients in the embodiment.

Assume that this embodiment has four coefficients K1 to K4 as error diffusion coefficients for error diffusion processing, as shown in FIG. 28. Assume that $K1=7/16$, $K2=3/16$, $K3=5/16$, and $K4=1/16$. However, there is no need to fix diffusion coefficients in the above manner. It suffices to change them in accordance with a tone level (e.g., C_d) or have more coefficients instead of the above four coefficients.

In order to diffuse and accumulate errors by using such error diffusion coefficients, the halftoning unit 108 secures four cumulative error line buffers 2902 to 2905 for cyan, and switches the cumulative error line buffers to be used for each scan number, for example, as follows:

"When scan number k=1, 5, . . . , 4n+1 (n is an integer equal to or more than 0)", the (4n+1) cumulative error line buffer 2902 is used.

"When scan number k=2, 6, . . . , 4n+2", the (4n+2) cumulative error line buffer 2903 is used.

"When scan number k=3, 7, . . . , 4n+3", the (4n+3) cumulative error line buffer 2904 is used.

"When scan number k=4, 8, . . . 4n+4", the (4n+4) cumulative error line buffer 2905 is used.

Figure 30:
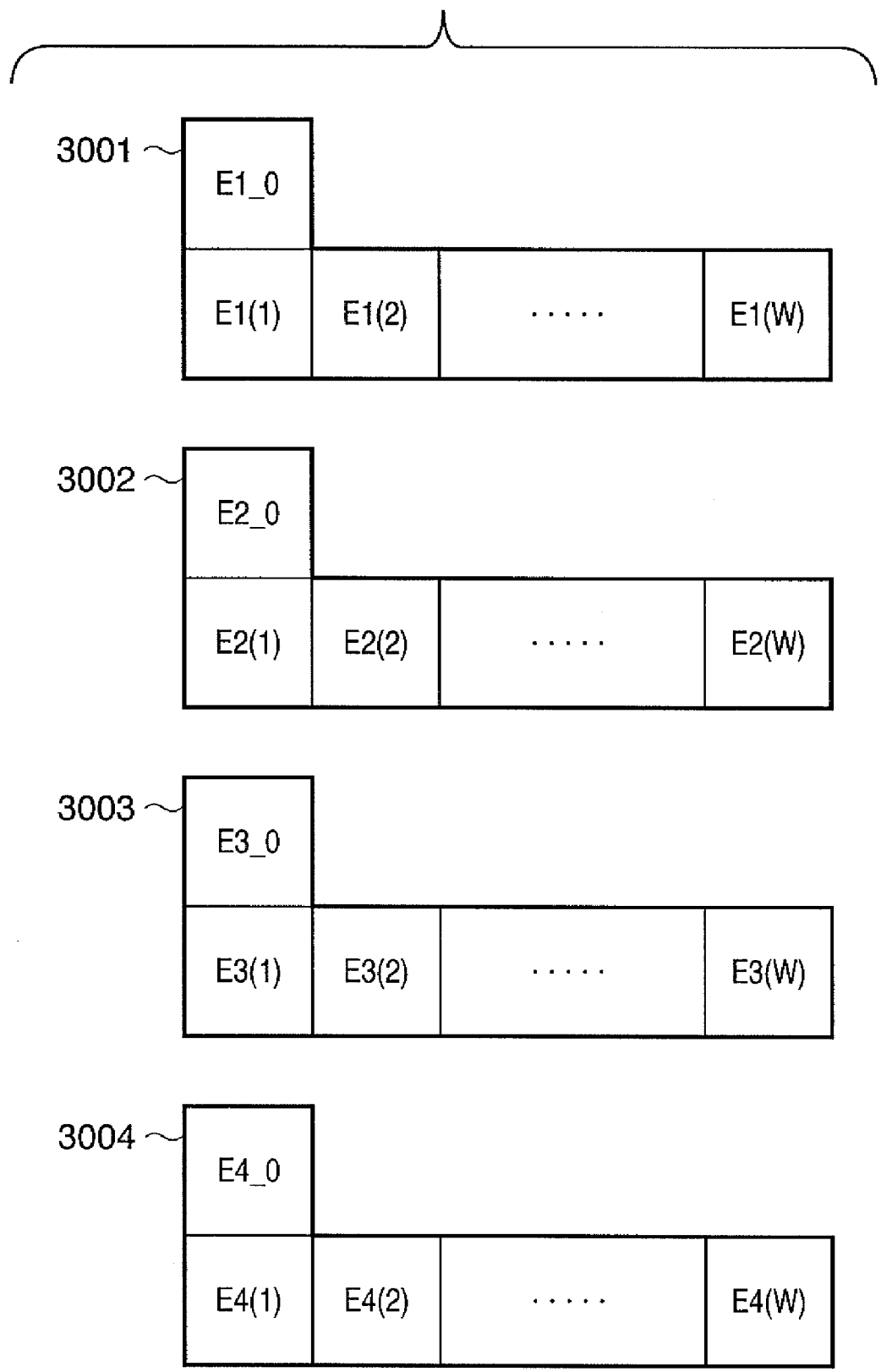
FIG. 30 is a view showing the storage area of each cumulative error line buffer in the embodiment.

Note that cumulative error line buffers 2902, 2903, 2904, and 2905 respectively comprise four sets of storage areas 3001 to 3004 in FIG. 30. That is, these sets of storage areas are respectively represented by "E1_0, E1(x)", "E2_0, E2(x)", "E3_0, E3(x)", and "E4_0, E4(x)". For example, the (4n+1) cumulative error line buffer 2902 includes one storage area E1_0 and storage areas E1_(x) (x=1 to W) equal in number to a number W of horizontal pixels of the input image. In addition, all the cumulative error line buffers 2902, 2903, 2904, and 2905 are initialized to the initial value "0" only at the start of processing at scan number k=1, 2, 3, and 4. For example, at the start of processing at scan number k=5, the (4n+1) cumulative error line buffer 2902 is not initialized.

In this embodiment, halftoning for one color requires the above four cumulative error line buffers, and hence it is necessary to prepare such line buffers for six colors. That is, a total of 4×6=24 line buffers are required.

In order to exemplify halftoning at scan number k=1, assume that error diffusion processing is executed by using the (4n+1) cumulative error line buffer 2902. In step S202, a cumulative error adder 2906 adds an error E1(x) corresponding to a horizontal pixel position x of input data to an input print data value. Letting C_d be the input print data of a pixel of interest, and C_d' be data after cumulative error addition, the following equation holds:

$$C\_d'=C\_d+E1(x) \quad (22)$$

In step S203, a threshold selector 2907 selects a threshold T. The threshold T is set, for example, as follows:

$$T=128 \quad (23)$$

Alternatively, in order to prevent a dot generation delay, the threshold T may be finely changed as follows in accordance with the input print data C_d of the pixel of interest:

$$T=f(C\_d) \quad (24)$$

Alternatively, the threshold may be finely changed as follows in accordance with an address (X, Y) in the band:

$$T=f(X, Y) \quad (25)$$

In step S204, a quantizer 2908 compares the pixel data C_d' after error addition with the threshold T, and determines Out_c which is the result of dot binarization processing. The following is the rule for this operation:

if C_d'<T, $$Out\_c=0 \quad (26)$$

if C_d'≧T, $$Out\_c=255 \quad (27)$$

In step S205, an error computing unit 2909 calculates an error Err between the pixel data C_d' obtained by adding an error to the print data C_d of the pixel of interest and the output pixel value Out_c as follows:

$$Err(x)=C\_d'-Out\_c \quad (28)$$

In step S206, an error diffusion unit 2910 diffuses the error. That is, the error diffusion unit 2910 performs diffusion processing for the error Err(x) corresponding to the horizontal pixel position x by using the (4n+1) cumulative error line buffer 2902 as follows:

$$E1(x+1) \leftarrow E1(x+1)+Err(x)\times 7/16 \ (x<W)$$

$$E1(x-1) \leftarrow E1(x-1)+Err(x)\times 3/16 \ (x>1)$$

$$E1(x) \leftarrow E1\_0+Err(x)\times 5/16 \ (1<x<W)$$

$$E1(x) \leftarrow E1\_0+Err(x)\times 8/16 \ (x=1)$$

$$E1(x) \leftarrow E1\_0+Err(x)\times 13/16 \ (x=W)$$

$$E1\_0 \leftarrow Err(x)\times 1/16 \ (x<W)$$

$$E1\_0 \leftarrow 0 \ (x=W) \quad (29)$$

With the above operation, the binarization processing (quantization values 0 and 255) for one cyan pixel at scan number k=1 is complete.

Performing the processing in steps S201 to S206 described above for all the pixels (addresses (0, 0) to (W−1, Nzzl−1)) in the band (S207) can generate halftone image data.

The above description is about scan number k=1. With regard to scan number k=2 to 4, the above halftoning is performed by using the cumulative error line buffers 2903 to 2905, respectively. In processing at scan number k=5, the (4n+1) cumulative error line buffer 2902 which is the same line buffer as that used at scan number k=1 is used without being initialized (without being fully assigned with 0s). This is because, as shown in FIG. 14, since the print areas corresponding to scan number k=1 and scan number k=5 are vertically adjacent to each other, the stored cumulative error is directly applied to the lower adjacent area. If the cumulative error line buffer 2902 is initialized at k=5, the error is not stored at the boundary portion adjacent to the area corresponding to k=1, resulting in failure to keep the continuity of dots.

Figure 3:
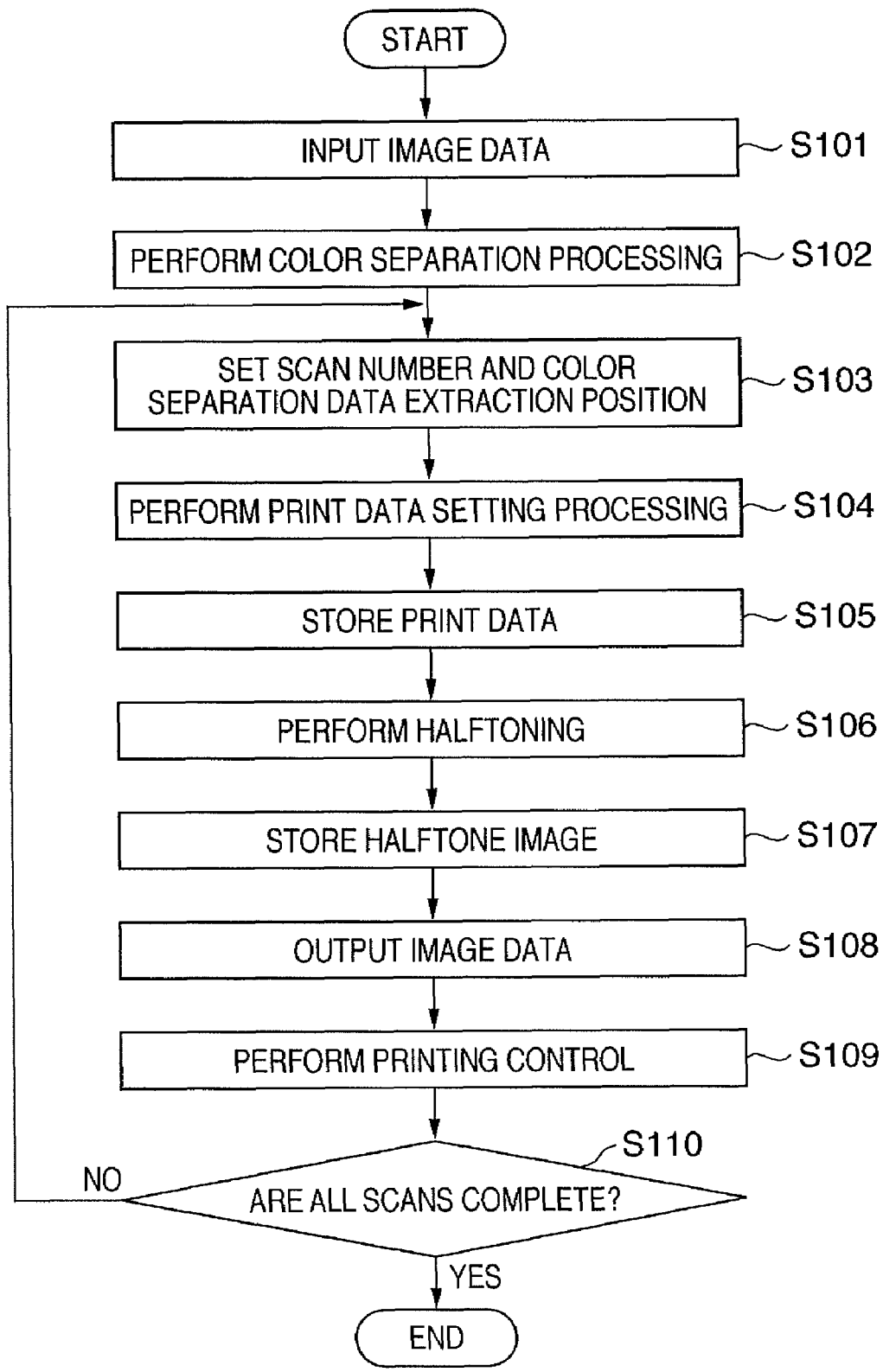
FIG. 3 is a flowchart showing image formation processing in this embodiment.
Figure 31:
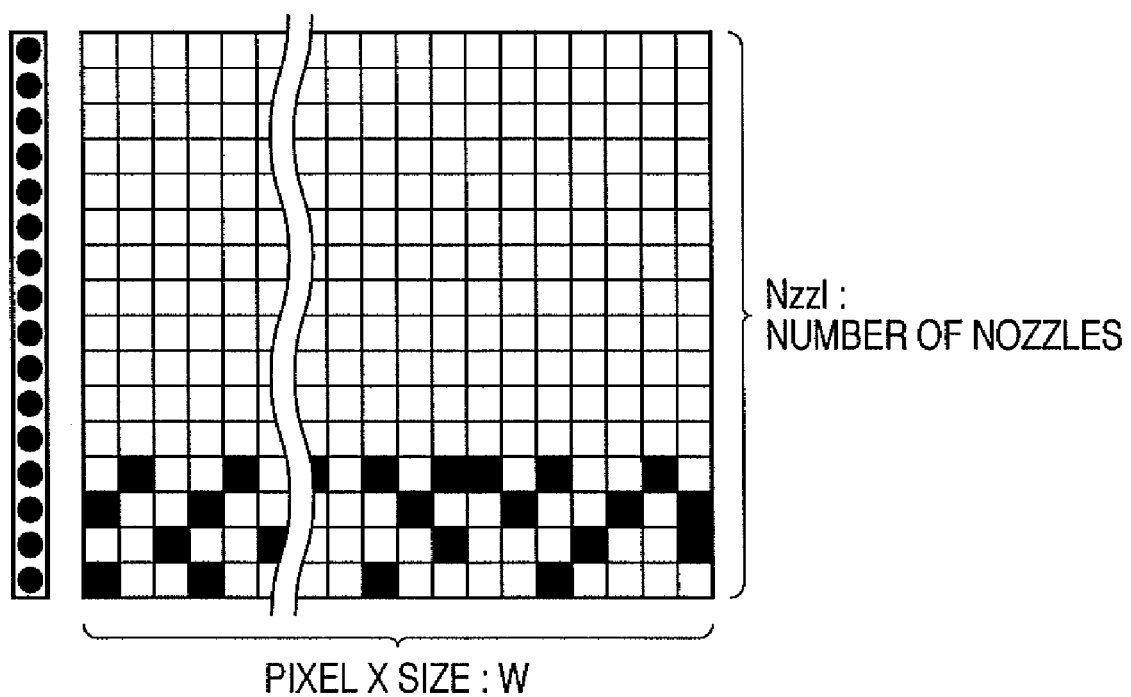
FIG. 31 is a view showing an example of how a halftoning result is stored in the embodiment.

Referring to back to FIG. 3, when the halftoning in step S106 is terminated in the above manner, the binary image data after the halftoning is stored in the halftone image memory 109 (S107). FIG. 31 shows how the result obtained by halftoning the print data at scan number k=1 is stored in the halftone image memory 109. As shown in FIG. 31, the halftone image memory 109 stores binary image data equivalent to (the number of nozzles: Nzzl)×(image X size: W) corresponding to the pixel positions of print data.

As is also obvious from FIG. 31, halftoning in this embodiment sequentially generates binary image data from the data stored in the print data memory 107, with the vertical direction representing the number of nozzles and the horizontal direction representing the image X size. Therefore, as the halftone image memory 109, a memory space corresponding to band data with the vertical direction representing the number of nozzles and the horizontal direction representing the image X size is prepared.

In the above manner, the halftoning at scan number k=1 is complete. As a result, a binary image to be formed by one head operation for each color is stored in the halftone image memory 109 for each color.

Note that the quantization technique used by the halftoning unit 108 in this embodiment is not limited to the above error diffusion method. For example, the halftoning unit 108 can use a dither method such as the blue noise mask method or the Bayer method or a density pattern method. Alternatively, it is possible to use a combination of these methods.

The band data stored in the halftone image memory 109, with the vertical direction corresponding to the number of nozzles (Nzzl) and the horizontal direction corresponding to the image X size (W), is output from an image output terminal 112 (S108).

Upon receiving the halftone image data, the printer 2 stores the image data in a halftone image memory 207. The ink color/discharge amount selector 206 then selects an ink color and a discharge amount suitable for the image data, and printing operation starts (S109). In this printing operation, the printhead 201 prints an image on a print medium by driving the respective nozzles at predetermined driving intervals while moving left to right relative to the print medium. Note that this embodiment uses the multi-pass printing method of completing an image by causing the printhead 201 to scan on a print medium a plurality of number of times.

It is then determined whether all scans are complete (S110). If all the scans are complete, the series of image formation processing is complete. If all the scans are not complete, the process returns to step S103. With the above manner, the series of image formation processing for input color image data of multiple tone levels is complete.

As described above, this embodiment allows to arbitrarily set the number of printing elements to be used for each scan, i.e., the feeding amount of a print medium, in multi-pass printing. This makes it possible to achieve an improvement in image quality on an entire print medium by reducing density unevenness due to variations in printing elements, graininess deterioration due to a feeding amount shift, and long-period density unevenness.

<Second Embodiment>

The second embodiment of the present invention will be described below.

The first embodiment has exemplified the case in which in the multi-pass printing method, the number of passes for completing a print area in the main scanning direction of an image is constant (e.g., four passes). The second embodiment exemplifies a case in which the number of passes is variable. Note that the arrangement of an image forming apparatus of the second embodiment is the same as that of the first embodiment, and hence a repetitive description will be omitted.

The number of passes in the second embodiment is controlled by an input duty division table. That is, a characteristic feature of the second embodiment is that the number of passes can be set in accordance with an input duty division table.

Figure 32:
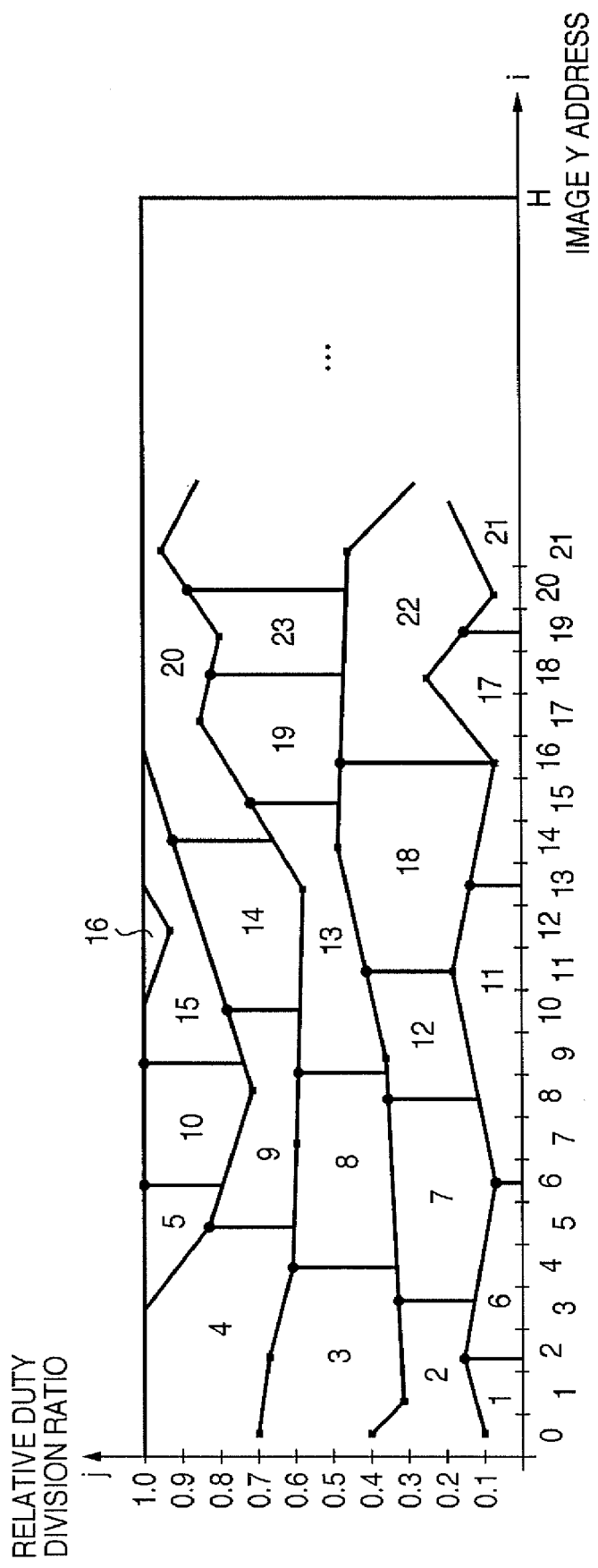
FIG. 32 is a view showing an example of an input duty division table with a variable number of passes in the second embodiment.

FIG. 32 shows an example of an input duty division table generated in the second embodiment. A print data setting LUT 106 shown in FIG. 33 is generated based on this input duty division table. That is, in the second embodiment, the print data setting LUT 106 shown in FIG. 33 contains the information of the number of passes set in the input duty division table shown in FIG. 32.

Figure 34:
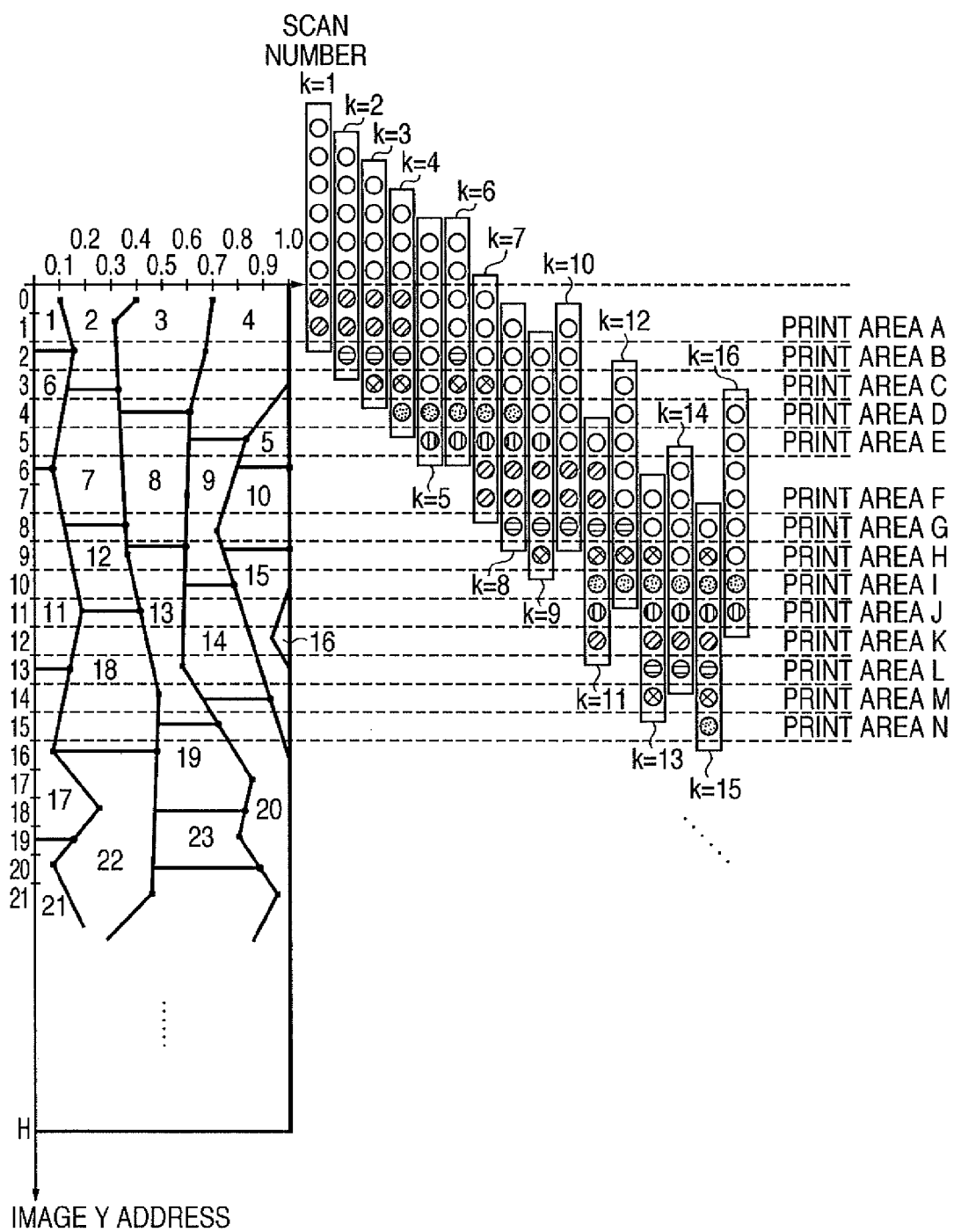
FIG. 34 is a view showing an example of how a print area in each scan is associated with the number of nozzles to be used based on an input duty division table in the second embodiment.

Referring to FIG. 32, the abscissa represents a vertical pixel position i (Y address) of an input image; and the ordinate, a relative division ratio j in each pass with respect to a pixel value (input duty) of a pixel of interest. In addition, the numeral in each area defined by line segments in the table indicates a scan number k. Using this table will determine the scan number k at which a pixel I(X, Y) of interest is printed and a printing ratio at which printing is performed in the scan. FIG. 34 shows an example of how an area printed in each scan is associated with the nozzles to be used when the input duty division table shown in FIG. 32 is used. Although FIG. 34 shows the nozzles to be used and the sheet feeding amount in each scan as in FIG. 14, image formation by four passes is not performed in all the areas. For example, image formation in print areas A to C is performed by four passes, but image formation in print areas D to H is performed by five passes, and image formation in a print area I is performed by six passes.

Figure 35:
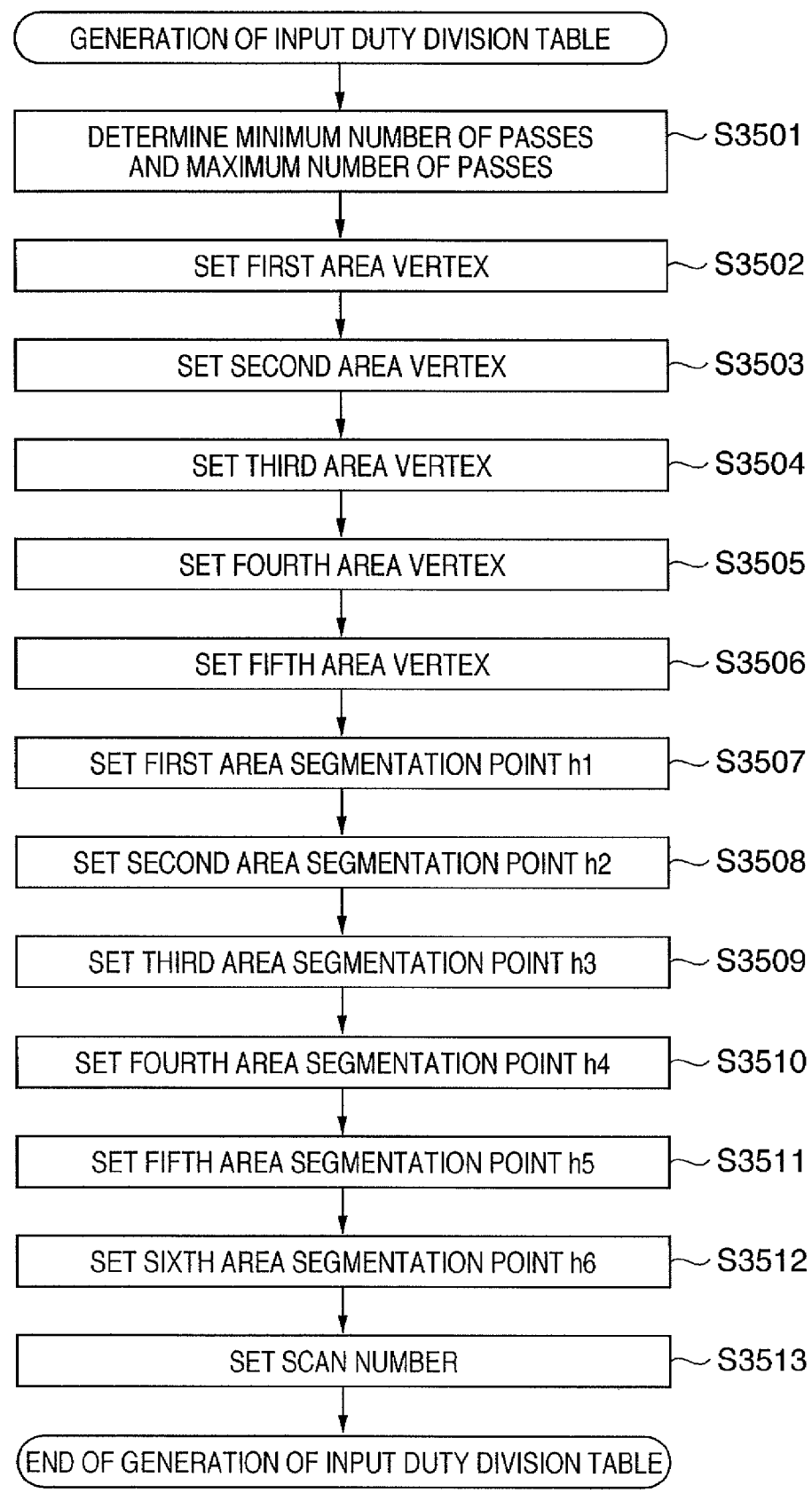
FIG. 35 is a flowchart showing a method of generating an input duty division table in the second embodiment.

The method of generating the input duty division table shown in FIG. 32 will be described with reference to the flowchart of FIG. 35. Before the generation of an input duty division table, an area like that shown in FIG. 16 is secured, with the horizontal size corresponding to the vertical size of an input image (one lattice point corresponding to the resolution of the image in the vertical direction) and the vertical size being 1.0 (a lattice with increments of 0.1 from 0 to 1). This area will be referred to as a table area, and coordinates on the abscissa and ordinate are respectively represented by i and j.

First of all, the minimum and maximum numbers of passes for the formation of the same print area are determined (S3501). The number of passes is often determined in accordance with a print mode or a print medium. This embodiment exemplifies a case in which the same print area is formed by printing with a minimum number of four passes and a maximum number of six passes.

The table area shown in FIG. 16 is segmented into areas corresponding to the minimum number of passes (i.e., four areas). This segmentation is performed in steps S3502 to S3505.

First of all, n vertexes for setting the first area are set (S3502). The number of vertexes to be set is not specifically limited. For example, in order to smoothly change the division ratio, it suffices to increase the number of points. In addition, for example, in the case of four-pass printing, the range of the values of vertexes an(i_an, j_an) for setting the first area may be set such that the average of j-coordinate widths is set to a predetermined value (e.g., 0.25) so as not to increase the difference in print data between the respective passes.

Figure 36:
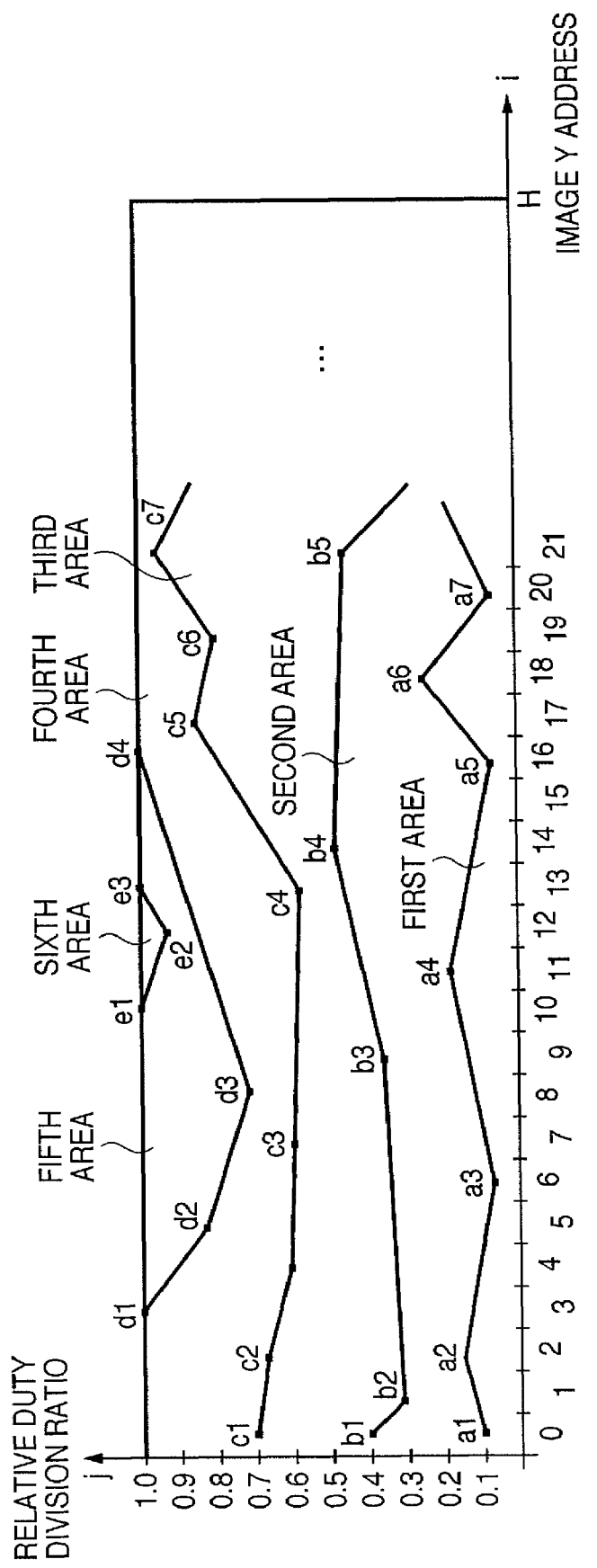
FIG. 36 is a view showing the process of generating an input duty division table in the second embodiment.

FIG. 36 shows an example of how vertexes a1 to a7 are set to set the first area. In this case, the i-coordinate of the vertex an satisfies the following inequality. Note that n represents the number of vertexes for setting the first area, and the i-coordinate of the vertex a1 is 0.

$$i\_a1 < i\_a2 < \ldots < i\_an \quad (30)$$

That is, a j-coordinate value is properly set while the i-coordinate satisfies inequality (30).

Subsequently, n' vertexes for setting the second area are set (S3503). The number of vertexes to be set is not specifically limited. For example, in order to smoothly change the division ratio, it suffices to increase the number of points.

In setting the vertexes of the second area, first of all, a value rn'(i_rn', j_rn') to be referred to for the operation is set. The value rn'(i_rn', j_rn') is set as follows, with the i-coordinate representing the i-coordinate of a vertex of the second area, and the j-coordinate representing the distance from the vertex of the second area to the first area. First of all, the i-coordinate satisfies the following inequality:

$$i\_r1 < i\_r2 < \ldots < i\_rn' \quad (31)$$

For example, in the case of four-pass printing, the range of j-coordinates of rn' may be set such that the average of j-coordinate widths is set to a predetermined value (e.g., 0.25) so as not to increase the difference in print data between the respective passes.

A vertex bn'(i_bn', j_bn') for setting the second area is calculated by using rn' described above according to equations (32) and (33):

$$i\_bn' = i\_rn' \quad (32)$$

$$j\_bn' = j\_rn' + j\_a((n'-1) \cdot n') \quad (33)$$

Note that the calculation of vertexes bn' based on equations (32) and (33) is the same as that described with reference to FIG. 18 in the first embodiment, and hence a detailed description thereof will be omitted. FIG. 36 shows an example of how vertexes b1 to b5 for setting the second area are set.

Vertexes cn for the third area are set in the same manner as described above (S3504). Vertexes dn for the fourth area are set (S3505). FIG. 36 shows an example of how vertexes c1 to c7 for setting the third area and vertexes d1 to d4 for setting the fourth area are set.

The description so far is of the segmentation of a table area for the formation of the same print area by at least four scans throughout an image.

The table area shown in FIG. 36 is further segmented to form the same print area by five or more scans. That is, vertexes en(i_en, j_en) for setting the fifth area are determined according to the following condition (S3506). Note that n represents the number of vertexes for setting the fifth area.

$$0 < i\_e1 < i\_e2 < \ldots < i\_en \quad (34)$$

$$j\_e1 = 1.0 \quad (35)$$

FIG. 36 shows an example of how vertexes e1 to e3 for setting the fifth area are set.

Setting the fifth area will set the remaining area as the sixth area.

When the segmentation of the area into six areas in the horizontal direction is complete in the above manner, segmentation points of each area are set in steps S3507 to S3512 to determine which area is to be printed at what scan areas.

Figure 21:
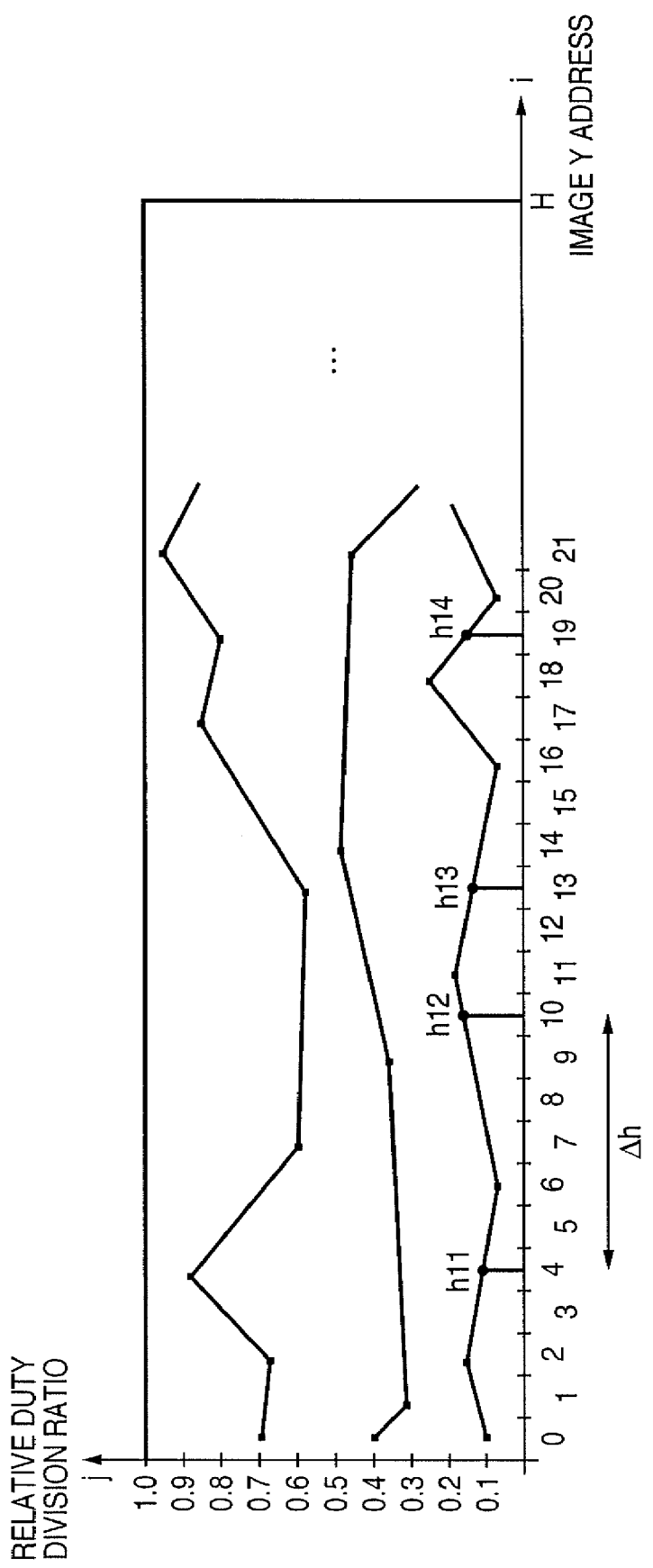
FIG. 21 is a view showing the process of generating the input duty division table in the embodiment.

First of all, as shown in FIG. 21, to segment the first area into a plurality of areas in the image vertical direction, a point h1n is set on a line defining the first area, and a perpendicular line is drawn from the point in the i-axis direction (S3507). In this case, the point h1n(i_h1n, j_h1n) represents the relation indicated by inequality (36). In addition, as indicated by equation (37), a difference Δh between the respective points needs to be equal to or less than the length of nozzles.

$$i\_h11 < i\_h12 < \ldots < i\_h1n \text{ (n is the number of vertexes)} \quad (36)$$

$$\Delta h = |i\_h1n - h1(n-1)| < Nzzl \quad (37)$$

This is because, as is obvious from FIG. 34 described above, a width Δh of a plurality of areas segmented by the point h1n corresponds to the number of nozzles to be used to print the area.

Figure 37:
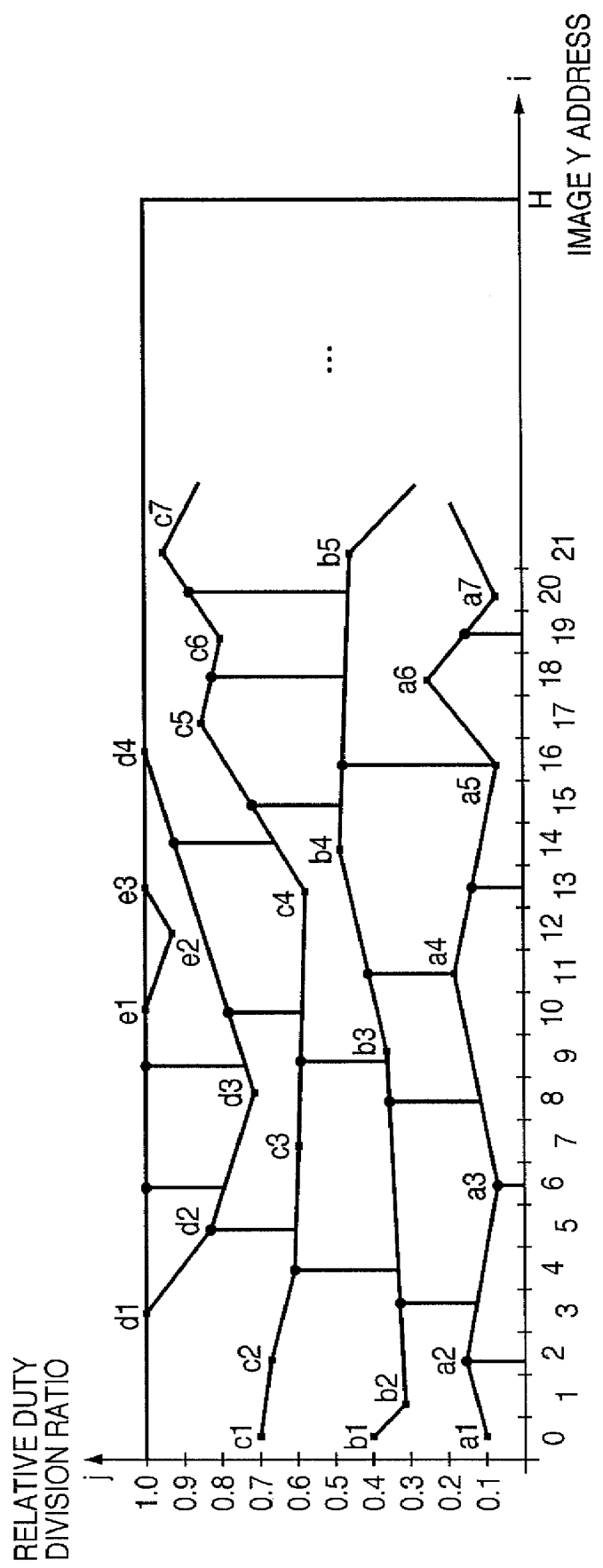
FIG. 37 is a view showing the process of generating the input duty division table in the second embodiment.

For each of the second to sixth areas, in the same manner as described above, an area segmentation point h is set, and each area is segmented into a plurality of areas in the i-axis direction, as shown in FIG. 37 (S3508 to S3512).

When each area is vertically segmented in the above manner, scan numbers are assigned to a plurality of polygonal areas defined by the perpendicular lines drawn from the area segmentation points h (S3513). According to the rule for assigning scan numbers in this case, as in the first embodiment, scan numbers are sequentially assigned upward from the lower left of the first area, thereby assigning the scan numbers to the respective areas as shown in FIG. 32.

An input duty division table like that shown in FIG. 32 is generated by the above method. Using this table can change the number of passes for completing each print area of an image in the main scanning direction. According to FIG. 34 based on the input duty division table shown in FIG. 32, printing in the print areas A to C is performed by four passes, printing in the print areas D to H is performed by five passes, and printing in the print area I is performed by six passes, thereby satisfying the condition of the minimum number of passes (four) and the maximum number of passes (six) set in step S3501.

Sheet feeding amounts in the second embodiment will be described next.

Figure 38:
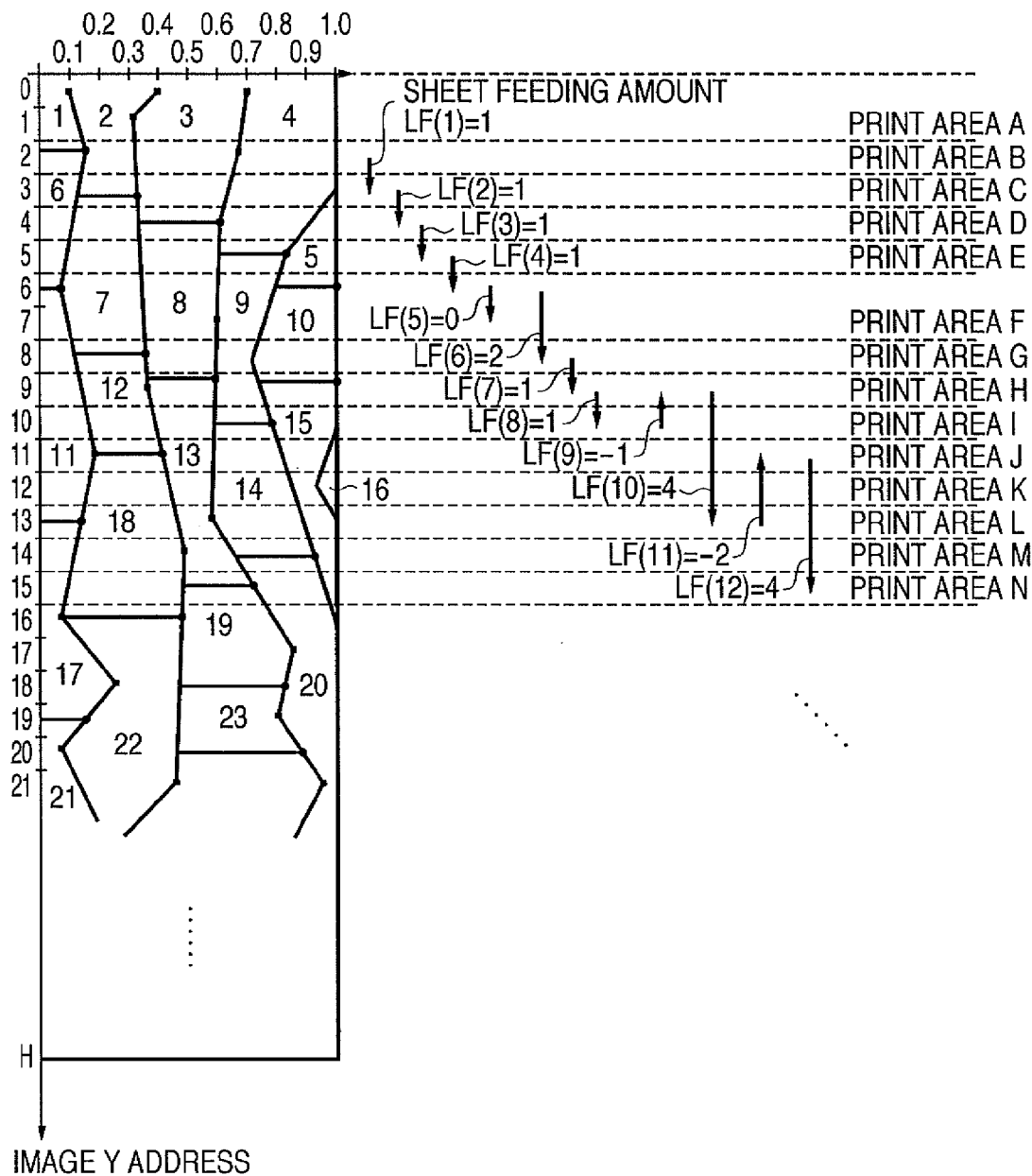
FIG. 38 is a view showing the sheet feeding amounts set by the input duty division table in the second embodiment.

FIG. 38 shows a sheet feeding amount LF(k) after each scan which is set based on the input duty division table in the second embodiment. Referring to FIG. 38, the sheet is fed in the arrow direction. For example, the sheet feeding amount after the scan at scan number k=1 is LF(1)=1. As is also obvious from FIG. 38, in the second embodiment, the sheet feeding amount LF(k) after each scan changes. That is, the sheet feeding amount LF(k) has no constant periodicity.

The print data setting LUT 106 in the second embodiment stores the following types of values calculated for each scan number k based on the input duty division table generated by the above method. As shown in FIG. 33, as in the first embodiment, first of all, the following values are stored: 1) a color separation data extraction position Ycut(k), 2) the division ratio of input data for each nozzle, and 3) the sheet feeding amount LF(k) after each scan. In addition, in the second embodiment, a cumulative error buffer number to be referred for error diffusion processing to be described later is stored as 4) an adjacent area number L.

When the number of passes for forming the same print area is constant, for example, the print areas at scan number k=1 and scan number k=5 are vertically adjacent to each other (see FIG. 14) as in the first embodiment described above. For this reason, to store a cumulative error in the lower adjacent area, it is possible to select an error buffer to be used for error diffusion processing in accordance with a scan number.

In the second embodiment, however, since the number of passes for forming the same print area in an image locally changes, the area which is made to store a cumulative error does not depend on the number of passes. For this reason, a scan number k corresponding to an adjacent area, i.e., an area which is made to store a cumulative error, is stored in advance as the "adjacent area number L" in the input duty division table to be referred to when an error buffer is selected in error diffusion processing.

The above description is about the method of generating an input duty division table in the second embodiment.

Note that the method of allowing to set the number of passes in accordance with an input duty division table, which is a characteristic feature of the second embodiment, is not limited to the above technique. For example, a technique using Delaunay triangular segmentation to be described below can also be used.

Figure 56:
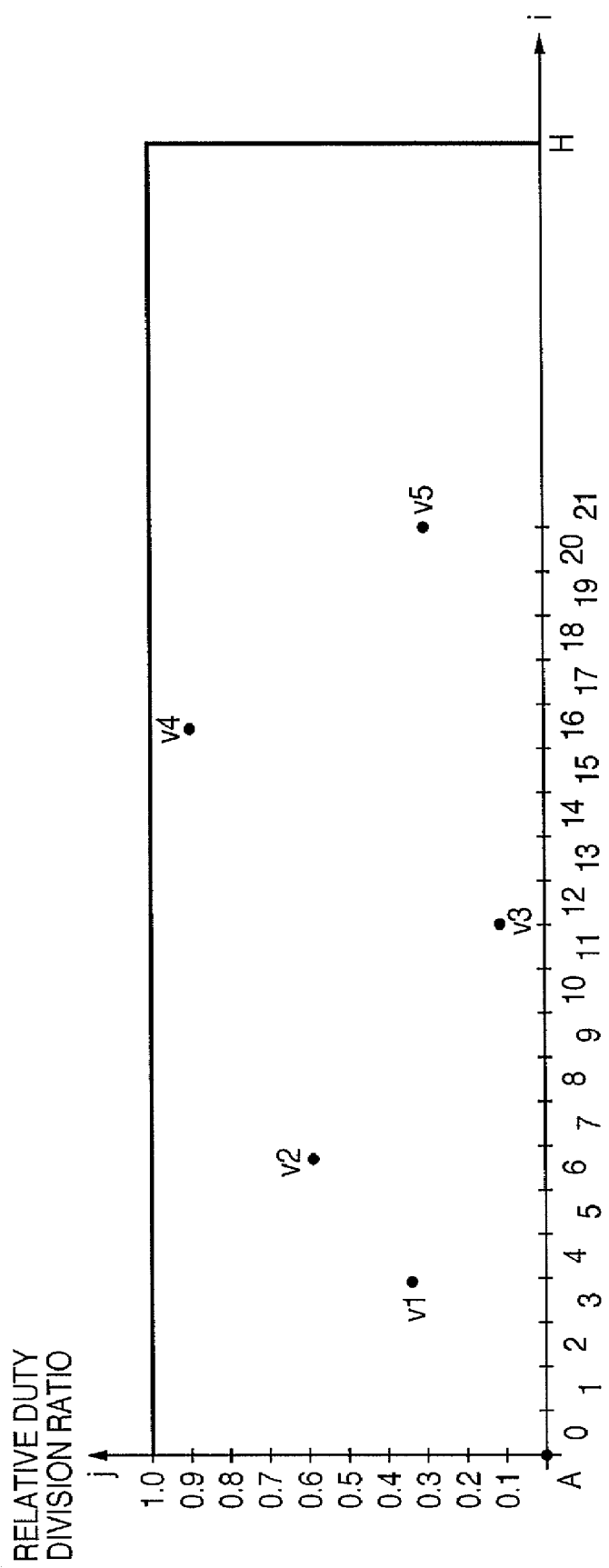
FIG. 56 is a graph showing the process of generating an input duty division table in the second embodiment.
Figure 57:
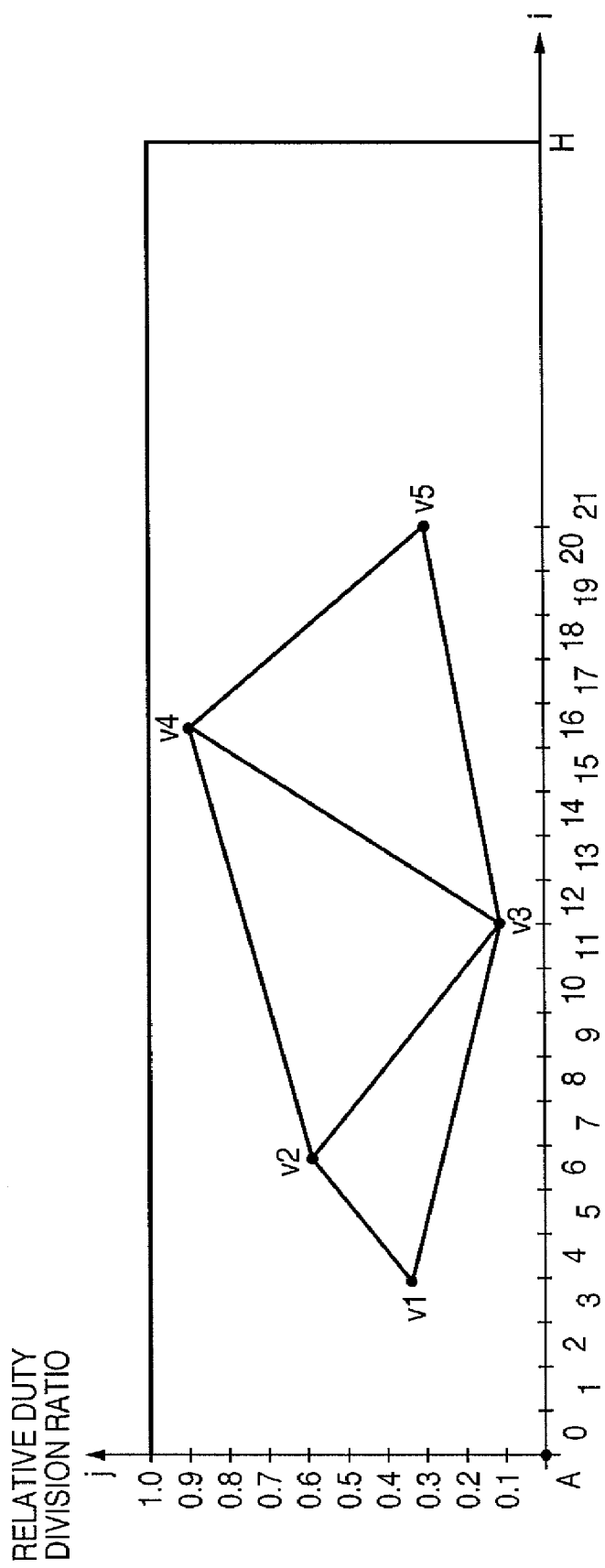
FIG. 57 is a graph showing the process of generating the input duty division table in the second embodiment.

For example, triangular sides like those shown in FIG. 57 are formed by randomly generating vertexes for setting the area of an input duty division table as shown in FIG. 56 and performing Delaunay triangular segmentation for a set of these points. A rectangular area is then segmented into a plurality of polygonal areas according to the following two rules.

(1) A point (V1 in FIG. 57) nearest to an origin A is connected to the origin A.

(2) Perpendicular lines are drawn from the points forming the closed curve to the lower and upper sides of the table area.

Figure 58:
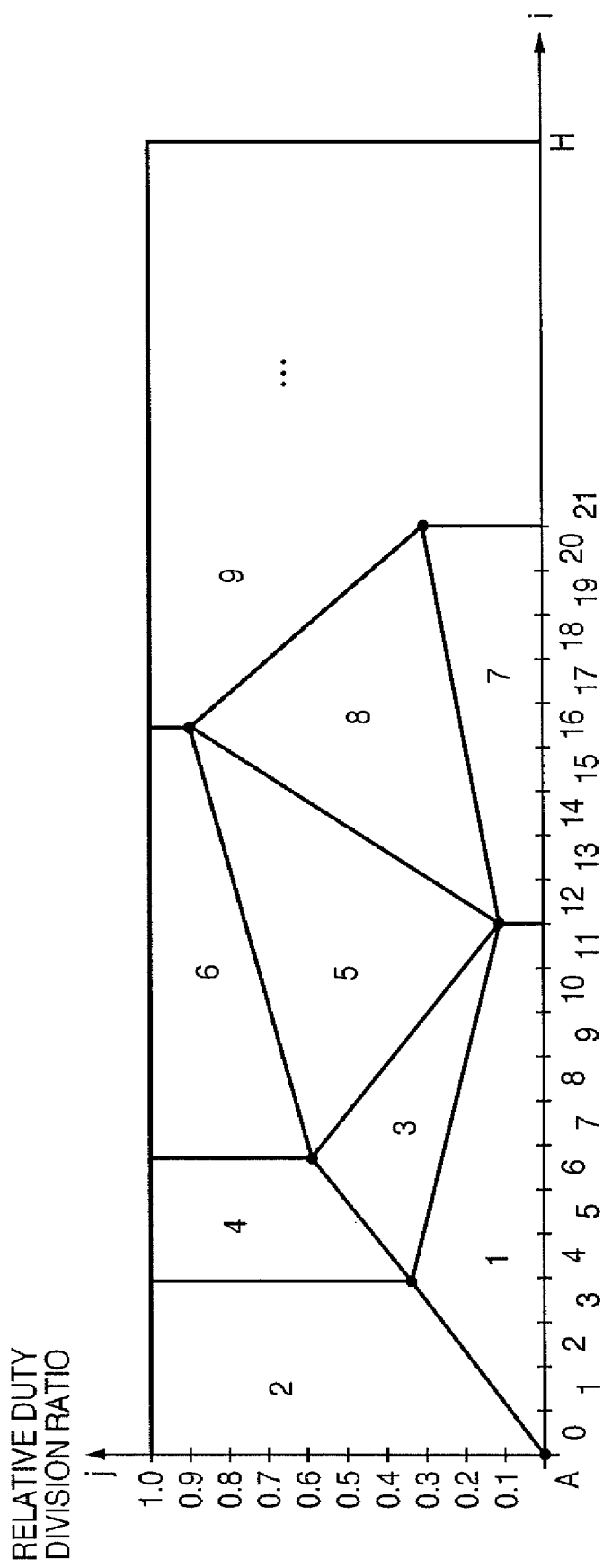
FIG. 58 is a graph showing the process of generating the input duty division table in the second embodiment.

With this operation, the table area is segmented into nine areas, as shown in FIG. 58. Note that the area numbers in the rectangles correspond to scan numbers as in the above method.

Generating an input duty division table by using this method makes it possible to more flexibly set the number of printing elements to be used for each scan and the number of times the same area is scanned.

That is, the second embodiment allows to set the number of times the same area is scanned and printing elements to be used for the operation by segmenting an input duty division table into a plurality of polygonal areas based on arbitrarily set rules and assigning scan numbers to the respective polygonal areas. Note, however, that equation (37) must be satisfied at the time of segmentation.

Halftoning in the second embodiment will be described next. In the second embodiment, as in the first embodiment, error diffusion processing is performed. However, the details of the processing are the same as that described with reference to FIG. 27, and hence a repetitive description will be omitted.

Figure 39:
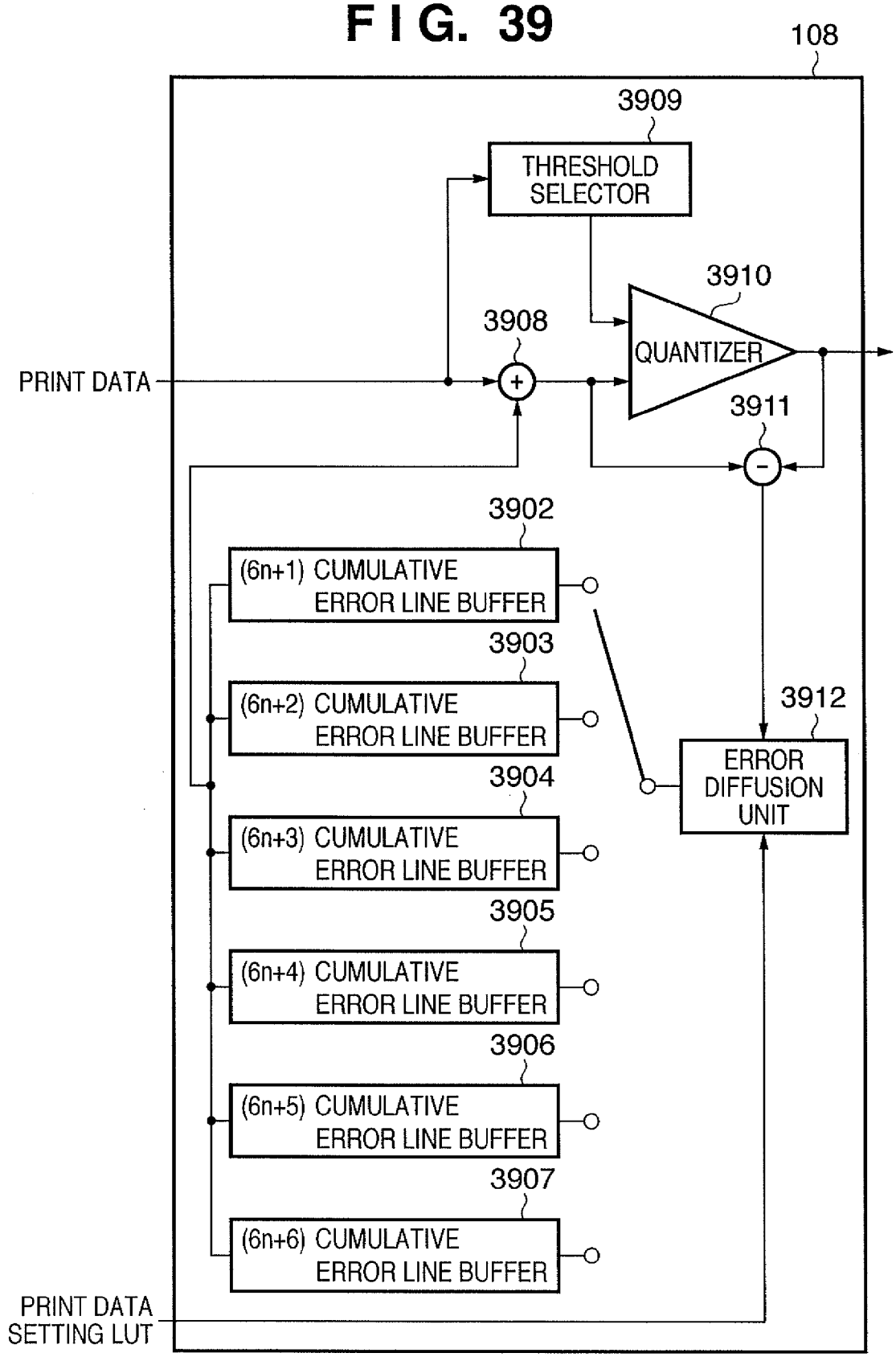
FIG. 39 is a block diagram showing the detailed arrangement of a halftoning unit in the second embodiment.

FIG. 39 shows the detailed arrangement of a halftoning unit 108 in the second embodiment. The halftoning unit 108 secures cumulative error line buffers 3902 to 3907 corresponding to the maximum number of passes in order to execute error diffusion processing in the second embodiment. The halftoning unit 108 then switches the cumulative error line buffers to be used based on the value of the "adjacent area number L" in the print data setting LUT, for example, as follows:

"When adjacent area number L=6n+1",
the (6n+1) cumulative error line buffer 3902 is used.
"When adjacent area number L=6n+2",
the (6n+2) cumulative error line buffer 3903 is used.
"When adjacent area number L=6n+3",
the (6n+3) cumulative error line buffer 3904 is used.
"When adjacent area number L=6n+4",
the (6n+4) cumulative error line buffer 3905 is used.
"When adjacent area number L=6n+5",
the (6n+5) cumulative error line buffer 3906 is used.
"When adjacent area number L=6n+6",
the (6n+6) cumulative error line buffer 3907 is used.

As described above, according to the second embodiment, in the printing method of forming an image by scans using the segmented areas of the printhead, the number of passes for completing image formation can be arbitrarily set for the same area on a print medium. That is, the second embodiment allows to set the number of times the same area is scanned, printing elements to be used, and the feeding amount of a print medium after each scan.

According to the second embodiment, like the first embodiment, this makes it possible to perform flexible image formation in accordance with an image by controlling the number of passes for each area of an image to be formed while reducing density unevenness due to variations in printing elements and graininess deterioration due to a feeding amount shift.

<Third Embodiment>

The third embodiment of the present invention will be described below.

The first and second embodiments described above have exemplified the case in which the sheet feeding amount after each scan is set in accordance with the value of the point h which segments the respective areas in the input duty division table. As in the prior art, when the sheet feeding amount is constant, density or color unevenness in the subscanning direction occurs periodically (at the period of sheet feeding). A characteristic feature of the third embodiment is that this sheet feeding amount is made to have a characteristic that makes it difficult for the human to visually perceive sheet feeding so as to make it difficult to perceive the period of unevenness. Note that the arrangement of an image forming apparatus of the third embodiment is the same as that of the first embodiment, and hence a repetitive description will be omitted.

Figure 40:
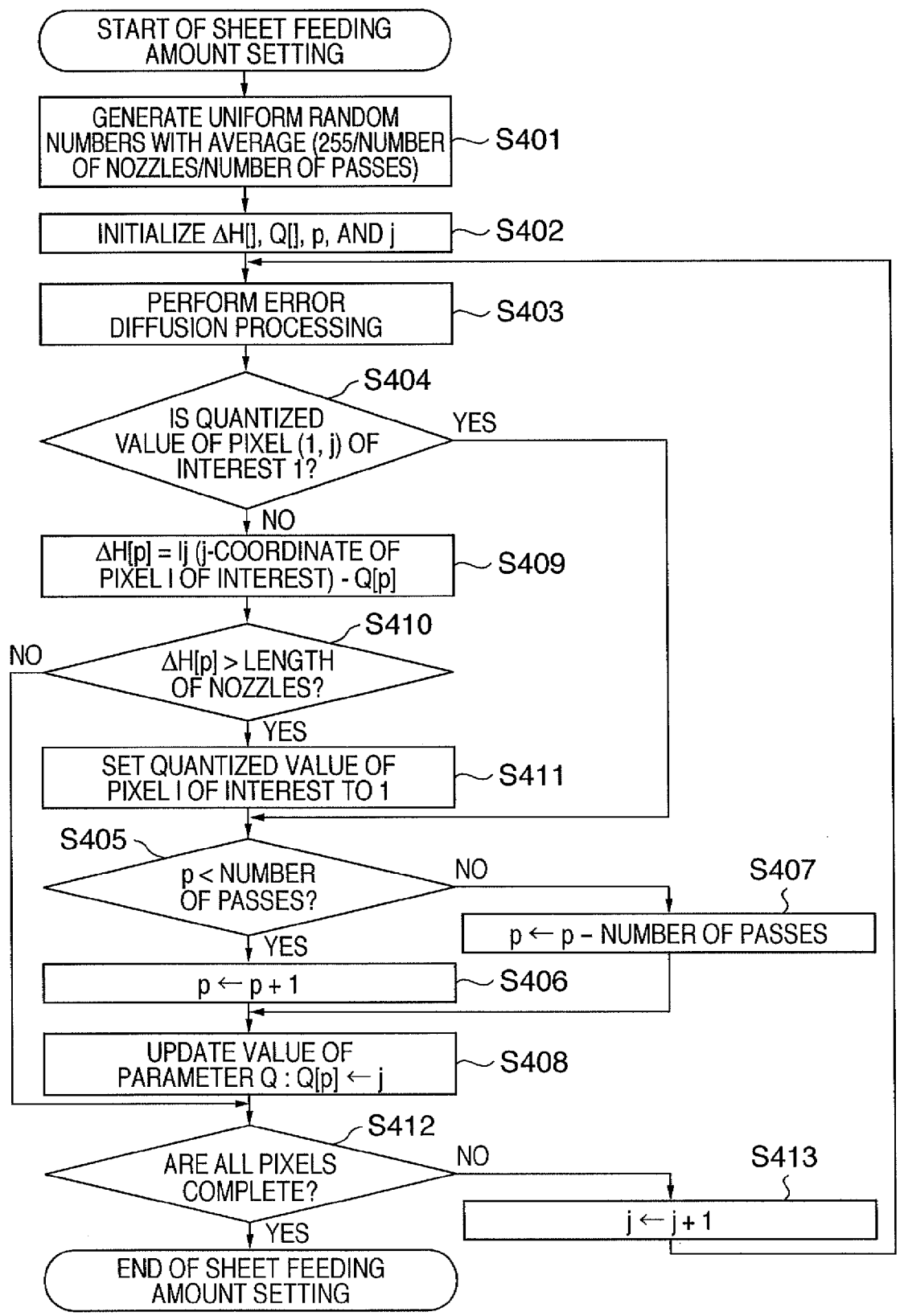
FIG. 40 is a flowchart showing the processing of setting a sheet feeding amount to which a characteristic is added in the third embodiment.
Figure 42:
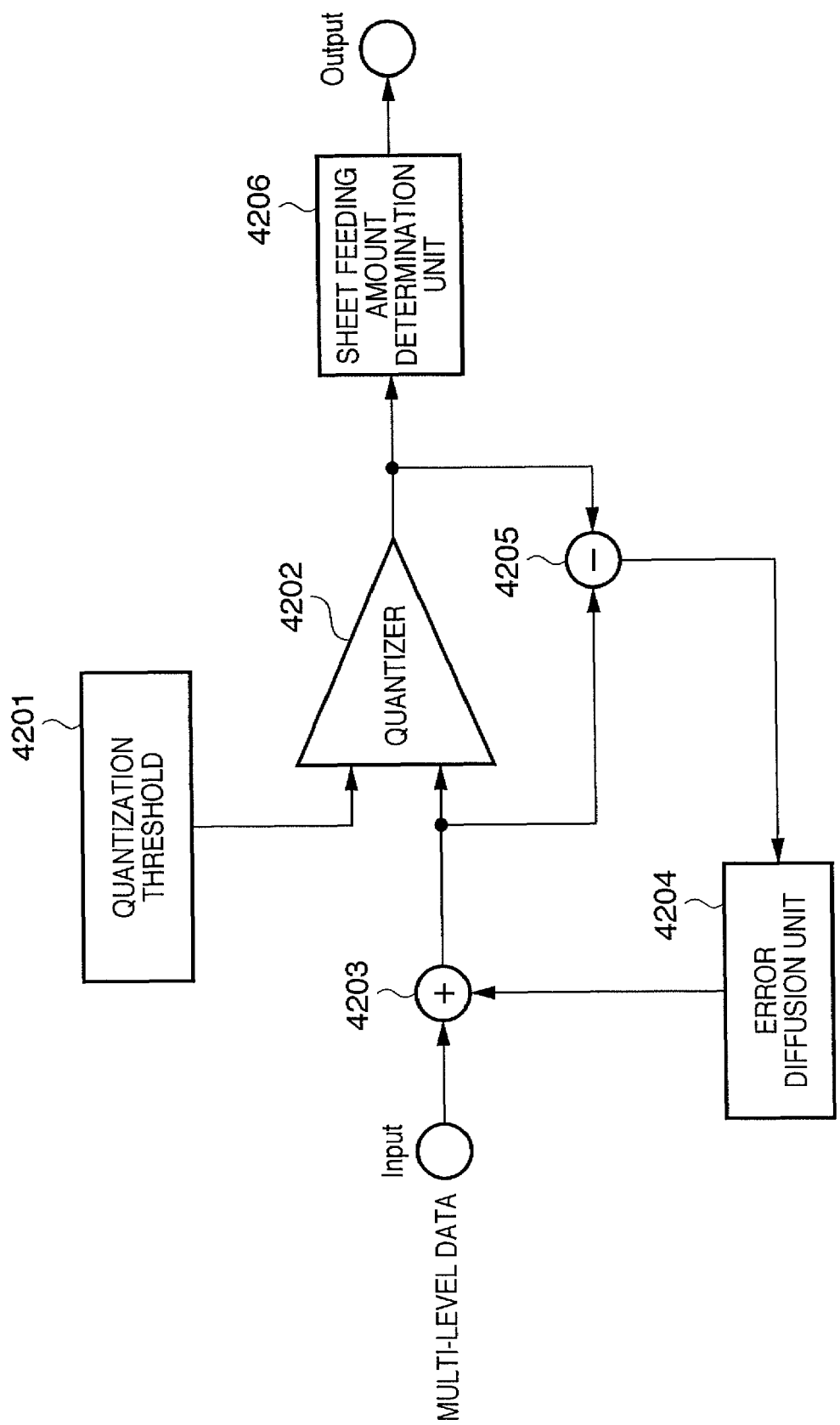
FIG. 42 is a view showing a circuit arrangement for determining a sheet feeding amount in the third embodiment.

The addition of a characteristic to a sheet feeding amount in the third embodiment will be described below. A case in which the frequency characteristic of a sheet feeding amount is a high-frequency characteristic (e.g., a blue noise characteristic) will be described with reference to the block diagram of FIG. 42 and the flowchart of FIG. 40. FIG. 42 shows a circuit arrangement for determining a sheet feeding amount in the third embodiment. FIG. 40 is a flowchart showing setting processing for the sheet feeding amount.

Figure 41:
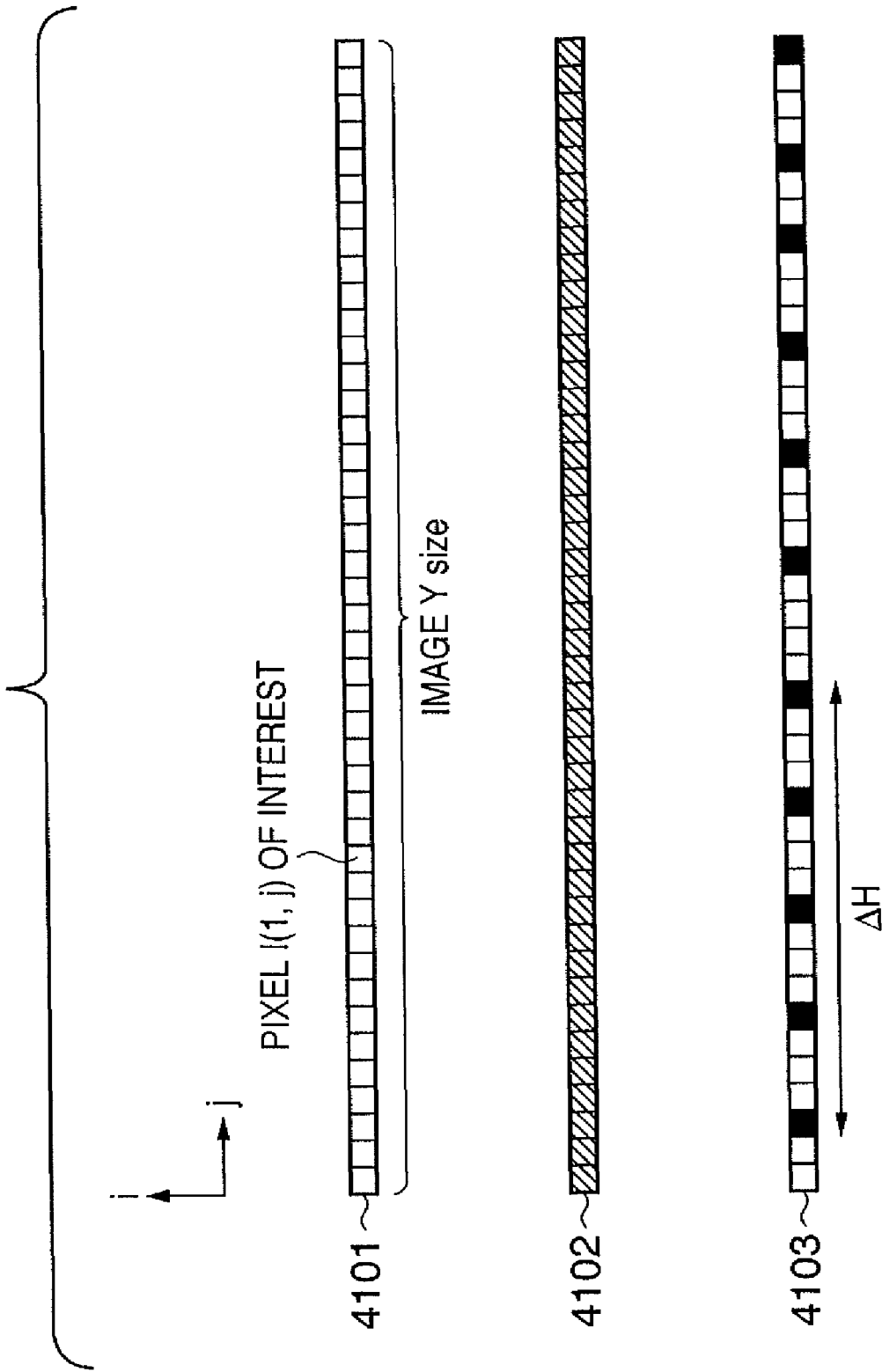
FIG. 41 is a view showing the process of setting a sheet feeding amount in the third embodiment.

In this case, as shown in FIG. 41, an image memory 4101 having a vertical size (Y) of one pixel (vertical) x input image (horizontal) is prepared, and error diffusion processing is performed for image data 4102 corresponding to the memory size to generate a binary image 4103. In the third embodiment, the sheet feeding amount after each scan is represented by the distance between pixels (black pixels) corresponding to ON dots in the binary image 4103.

First of all, a pixel value of the image data 4102 shown in FIG. 41 is determined (S401). More specifically, each pixel value is determined such that the average pixel value of the image data 4102 becomes a value Iave represented by equation (38) based on the number of passes in which the same print area is scanned and the length of the nozzles. Assume that one pixel is represented by eight bits.

$$Iave=255/\text{length of nozzles}/\text{number of passes} \qquad (38)$$

For example, uniform random numbers are generated such that their average is Iave with a variance σ, and the integer obtained by rounding the average to the nearest integer is set as the pixel value of the image data 4102. In this case, the characteristic of the sheet feeding amount can be controlled in accordance with the variance σ.

The values of parameters ΔH[ ], Q[ ], p, and j to be used in the subsequent processing are initialized to 0 (S402). Note that p and ΔH[p] are parameters respectively representing the number of passes and the sheet feeding amount after image formation by the pth pass. In addition, Q[p] is a parameter for determining the validity of a sheet feeding amount after the pth pass. In this case, the validity of a sheet feeding amount is determined depending on whether the sheet feeding amount exceeds the length of the nozzles. Furthermore, j is a parameter representing the pixel position of the image data 4102 and binary image 4103.

Error diffusion processing is then performed for the multi-level image data 4102 (S403). Since a known technique can be applied to this error diffusion processing, only an outline of the processing will be described below. Referring to FIG. 42, a quantizer 4202 quantizes input data based on a quantization threshold 4201. At this time, an error diffusion unit 4204 diffuses, as the error, the difference between the input data and the quantized data which is calculated by an error computing unit 4205 to neighboring pixels.

Figure 43:
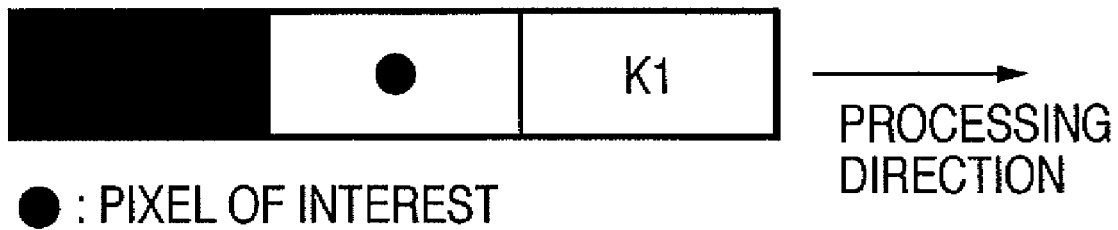
FIG. 43 is a view showing an example of an error diffusion coefficient in the third embodiment.

Assume that only one coefficient k1 (e.g., K1=1) is used as an error diffusion coefficient for error diffusion processing in the third embodiment, as shown in FIG. 43. With this error diffusion processing, the binary image 4103 shown in FIG. 41 is obtained.

A sheet feeding amount determination unit 4206 shown in FIG. 42 then determines for the binary image 4103 generated by the error diffusion processing whether the set sheet feeding amount is valid.

First of all, the sheet feeding amount determination unit 4206 determines whether the value of a pixel Out(1, j) of the binary image 4103 is 1: ON (a black pixel of the binary image 4103) (S404). If Out(1, j) is ON, this unit sets the number of passes. That is, the unit compares p with the number of passes (S405). If p is smaller than the number of passes, the unit increments p (S406). If p is equal to or more than the number of passes, the unit updates p to the difference value between p and the number of passes, i.e., 0 (S407). Note that the value of p is initialized to 0 before error diffusion processing, as described above. The unit then updates the value of the sheet feeding amount determination parameter Q[p] to j (S408). Note that the value of Q[p] is initialized to 0 before error diffusion processing, as described above.

If the unit determines in step S404 that Out(1, j) is 0: OFF (a white pixel of the binary image 4103), the sheet feeding amount ΔH[p] is calculated according to equation (39) (S409):

$$\Delta H[p]=|j\text{-coordinate of pixel of interest}-Q[p]| \qquad (39)$$

In this case, as described above, in the third embodiment, the distance between black pixels of the binary image 4103 shown in FIG. 41 represents a sheet feeding amount. Since ΔH[p] calculated by equation (39) must be equal to or less than the length of the nozzles, the sheet feeding amount determination unit 4206 determines the validity of the sheet feeding amount by comparing ΔH[p] with the length of the nozzles (S410). If ΔH[p] is equal to or less than the length of the nozzles, since ΔH[p] is valid, the process shifts to the next processing (S412 and S413).

If ΔH[p] is larger than the length of the nozzles, the sheet feeding amount determination unit 4206 determines that ΔH[p] is invalid, and sets the binarization result Out(1, j) of the pixel of interest to ON (S411). Thereafter, the number of passes is set (S405 to S407), and the value of the sheet feeding amount determination parameter Q[p] is updated to j (S408).

It is determined whether the processing in steps S402 to S411 described above is complete for all the pixels of the image data 4102 shown in FIG. 41 (S412). If the processing is not complete, j is incremented to shift the process to processing for the next pixel (S413).

Figure 44:
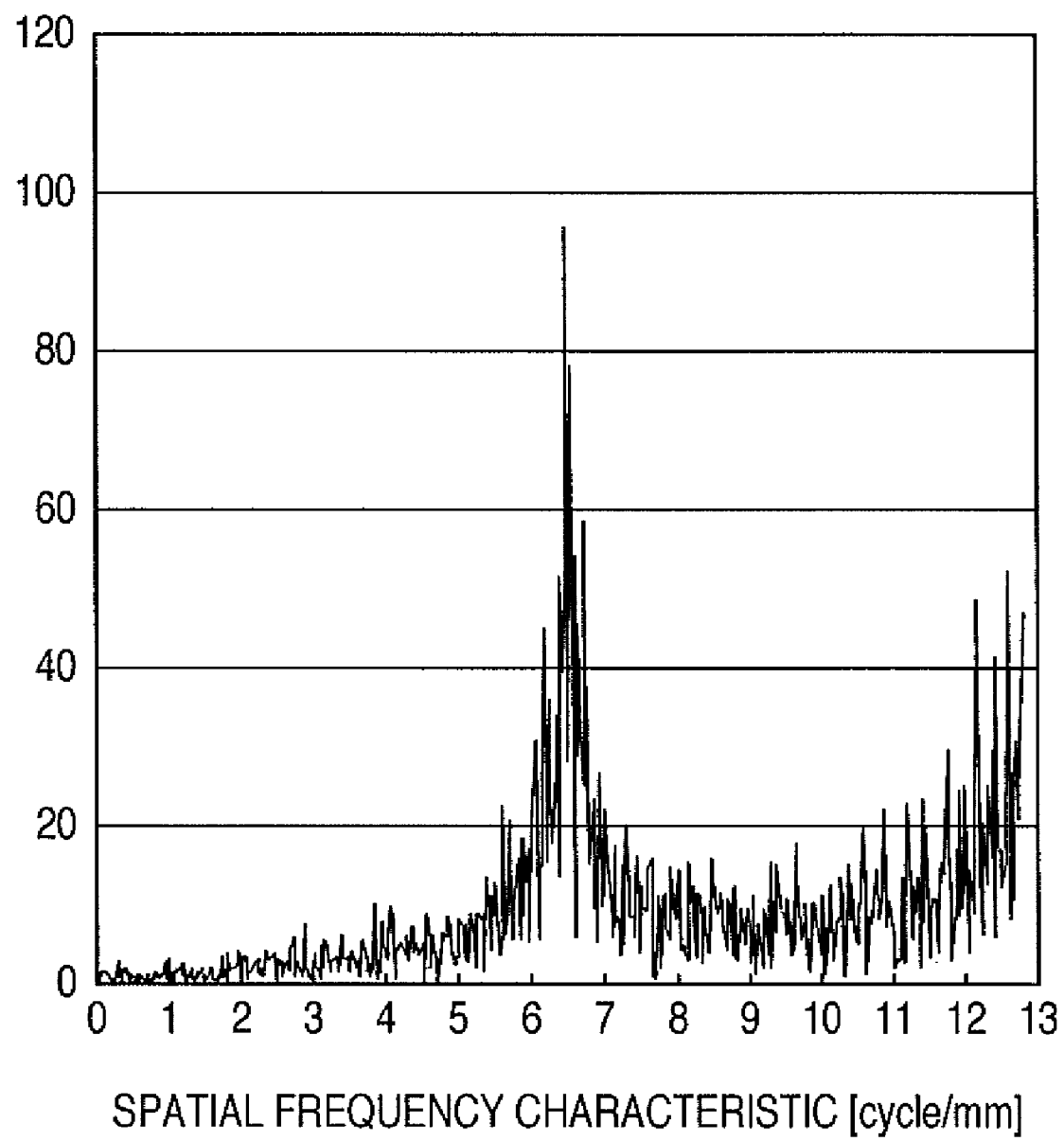
FIG. 44 is a graph showing the frequency characteristic set for sheet feeding amounts in the third embodiment.

With the processing shown in the flowchart of FIG. 40 described above, the binary image 4103 shown in FIG. 41 is obtained. FIG. 44 shows the frequency characteristic of the binary image 4103. According to FIG. 44, the binary image 4103 has a blue noise characteristic with the tallest peaks being concentrated at high frequencies. As described above, according to the third embodiment, performing sheet feeding equivalent to the distance between black pixels of the binary image 4103 can add a blue noise characteristic to the sheet feeding amount.

Figure 46:
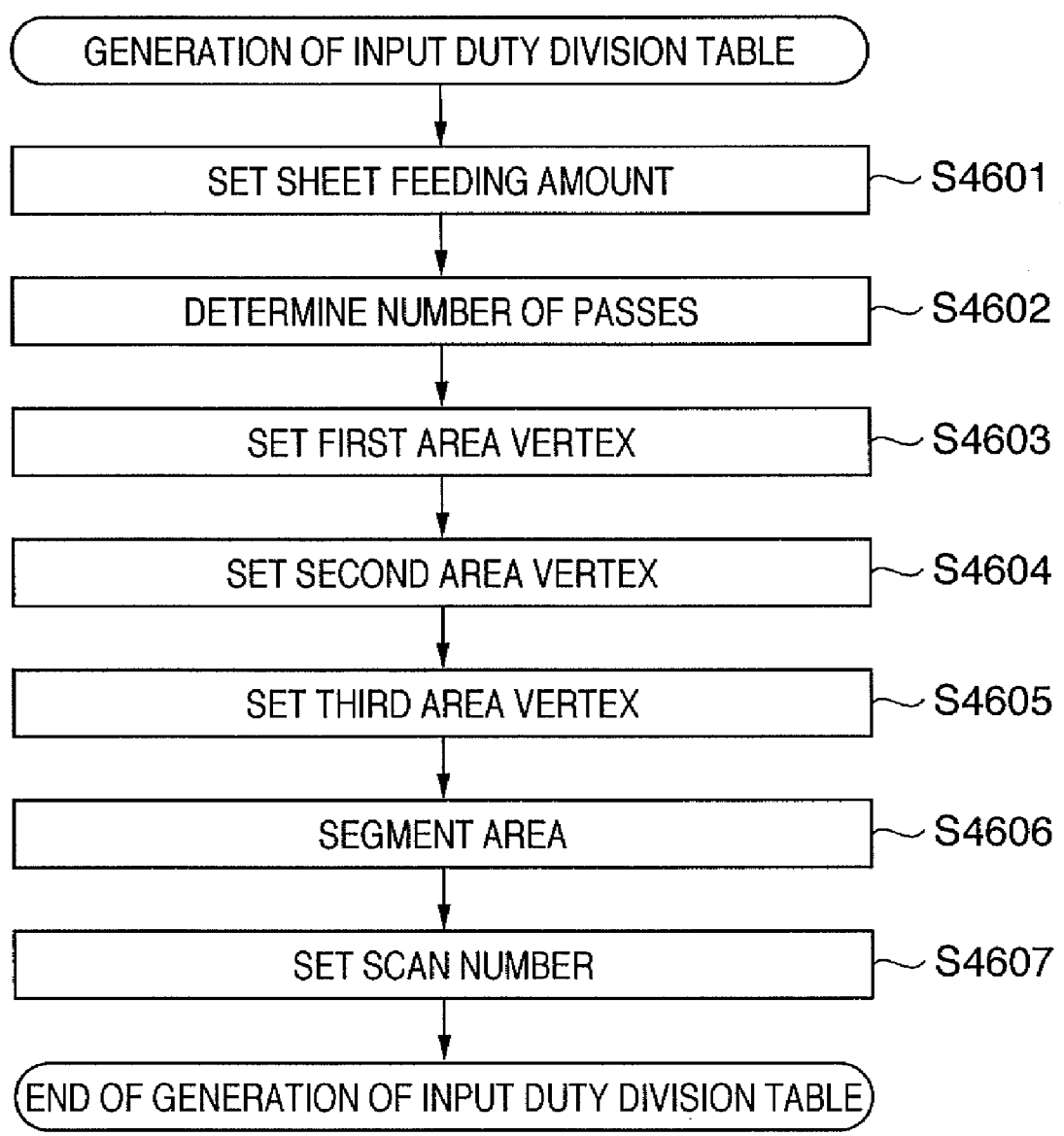
FIG. 46 is a flowchart showing a method of generating an input duty division table in the third embodiment.

The third embodiment generates an input duty division table for implement sheet feeding set by the above method. A method of generating an input duty division table according to the third embodiment will be described below with reference to the flowchart of FIG. 46. Before the generation of an input duty division table, an area is secured, with the horizontal size corresponding to the vertical size of an input image (one lattice point corresponding to the resolution of the image in the vertical direction) and the vertical size being 1.0 (a lattice with increments of 0.1 from 0 to 1). This area will be referred to as a table area, and coordinates on the abscissa and ordinate are respectively represented by i and j.

First of all, the binary image 4103 representing sheet feeding amounts is generated by the method described above (S4601).

Figure 45:
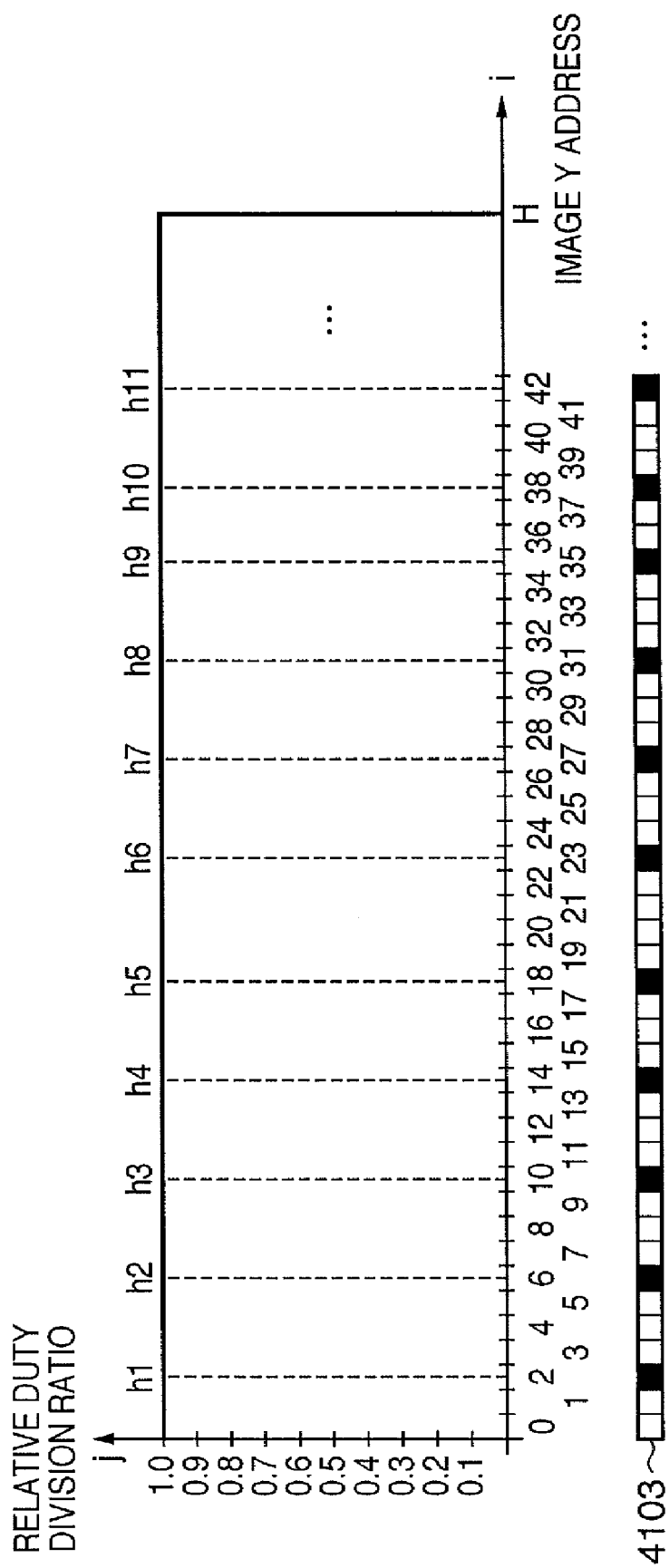
FIG. 45 is a view showing the process of generating an input duty division table in the third embodiment.

Referring to FIG. 45, positions hm (m=1, 2, 3, . . . ) indicated by the dotted lines represent positions at which sheet feeding is executed (to be referred to as sheet feeding positions hereinafter). That is, the sheet feeding positions hm shown in FIG. 45 correspond to the positions of the black pixels of the binary image 4103 shown in FIG. 41.

The number of passes for forming the same print area is then determined (S4602). The number of passes is often determined in accordance with a print mode or a print medium. The third embodiment exemplifies a case in which the same print area is formed by four-pass printing.

In order to perform four-pass printing, first of all, the table area shown in FIG. 45 is segmented into four areas in the horizontal direction. This segmentation is performed in steps S4603 to S4605.

First of all, n vertexes for setting the first area are set (S4603). The number of vertexes to be set is not specifically limited. For example, in order to smoothly change the division ratio, it suffices to increase the number of points. In addition, for example, in the case of four-pass printing, the range of the values of vertexes an(i_an, j_an) for setting the first area may be set such that the average of j-coordinate widths is set to a predetermined value (e.g., 0.25) so as not to increase the difference in print data between the respective passes.

Figure 47:
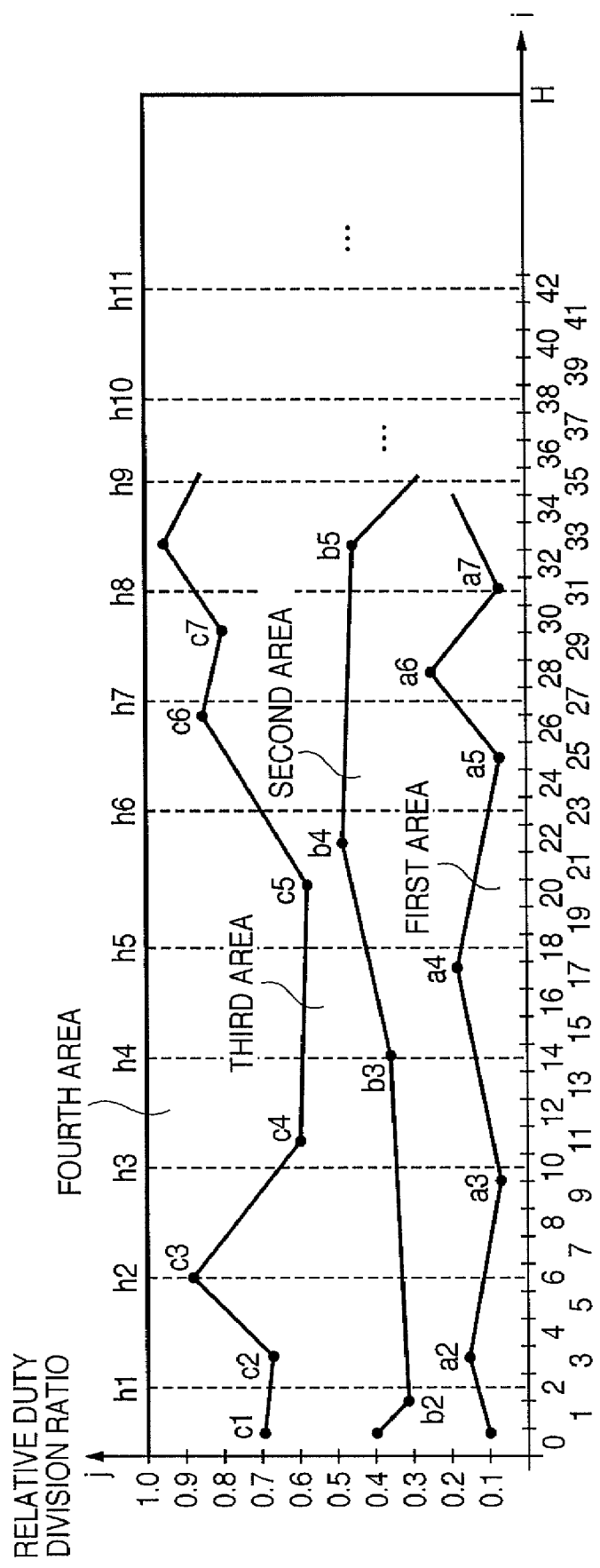
FIG. 47 is a graph showing the process of generating an input duty division table in the third embodiment.

FIG. 47 shows an example of how vertexes a1 to a7 are set to set the first area. In this case, the i-coordinate of the vertex an satisfies the following inequality. Note that n represents the number of vertexes for setting the first area, and the i-coordinate of the vertex a1 is 0.

$$i\_a1 < i\_a2 < \ldots < i\_an \quad (40)$$

That is, a j-coordinate value is properly set while the i-coordinate satisfies inequality (40).

Subsequently, n' vertexes for setting the second area are set (S4604). The number of vertexes to be set is not specifically limited. For example, in order to smoothly change the division ratio, it suffices to increase the number of points.

In setting the vertexes of the second area, first of all, a value rn'(i_rn', j_rn') to be referred to for the operation is set. The value rn'(i_rn', j_rn') is set as follows, with the i-coordinate representing the i-coordinate of a vertex of the second area, and the j-coordinate representing the distance from the vertex of the second area to the first area. First of all, the i-coordinate satisfies the following inequality:

$$i\_r1 < i\_r2 < \ldots < i\_rn' \quad (41)$$

For example, in the case of four-pass printing, the range of j-coordinates of rn' may be set such that the average of j-coordinate widths is set to a predetermined value (e.g., 0.25) so as not to increase the difference in print data between the respective passes.

A vertex bn'(i_bn', j_bn') for setting the second area is calculated by using rn' described above according to equations (42) and (43):

$$i\_bn' = i\_rn' \quad (42)$$

$$j\_bn' = j\_rn' + j\_a((n'-1) \cdot n') \quad (43)$$

Note that the calculation of vertexes bn' based on equations (42) and (43) is the same as that described with reference to FIG. 18 in the first embodiment, and hence a detailed description thereof will be omitted. FIG. 47 shows an example of how vertexes b1 to b5 for setting the second area are set.

Vertexes cn for the third area are set in the same manner as described above (S4605). FIG. 47 shows an example of how vertexes c1 to c7 for setting the third area are set. The remaining area in this case is set as the fourth area.

When the segmentation of the area into four areas in the horizontal direction is complete in the above manner, the segmentation points of the respective areas in the vertical direction are set to determine which area is to be printed at what scan (S4606). The segmentation points in the third embodiment are set on the sheet feeding positions hm.

First of all, the first area is segmented at a sheet feeding position h(4n+1). Note that n in this case is a variable given as n=1, 2, 3 . . . .

Likewise, the second, third, and fourth areas are segmented into a plurality of areas in the i-axis direction at sheet feeding positions h(4n+2), h(4n+3), and h(4n+4), respectively.

Scan numbers are assigned to a plurality of polygonal areas set by the above area segmentation (S4607). The following is a rule for assigning scan numbers. First of all, the scan number "1" is assigned to the leftmost area of the first area, and the scan number "2" is assigned to the polygonal area (the leftmost area of the second area) located above the first area. Scan numbers are sequentially assigned according to the same rule, thereby assigning the following scan numbers to the respective areas:
  first area: scan number (4n+1)
  second area: scan number (4n+2)
  third area: scan number (4n+3)
  fourth area: scan number (4n+4)

Figure 48:
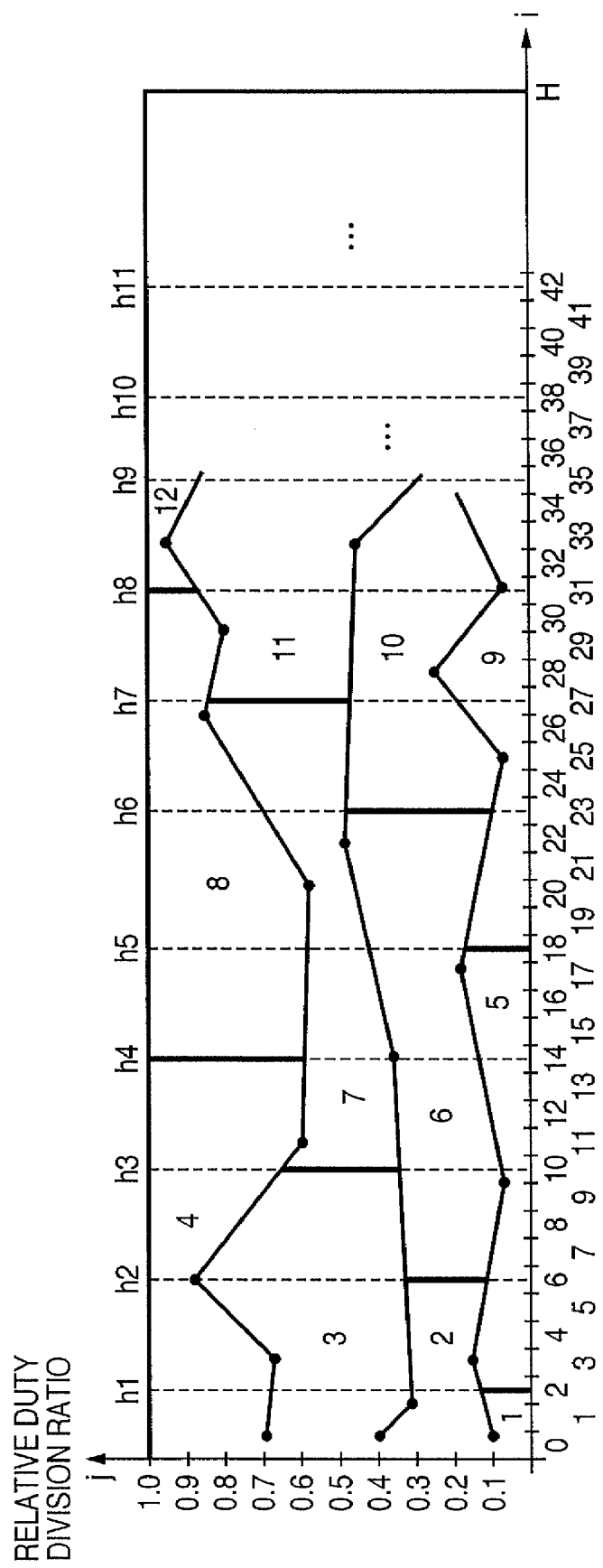
FIG. 48 is a graph showing the process of generating an input duty division table in the third embodiment.

An input duty division table like that shown in FIG. 48 is generated by the above method.

As in the first embodiment, a print data setting LUT 106 in the third embodiment stores the following three types of values calculated for each scan number k based on the input duty division table generated by the above method: 1) a color separation data extraction position Ycut(k), 2) the division ratio of input data for each nozzle, and 3) a sheet feeding amount LF(k) after each scan.

Subsequently, a print data setting unit 105 sets print data by using the print data setting LUT 106 set in this manner, and stores the data in a print data memory 107. Note that halftoning to be performed subsequently is the same as that in the first embodiment described above, a repetitive description will be omitted.

As described above, according to the third embodiment, in addition to the effects of the first embodiment, it is possible to set the feeding amount of a print medium after each scan while adding an arbitrary characteristic to the feeding amount.

<Fourth Embodiment>

The fourth embodiment of the present invention will be described below. The second embodiment described above has exemplified the case in which the number of passes in the multi-pass printing method is arbitrarily set. In contrast, the fourth embodiment exemplifies a case in which printing is performed while the number of passes is increased for a trailing edge portion of an image in particular. Note that the arrangement of an image forming apparatus of the fourth embodiment is the same as that of the first embodiment, and hence a repetitive description will be omitted.

Figure 49:
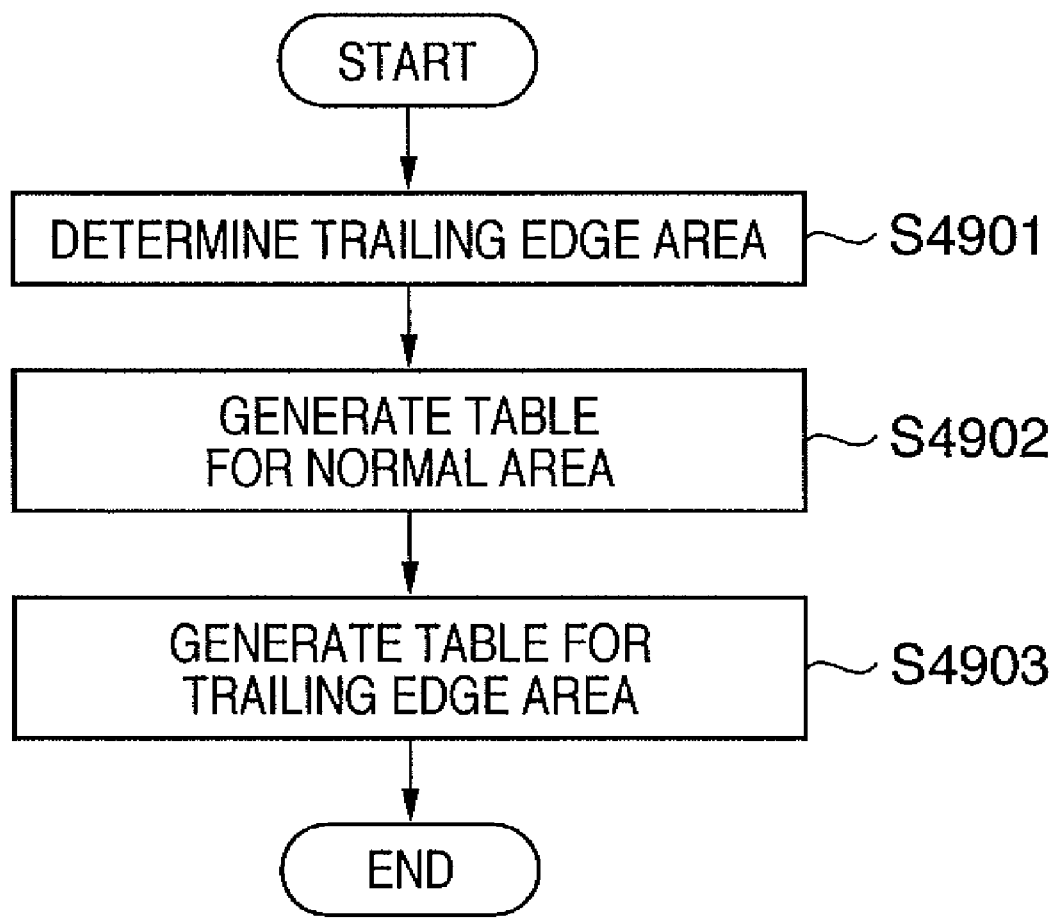
FIG. 49 is a flowchart showing a method of generating an input duty division table in the fourth embodiment.

The number of passes in the fourth embodiment is also controlled based on an input duty division table as in the second embodiment described above. A method of generating an input duty division table in the fourth embodiment will be described with reference to the flowchart of FIG. 49. This embodiment exemplifies a case in which an input duty division table is generated so as to perform normal processing by four-pass printing in an areas (normal area) other than the trailing edge of an image and perform trailing edge processing by eight-pass printing in a trailing edge area.

First of all, in step S4901, a trailing edge area in an image to be formed is determined. An example of a method of determining this trailing edge area includes a method of determining, as a trailing edge area, the several % lower area of an input image and a method of setting a trailing edge area in accordance with a length of the nozzles and the number of passes in the trailing edge area upon detecting the trailing edge of a sheet by a sensor. Let S be the start position of a determined trailing edge area at the Y address of the image.

An input duty division table for four-pass printing is generated by the method described in the first embodiment for a normal area for which trailing edge processing is not performed (S4902).

An input duty division table for eight-pass printing is generated for an area for which trailing edge processing is performed (S4903).

Figure 50:
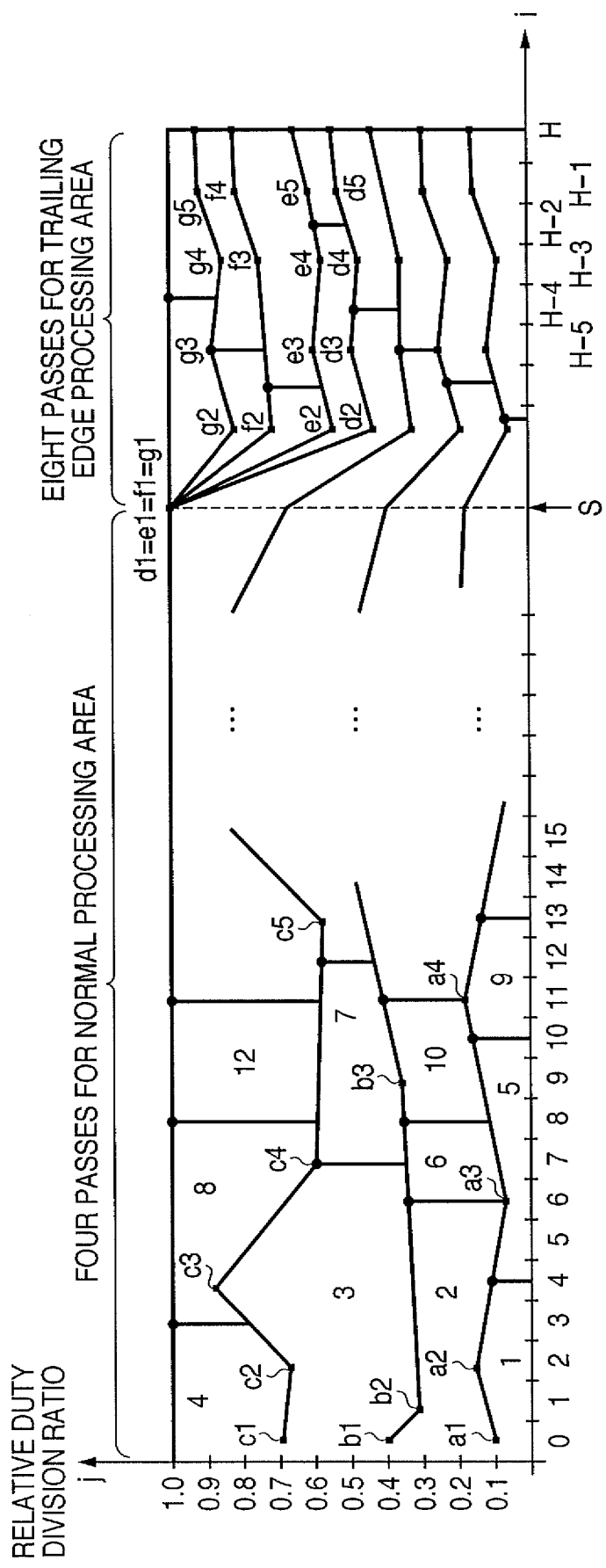
FIG. 50 is a graph showing an example of an input duty division table in the fourth embodiment.
Figure 51:
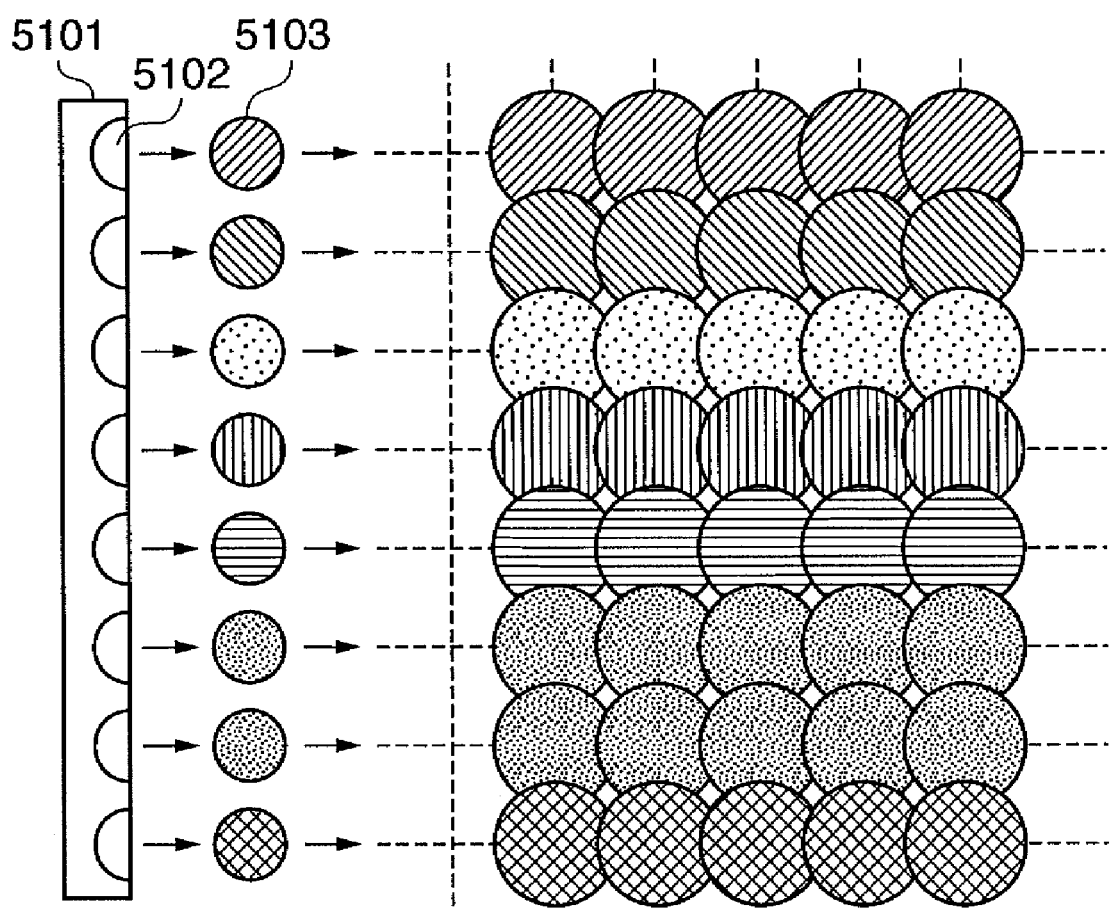
FIG. 51 is a view for explaining a conventional multi-pass printing method.
Figure 52:
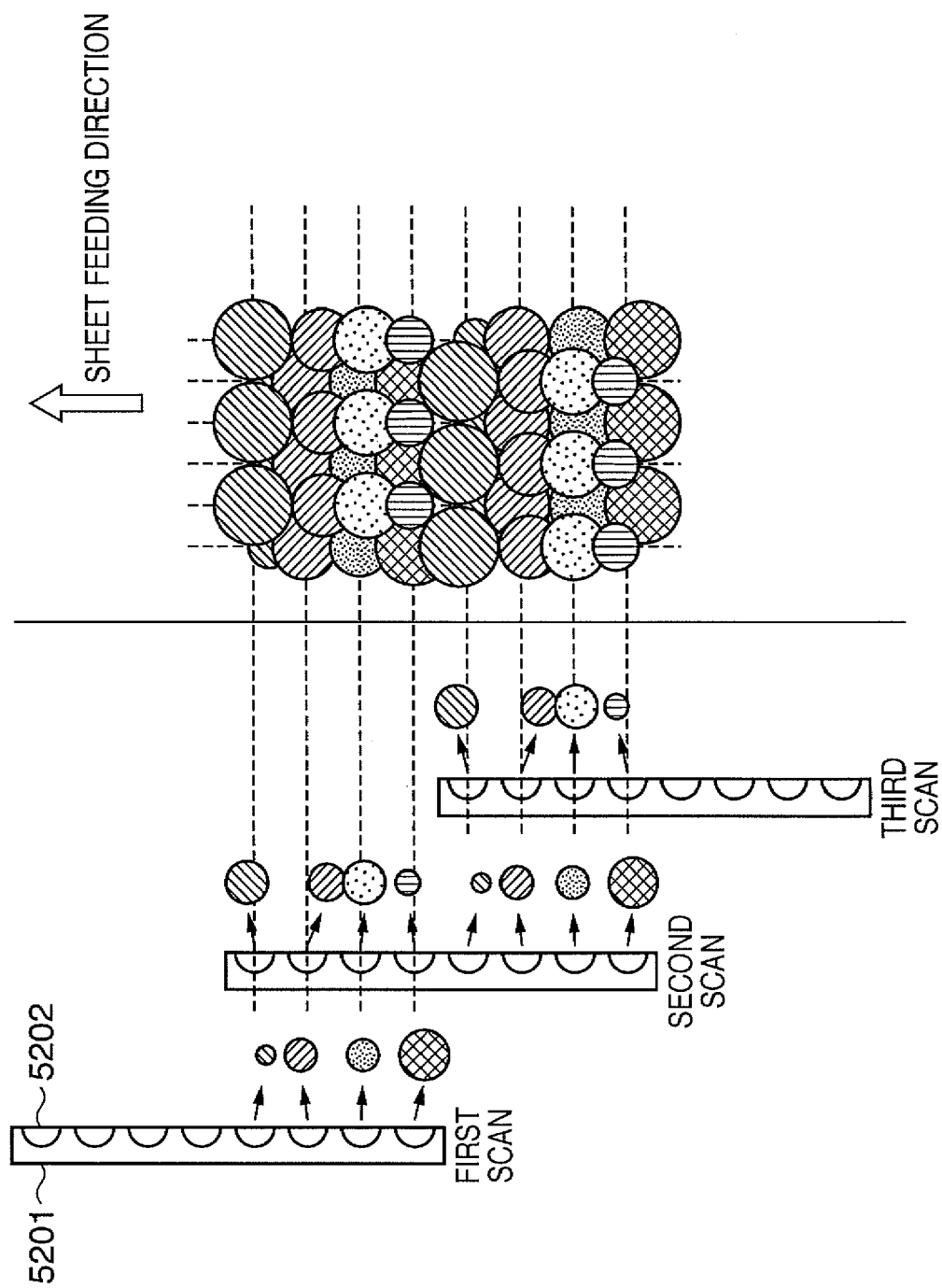
FIG. 52 is a view for explaining a conventional multi-pass printing method.
Figure 53:
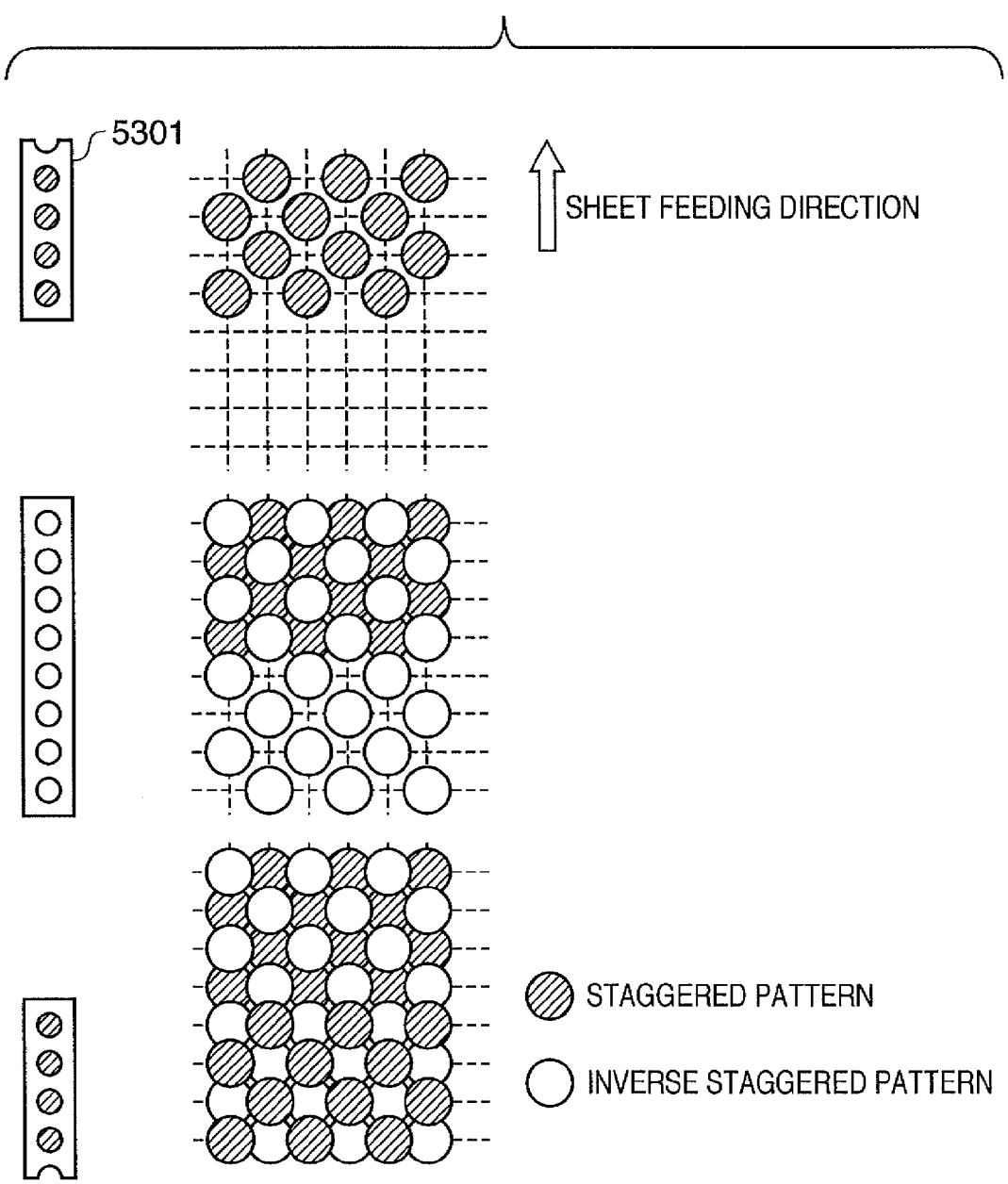
FIG. 53 is a view for explaining a conventional multi-pass printing method.
Figure 54:
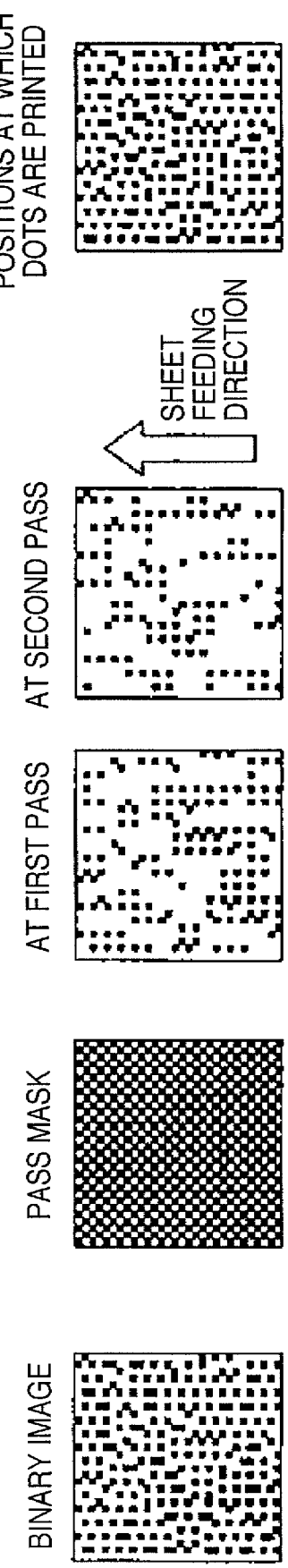
FIG. 54 is a view showing an example of the image formed by a conventional multi-pass printing method when there is no sheet feeding error.
Figure 55:
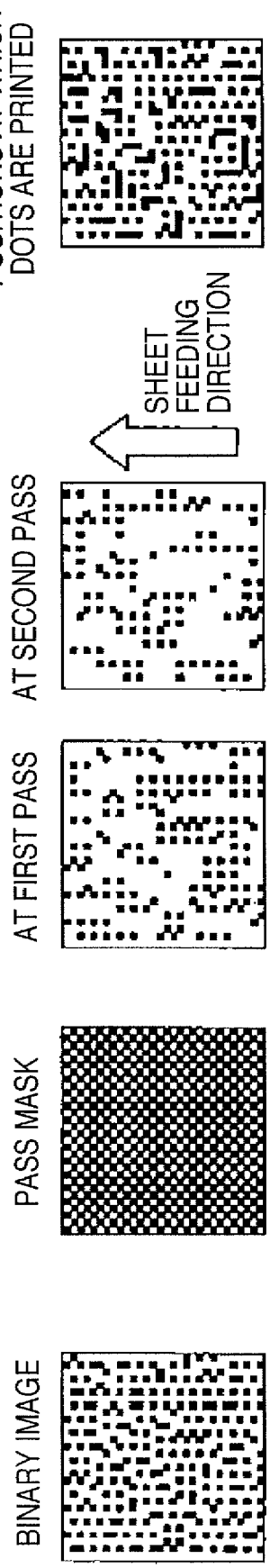
FIG. 55 is a view showing an example of the image formed by the conventional multi-pass printing method when there is a sheet feeding error.

FIG. 50 shows an example of the input duty division table generated in the above manner. Referring to FIG. 50, an area in which a Y address i of the image is smaller than the trailing edge start position S (i<S) is a normal area, and is segmented according to four-pass printing. On the other hand, an area corresponding to i≧S is segmented into eight areas in the horizontal direction. For this segmentation, the method described in the second embodiment can be applied with the minimum number of passes being set to four and the maximum number of passes being set to eight. As shown in FIG. 50, the fourth, fifth, sixth, and seventh areas are required for only trailing edge processing with i≧S. Vertexes dn(i_dn, j_dn), en(i_en, j_en), fn(i_fn, j_fn), and gn(i_gn, j_gn) for the fourth, fifth, sixth, and seventh areas are set to satisfy $$i\_dl=i\_el=i\_fl=i\_gl=S \tag{44}$$

$$j\_dl=j\_el=j\_fl=j\_gl=l \tag{45}$$

Note that the input duty division table shown in FIG. 50 is set to keep continuity between the first area and the third area within the trailing edge area and the segmented areas of the normal area. However, the method of generating an input duty division table in the fourth embodiment is not limited to this. The trailing edge area with i≧S can be segmented into eight areas in the horizontal direction by the method described in the first embodiment.

In the fourth embodiment, generating an input duty division table like that shown in FIG. 50 will implement printing operation using four passes for a normal area and eight passes for a trailing edge area.

A print data setting LUT 106 in the fourth embodiment stores the following types of values calculated for each scan number k based on the input duty division table generated by the above method. That is, the following values are stored: 1) a color separation data extraction position Ycut(k), 2) the division ratio of input data for each nozzle, 3) a sheet feeding amount LF(k) after each scan, and 4) an adjacent area number L.

A print data setting unit 105 then sets print data by using the print data setting LUT 106 set in the above manner, and stores the data in a print data memory 107.

Subsequent halftoning is performed by error diffusion processing as in the first embodiment described above. In error diffusion processing in the fourth embodiment, a halftoning unit 108 needs to secure cumulative error line buffers corresponding to the maximum number of passes (eight in this case) to diffuse and accumulate errors. The cumulative error line buffers to be used are then switched based on the value of the "adjacent area number L" in the print data setting LUT 106. Other processing is the same as that in the first embodiment, and hence a repetitive description will be omitted.

As described above, according to the fourth embodiment, it is possible to make setting to increase the number of passes for a trailing edge portion of an image. This makes it possible to form an image without any image quality deterioration due to a sheet feeding error at a trailing edge portion in which a feeding shift tends to occur in particular.

<Other Embodiments>

Each embodiment described above has exemplified the image processing apparatus using the inkjet printing method of forming an image by discharging ink onto a print medium by scanning the printhead having a plurality of nozzles arrayed in a predetermined direction on the print medium in a direction perpendicular to the nozzle array direction. However, the present invention can be applied to printing apparatuses which perform printing by methods other than the inkjet printing method (e.g., the thermal transfer method and the electrophotographic method). In this case, nozzles which discharge ink droplets correspond to printing elements or laser light-emitting elements which print dots.

In addition, the present invention can be applied to a so-called full-line printing apparatus which has a printhead with a length corresponding to the print width of a print medium and performs printing by moving the printhead relative to the print medium.

The present invention can take embodiments of a system, apparatus, method, program, storage medium (recording medium), and the like. More specifically, the present invention can be applied to a system comprising a plurality of devices (e.g., a host computer, interface device, image sensor, and web application) or an apparatus comprising a single device.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-029712, filed Feb. 8, 2007, which is hereby incorporated by reference herein in its entirety.

What is claimed is:

1. An image processing apparatus for forming an image by main scanning a printhead having a plurality of printing elements on the same scan line of a print medium multiple times, the apparatus comprising:
an input unit configured to input image data;
a storage unit configured to store a table that specifies a division ratio of a printing amount for each of the printing elements, wherein, with respect to each scan line, the division ratio is determined based on the number of times of main scanning for forming an image on the scan line, and the number of the printing elements used for each main scan, and wherein the number of times of main scanning for forming an image differs in at least a part of a plurality of scan lines, or a feeding amount of the print medium according to the number of the printing elements to be used differs in at least a part of plurality of scan lines;
a setting unit configured to set the printing amount for each of the printing elements for each main scan of the printhead in accordance with the image data based on the table; and
an N-ary (where N is an integer not less than two) processing unit configured to generate a dot pattern as a formation target by performing N-ary processing for the printing amount set by said setting unit.

2. The apparatus according to claim 1, wherein said setting unit sets the printing amount for each of the printing elements by dividing a printing amount corresponding to the image data in accordance with a position of the printing element in the printhead based on the table.

3. The apparatus according to claim 2, wherein said setting unit sets the printing amount for each of the printing elements such that a sum of printing amounts for the respective printing elements corresponding to the same area on the print medium coincides with a printing amount of the image data.

4. The apparatus according to claim 1, wherein the table is generated such that the number of printing elements to be used is variable for each main scan.

5. The apparatus according to claim 1, wherein the table is generated such that the number of times of main scanning for formation of the same area on the print medium is variable for each formation area of the image data.

6. The apparatus according to claim 5, wherein the table is generated such that the number of times of main scanning for formation of the same area on the print medium increases in a formation area on a trailing edge of the image data.

7. The apparatus according to claim 1, wherein the table is generated such that an arbitrary characteristic is added to a feeding amount of the print medium fed in a subscanning direction for each main scan which is determined by the number of printing elements to be used for each main scan.

8. A control method for an image processing apparatus for forming an image by scanning a printhead having a plurality of printing elements on the same scan line of a print medium multiple times, the method comprising the steps of:

inputting image data;

storing a table that specifies a division ratio of a printing amount for each of the printing elements, wherein, with respect to each scan line, the division ratio is determined based on the number of times of main scanning for forming an image on the scan line, and the number of the printing elements used for each main scan, and wherein the number of times of main scanning for forming an image differs in at least a part of a plurality of scan lines, or a feeding amount of the print medium according to the number of the printing elements to be used differs in at least a part of plurality of scan lines;

setting the printing amount for each of the printing elements for each main scan of the printhead in accordance with the image data based on the table; and generating a dot pattern as a formation target by performing N-ary processing (where N is an integer not less than two) for the printing amount set in the setting step.

9. A non-transitory, computer-readable storage medium storing a computer program which is executed by a computer to make the computer function as an image forming apparatus defined in claim 1.

10. A non-transitory, computer-readable storage medium storing a program to perform the steps defined in claim 8.

* * * * *